United States Patent
Tanaka et al.

(10) Patent No.: US 7,412,587 B2
(45) Date of Patent: Aug. 12, 2008

(54) PARALLEL OPERATION PROCESSOR UTILIZING SIMD DATA TRANSFERS

(75) Inventors: Takeshi Tanaka, Moriguchi (JP); Hideshi Nishida, Nishinomiya (JP); Masashi Hoshino, Iizuka (JP); Takeshi Furuta, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 273 days.

(21) Appl. No.: 11/054,049

(22) Filed: Feb. 9, 2005

(65) Prior Publication Data

US 2005/0216699 A1    Sep. 29, 2005

(30) Foreign Application Priority Data

Feb. 16, 2004    (JP)    ............... 2004-038210

(51) Int. Cl.
    *G06F 9/30*    (2006.01)
(52) U.S. Cl. ........................ 712/22; 712/225
(58) Field of Classification Search ............ 712/225, 712/22
    See application file for complete search history.

(56) References Cited

U.S. PATENT DOCUMENTS

| | | | | |
|---|---|---|---|---|
| 5,581,773 | A * | 12/1996 | Glover | 712/14 |
| 5,825,921 | A * | 10/1998 | Dulong | 382/181 |
| 5,913,041 | A * | 6/1999 | Ramanathan et al. | 709/233 |
| 7,065,590 | B2 * | 6/2006 | Kitagawa | 710/5 |
| 2002/0029208 | A1 * | 3/2002 | Josephson | 707/1 |

* cited by examiner

*Primary Examiner*—Tonia L. M. Dollinger

(57) ABSTRACT

A processor having a plurality of processing elements and a decoder operable to decode an instruction. Each of the plurality of processing elements includes: a transfer pattern storage unit operable to store a transfer pattern value that indicates a processing element from which data is transferred; a transfer unit operable to perform a data transfer from the processing element indicated by the transfer pattern value; and an update unit operable to update the transfer pattern value stored in the transfer pattern storage unit, in accordance with a result of decoding a latest instruction by the decoder.

19 Claims, 49 Drawing Sheets

FIG.9

8PE MODE

|  | PE0 | | PE1 | | PE2 | | PE3 | | PE4 | | PE5 | | PE6 | | PE7 | |
|---|---|---|---|---|---|---|---|---|---|---|---|---|---|---|---|---|
|  | H | L | H | L | H | L | H | L | H | L | H | L | H | L | H | L |
| (a) First row: network pattern value | 00 | 01 | 02 | 03 | 04 | 05 | 06 | 07 | 08 | 09 | 0a | 0b | 0c | 0d | 0e | 0f |
| Second row: select signal output | 00 | 01 | 02 | 03 | 04 | 05 | 06 | 07 | 08 | 09 | 0a | 0b | 0c | 0d | 0e | 0f |
| Third row: register offset selection signal output | 0 | 0 | 0 | 0 | 0 | 0 | 0 | 0 | 0 | 0 | 0 | 0 | 0 | 0 | 0 | 0 |
| (b) First row: network pattern value | 02 | 03 | 04 | 05 | 06 | 07 | 08 | 09 | 0a | 0b | 0c | 0d | 0e | 0f | 10 | 11 |
| Second row: select signal output | 02 | 03 | 04 | 05 | 06 | 07 | 08 | 09 | 0a | 0b | 0c | 0d | 0e | 0f | 00 | 01 |
| Third row: register offset selection signal output | 0 | 0 | 0 | 0 | 0 | 0 | 0 | 0 | 0 | 0 | 0 | 0 | 0 | 0 | 1 | 1 |
| (c) First row: network pattern value | fe | ff | 00 | 01 | 02 | 03 | 04 | 05 | 06 | 07 | 08 | 09 | 0a | 0b | 0c | 0d |
| Second row: select signal output | 0e | 0f | 00 | 01 | 02 | 03 | 04 | 05 | 06 | 07 | 08 | 09 | 0a | 0b | 0c | 0d |
| Third row: register offset selection signal output | 1 | 1 | 0 | 0 | 0 | 0 | 0 | 0 | 0 | 0 | 0 | 0 | 0 | 0 | 0 | 0 |

EACH NUMERICAL VALUE IS REPRESENTED IN HEXADECIMAL

FIG.10

4PE MODE

(a)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 00 | 01 | 02 | 03 | 04 | 05 | 06 | 07 | 00 | 01 | 02 | 03 | 04 | 05 | 06 | 07 |
| Second row: Select signal output | 00 | 01 | 02 | 03 | 04 | 05 | 06 | 07 | 08 | 09 | 0a | 0b | 0c | 0d | 0e | 0f |
| Third row: Register offset selection signal output | 0 | 0 | 0 | 0 | 0 | 0 | 0 | 0 | 0 | 0 | 0 | 0 | 0 | 0 | 0 | 0 |

(b)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 01 | 02 | 03 | 04 | 05 | 06 | 07 | 08 | 01 | 02 | 03 | 04 | 05 | 06 | 07 | 08 |
| Second row: Select signal output | 01 | 02 | 03 | 04 | 05 | 06 | 07 | 00 | 08 | 09 | 0a | 0b | 0c | 0d | 0e | 0f |
| Third row: Register offset selection signal output | 0 | 0 | 0 | 0 | 0 | 0 | 0 | 1 | 0 | 0 | 0 | 0 | 0 | 0 | 0 | 0 |

(c)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | fe | ff | 00 | 01 | 02 | 03 | 04 | 05 | fe | ff | 00 | 01 | 02 | 03 | 04 | 05 |
| Second row: Select signal output | 06 | 07 | 00 | 01 | 02 | 03 | 04 | 05 | 0e | 0f | 08 | 09 | 0a | 0b | 0c | 0d |
| Third row: Register offset selection signal output | 1 | 1 | 0 | 0 | 0 | 0 | 0 | 0 | 1 | 1 | 0 | 0 | 0 | 0 | 0 | 0 |

EACH NUMERICAL VALUE IS REPRESENTED IN HEXADECIMAL

FIG.11

8PE MODE (a) FIRST ROW: NETWORK PATTERN VALUE
SECOND ROW: SELECT SIGNAL OUTPUT
THIRD ROW: REGISTER OFFSET SELEC-TION SIGNAL OUTPUT

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| | 00 | 01 | 02 | 03 | 04 | 05 | 06 | 07 | 08 | 09 | 0a | 0b | 0c | 0d | 0e | 0f |
| | 00 | 01 | 02 | 03 | 04 | 05 | 06 | 07 | 08 | 09 | 0a | 0b | 0c | 0d | 0e | 0f |
| | 1 | 1 | 1 | 1 | 1 | 1 | 1 | 1 | 1 | 1 | 1 | 1 | 1 | 1 | 1 | 1 |

(b) FIRST ROW: NETWORK PATTERN VALUE
SECOND ROW: SELECT SIGNAL OUTPUT
THIRD ROW: REGISTER OFFSET SELEC-TION SIGNAL OUTPUT

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| | 02 | 03 | 04 | 05 | 06 | 07 | 08 | 09 | 0a | 0b | 0c | 0d | 0e | 0f | 10 | 11 |
| | 02 | 03 | 04 | 05 | 06 | 07 | 08 | 09 | 0a | 0b | 0c | 0d | 0e | 0f | 00 | 01 |
| | 1 | 1 | 1 | 1 | 1 | 1 | 1 | 1 | 1 | 1 | 1 | 1 | 1 | 1 | 1 | 1 |

(c) FIRST ROW: NETWORK PATTERN VALUE
SECOND ROW: SELECT SIGNAL OUTPUT
THIRD ROW: REGISTER OFFSET SELEC-TION SIGNAL OUTPUT

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| | fe | ff | 00 | 01 | 02 | 03 | 04 | 05 | 06 | 07 | 08 | 09 | 0a | 0b | 0c | 0d |
| | 0e | 0f | 00 | 01 | 02 | 03 | 04 | 05 | 06 | 07 | 08 | 09 | 0a | 0b | 0c | 0d |
| | 1 | 1 | 1 | 1 | 1 | 1 | 1 | 1 | 1 | 1 | 1 | 1 | 1 | 1 | 1 | 1 |

EACH NUMERICAL VALUE IS REPRESENTED IN HEXADECIMAL

FIG.12

4PE MODE (a)

| PE0 | | PE1 | | PE2 | | PE3 | | PE4 | | PE5 | | PE6 | | PE7 | |
|---|---|---|---|---|---|---|---|---|---|---|---|---|---|---|---|
| H | L | H | L | H | L | H | L | H | L | H | L | H | L | H | L |
| 00 | 01 | 02 | 03 | 04 | 05 | 06 | 07 | 00 | 01 | 02 | 03 | 04 | 05 | 06 | 07 |
| 00 | 01 | 02 | 03 | 04 | 05 | 06 | 07 | 08 | 09 | 0a | 0b | 0c | 0d | 0e | 0f |
| 1 | 1 | 1 | 1 | 1 | 1 | 1 | 1 | 1 | 1 | 1 | 1 | 1 | 1 | 1 | 1 |

FIRST ROW: NETWORK PATTERN VALUE

SECOND ROW: SELECT SIGNAL OUTPUT
THIRD ROW: REGISTER OFFSET SELEC
-TION SIGNAL OUTPUT (b)

| PE0 | | PE1 | | PE2 | | PE3 | | PE4 | | PE5 | | PE6 | | PE7 | |
|---|---|---|---|---|---|---|---|---|---|---|---|---|---|---|---|
| 01 | 02 | 03 | 04 | 05 | 06 | 07 | 08 | 01 | 02 | 03 | 04 | 05 | 06 | 07 | 08 |
| 01 | 02 | 03 | 04 | 05 | 06 | 07 | 00 | 09 | 0a | 0b | 0c | 0d | 0e | 0f | 08 |
| 1 | 1 | 1 | 1 | 1 | 1 | 1 | 1 | 1 | 1 | 1 | 1 | 1 | 1 | 1 | 1 |

FIRST ROW: NETWORK PATTERN VALUE

SECOND ROW: SELECT SIGNAL OUTPUT
THIRD ROW: REGISTER OFFSET SELEC
-TION SIGNAL OUTPUT (c)

| PE0 | | PE1 | | PE2 | | PE3 | | PE4 | | PE5 | | PE6 | | PE7 | |
|---|---|---|---|---|---|---|---|---|---|---|---|---|---|---|---|
| fe | ff | 00 | 01 | 02 | 03 | 04 | 05 | fe | ff | 00 | 01 | 02 | 03 | 04 | 05 |
| 06 | 07 | 00 | 01 | 02 | 03 | 04 | 05 | 0e | 0f | 08 | 09 | 0a | 0b | 0c | 0d |
| 1 | 1 | 1 | 1 | 1 | 1 | 1 | 1 | 1 | 1 | 1 | 1 | 1 | 1 | 1 | 1 |

FIRST ROW: NETWORK PATTERN VALUE

SECOND ROW: SELECT SIGNAL OUTPUT
THIRD ROW: REGISTER OFFSET SELEC
-TION SIGNAL OUTPUT

EACH NUMERICAL VALUE IS REPRESENTED IN HEXADECIMAL

FIG.13

8PE MODE (a)
| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 00 | 01 | 02 | 03 | 04 | 05 | 06 | 07 | 08 | 09 | 0a | 0b | 0c | 0d | 0e | 0f |
| Second row: Select signal output | 00 | 01 | 02 | 03 | 04 | 05 | 06 | 07 | 08 | 09 | 0a | 0b | 0c | 0d | 0e | 0f |
| Third row: Register offset selection signal output | 0 | 0 | 0 | 0 | 0 | 0 | 0 | 0 | 0 | 0 | 0 | 0 | 0 | 0 | 0 | 0 |

(b)
| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 02 | 03 | 04 | 05 | 06 | 07 | 08 | 09 | 0a | 0b | 0c | 0d | 0e | 0f | 10 | 11 |
| Second row: Select signal output | 02 | 03 | 04 | 05 | 06 | 07 | 08 | 09 | 0a | 0b | 0c | 0d | 0e | 0f | 0f | 0f |
| Third row: Register offset selection signal output | 0 | 0 | 0 | 0 | 0 | 0 | 0 | 0 | 0 | 0 | 0 | 0 | 0 | 0 | 0 | 0 |

(c)
| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | fe | ff | 00 | 01 | 02 | 03 | 04 | 05 | 06 | 07 | 08 | 09 | 0a | 0b | 0c | 0d |
| Second row: Select signal output | 00 | 00 | 00 | 01 | 02 | 03 | 04 | 05 | 06 | 07 | 08 | 09 | 0a | 0b | 0c | 0d |
| Third row: Register offset selection signal output | 0 | 0 | 0 | 0 | 0 | 0 | 0 | 0 | 0 | 0 | 0 | 0 | 0 | 0 | 0 | 0 |

EACH NUMERICAL VALUE IS REPRESENTED IN HEXADECIMAL

FIG. 14

4PE MODE (a)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 00 | 01 | 02 | 03 | 04 | 05 | 06 | 07 | 00 | 01 | 02 | 03 | 04 | 05 | 06 | 07 |
| Second row: Select signal output | 00 | 01 | 02 | 03 | 04 | 05 | 06 | 07 | 08 | 09 | 0a | 0b | 0c | 0d | 0e | 0f |
| Third row: Register offset selection signal output | 0 | 0 | 0 | 0 | 0 | 0 | 0 | 0 | 0 | 0 | 0 | 0 | 0 | 0 | 0 | 0 |

(b)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | 01 | 02 | 03 | 04 | 05 | 06 | 07 | 08 | 01 | 02 | 03 | 04 | 05 | 06 | 07 | 08 |
| Second row: Select signal output | 01 | 02 | 03 | 04 | 05 | 06 | 07 | 07 | 09 | 0a | 0b | 0c | 0d | 0e | 0f | 0f |
| Third row: Register offset selection signal output | 0 | 0 | 0 | 0 | 0 | 0 | 0 | 0 | 0 | 0 | 0 | 0 | 0 | 0 | 0 | 0 |

(c)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| First row: Network pattern value | fe | ff | 00 | 01 | 02 | 03 | 04 | 05 | fe | ff | 00 | 01 | 02 | 03 | 04 | 05 |
| Second row: Select signal output | 00 | 00 | 00 | 01 | 02 | 03 | 04 | 05 | 08 | 08 | 09 | 0a | 0b | 0c | 0d | 0 |
| Third row: Register offset selection signal output | 0 | 0 | 0 | 0 | 0 | 0 | 0 | 0 | 0 | 0 | 0 | 0 | 0 | 0 | 0 | 0 |

EACH NUMERICAL VALUE IS REPRESENTED IN HEXADECIMAL

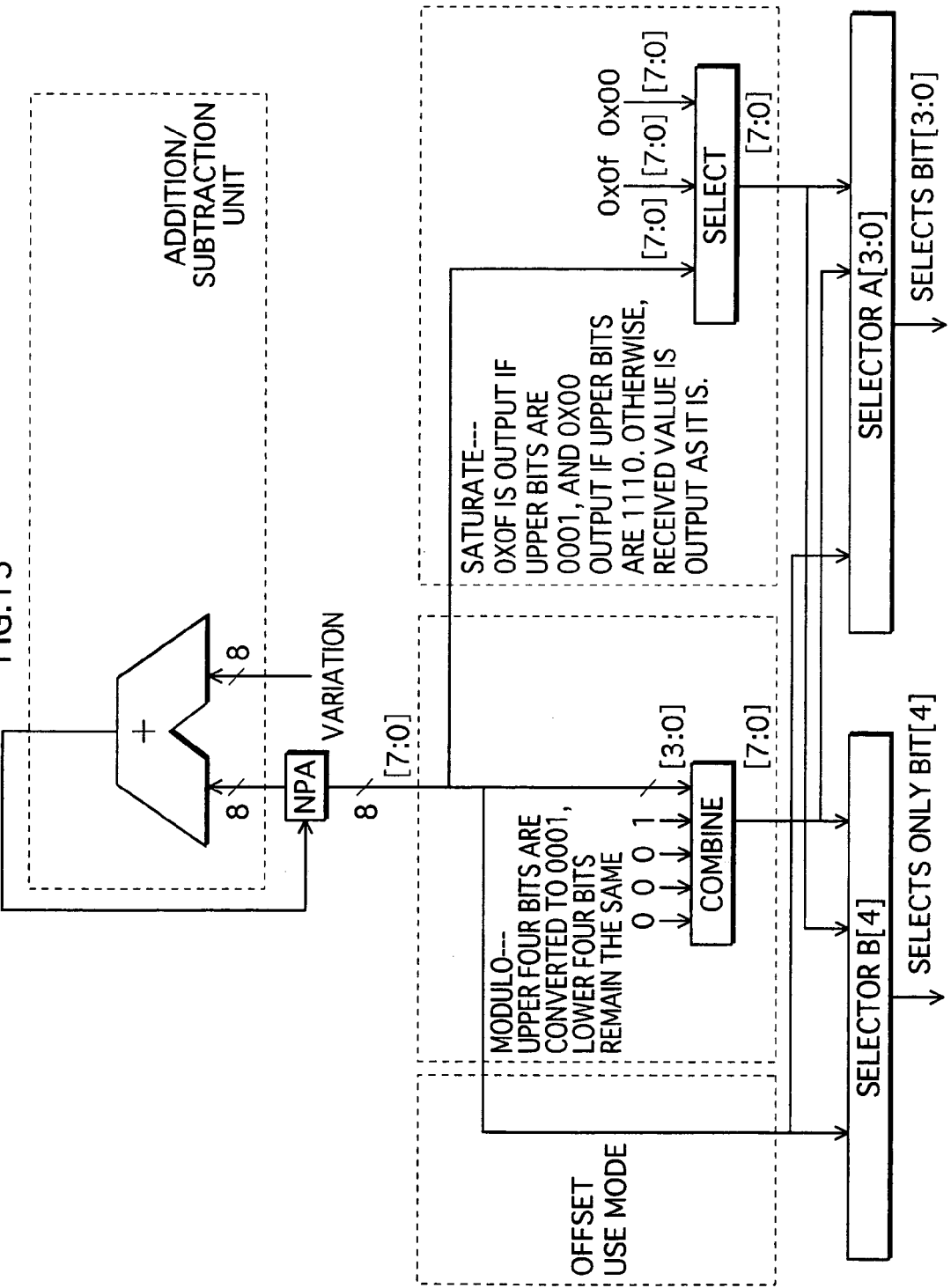

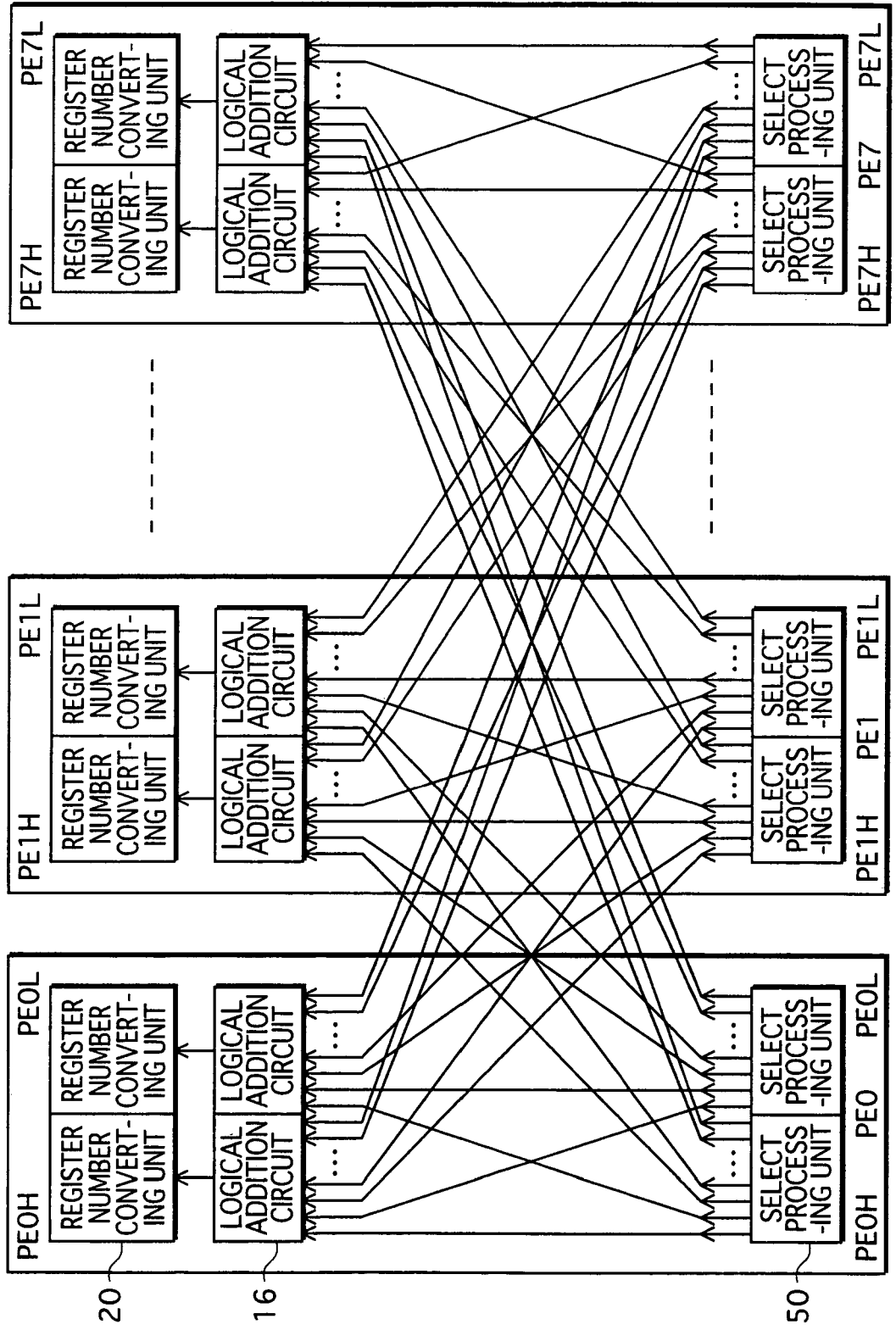

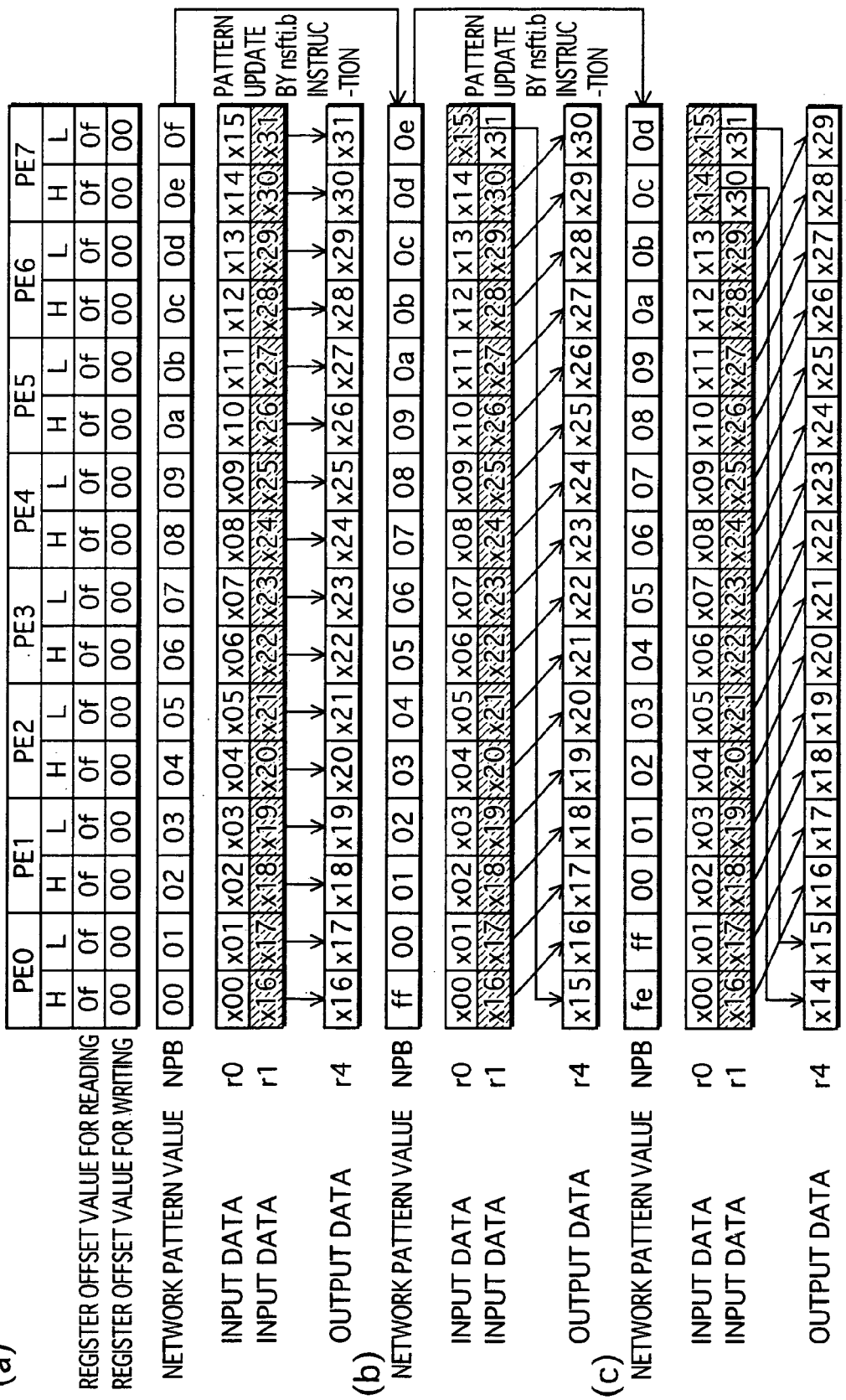

FIG.30A

| | PE0 | PE1 | PE2 | PE3 | PE4 | PE5 | PE6 | PE7 |
|---|---|---|---|---|---|---|---|---|
| r0 | 0 | 1 | 2 | 3 | 4 | 5 | 6 | 7 |
| r1 | 8 | 9 | 10 | 11 | 12 | 13 | 14 | 15 |
| r2 | 16 | 17 | 18 | 19 | 20 | 21 | 22 | 23 |
| r3 | 24 | 25 | 26 | 27 | 28 | 29 | 30 | 31 |
| r4 | 32 | 33 | 34 | 35 | 36 | 37 | 38 | 39 |
| r5 | 40 | 41 | 42 | 43 | 44 | 45 | 46 | 47 |
| r6 | 48 | 49 | 50 | 51 | 52 | 53 | 54 | 55 |
| r7 | 56 | 57 | 58 | 59 | 60 | 61 | 62 | 63 |

FIG.30B

| | PE0 | PE1 | PE2 | PE3 | PE4 | PE5 | PE6 | PE7 |
|---|---|---|---|---|---|---|---|---|
| r0 | 0 | 1 | 2 | 3 | 4 | 5 | 6 | 7 |
| r1 | 8 | 9 | 10 | 11 | 12 | 13 | 14 | 15 |
| r2 | 16 | 17 | 18 | 19 | 20 | 21 | 22 | 23 |
| r3 | 24 | 25 | 26 | 27 | 28 | 29 | 30 | 31 |
| r4 | 32 | 33 | 34 | 35 | 36 | 37 | 38 | 39 |
| r5 | 40 | 41 | 42 | 43 | 44 | 45 | 46 | 47 |
| r6 | 48 | 49 | 50 | 51 | 52 | 53 | 54 | 55 |
| r7 | 56 | 57 | 58 | 59 | 60 | 61 | 62 | 63 |

FIG.30C

| | PE0 | PE1 | PE2 | PE3 | PE4 | PE5 | PE6 | PE7 |
|---|---|---|---|---|---|---|---|---|
| r0 | 0 | 8 | 17 | 26 | 35 | 44 | 53 | 56 |
| r1 | 9 | 10 | 2 | 11 | 12 | 13 | 14 | 15 |
| r2 | 16 | 25 | 18 | 19 | 20 | 21 | 22 | 23 |
| r3 | 24 | 33 | 19 | 27 | 28 | 29 | 30 | 31 |
| r4 | 32 | 41 | 34 | 43 | 36 | 37 | 38 | 39 |
| r5 | 40 | 49 | 42 | 51 | 45 | 46 | 47 | 62 |
| r6 | 48 | 57 | 50 | 59 | 52 | 53 | 54 | 55 |
| r7 | 1 | 58 | 43 | 60 | 61 | 62 | 63 |

FIG.30D

NETWORK A

| | PE0 | PE1 | PE2 | PE3 | PE4 | PE5 | PE6 | PE7 |
|---|---|---|---|---|---|---|---|---|
| REGISTER OFFSET VALUE FOR READING | 01 | 02 | 03 | 04 | 05 | 06 | 07 | 00 |
| NETWORK PATTERN VALUE | 0f | 01 | 03 | 05 | 07 | 09 | 0b | 0d |
| REGISTER OFFSET VALUE FOR WRITING | 07 | 00 | 01 | 02 | 03 | 04 | 05 | 06 |

NETWORK B

| | PE0 | PE1 | PE2 | PE3 | PE4 | PE5 | PE6 | PE7 |
|---|---|---|---|---|---|---|---|---|
| REGISTER OFFSET VALUE FOR READING | 07 | 00 | 01 | 02 | 03 | 04 | 05 | 06 |
| NETWORK PATTERN VALUE | 03 | 05 | 07 | 09 | 0b | 0d | 0f | 01 |
| REGISTER OFFSET VALUE FOR WRITING | 01 | 02 | 03 | 04 | 05 | 06 | 07 | 00 |

FIG.31E

| | PE0 | PE1 | PE2 | PE3 | PE4 | PE5 | PE6 | PE7 |
|---|---|---|---|---|---|---|---|---|
| r0 | 0 | 8 | 2 | 3 | 4 | 5 | 6 | 56 |
| r1 | 1 | 9 | 17 | 11 | 12 | 13 | 14 | 15 |
| r2 | 16 | 10 | 18 | 26 | 20 | 21 | 22 | 23 |
| r3 | 24 | 25 | 19 | 27 | 35 | 29 | 30 | 31 |
| r4 | 32 | 33 | 34 | 28 | 36 | 44 | 38 | 39 |
| r5 | 40 | 41 | 42 | 43 | 52 | 45 | 53 | 47 |
| r6 | 48 | 49 | 50 | 51 | 37 | 61 | 54 | 62 |
| r7 | 7 | 57 | 58 | 59 | 60 | 46 | 55 | 63 |

FIG.31F

| | PE0 | PE1 | PE2 | PE3 | PE4 | PE5 | PE6 | PE7 |
|---|---|---|---|---|---|---|---|---|
| r0 | 0 | 8 | 16 | 3 | 4 | 5 | 48 | 56 |
| r1 | 1 | 9 | 17 | 25 | 12 | 13 | 14 | 57 |
| r2 | 2 | 10 | 18 | 26 | 34 | 21 | 22 | 23 |
| r3 | 24 | 11 | 19 | 27 | 35 | 43 | 30 | 31 |
| r4 | 32 | 33 | 20 | 28 | 36 | 44 | 52 | 39 |
| r5 | 40 | 41 | 42 | 29 | 37 | 45 | 53 | 61 |
| r6 | 6 | 49 | 50 | 38 | 46 | 47 | 54 | 62 |
| r7 | 7 | 15 | 58 | 51 | 59 | 60 | 55 | 63 |

FIG.31G

NETWORK A

| | PE0 | PE1 | PE2 | PE3 | PE4 | PE5 | PE6 | PE7 |
|---|---|---|---|---|---|---|---|---|
| REGISTER OFFSET VALUE FOR READING | 02 | 03 | 04 | 05 | 06 | 07 | 00 | 01 |
| NETWORK PATTERN VALUE | 0d | 0f | 01 | 03 | 05 | 07 | 09 | 0b |
| REGISTER OFFSET VALUE FOR WRITING | 06 | 07 | 00 | 01 | 02 | 03 | 04 | 05 |

NETWORK B

| | PE0 | PE1 | PE2 | PE3 | PE4 | PE5 | PE6 | PE7 |
|---|---|---|---|---|---|---|---|---|
| REGISTER OFFSET VALUE FOR READING | 06 | 07 | 00 | 01 | 02 | 03 | 04 | 05 |
| NETWORK PATTERN VALUE | 05 | 07 | 09 | 0b | 0d | 0f | 01 | 03 |
| REGISTER OFFSET VALUE FOR WRITING | 02 | 03 | 04 | 05 | 06 | 07 | 00 | 01 |

FIG.32H

|  | PE0 | PE1 | PE2 | PE3 | PE4 | PE5 | PE6 | PE7 |
|---|---|---|---|---|---|---|---|---|
| r0 | 0 | 8 | 16 | 3 | 4 | 5 | 6 | 56 |
| r1 | 1 | 9 | 17 | 25 | 12 | 13 | 14 | 15 |
| r2 | 2 | 10 | 18 | 26 | 34 | 21 | 22 | 23 |
| r3 | 24 | 11 | 19 | 27 | 35 | 43 | 30 | 31 |
| r4 | 32 | 33 | 20 | 28 | 36 | 44 | 52 | 39 |
| r5 | 40 | 41 | 42 | 29 | 37 | 45 | 53 | 61 |
| r6 | 48 | 49 | 50 | 51 | 38 | 46 | 54 | 62 |
| r7 | 7 | 57 | 58 | 59 | 60 | 47 | 55 | 63 |

FIG.32I

|  | PE0 | PE1 | PE2 | PE3 | PE4 | PE5 | PE6 | PE7 |
|---|---|---|---|---|---|---|---|---|
| r0 | 0 | 8 | 16 | 24 | 4 | 40 | 48 | 56 |
| r1 | 1 | 9 | 17 | 25 | 33 | 13 | 49 | 57 |
| r2 | 2 | 10 | 18 | 26 | 34 | 42 | 22 | 58 |
| r3 | 3 | 11 | 19 | 27 | 35 | 43 | 51 | 31 |
| r4 | 32 | 12 | 20 | 28 | 36 | 44 | 52 | 60 |
| r5 | 5 | 41 | 21 | 29 | 37 | 45 | 53 | 61 |
| r6 | 6 | 14 | 50 | 30 | 38 | 46 | 54 | 62 |
| r7 | 7 | 15 | 23 | 59 | 39 | 47 | 55 | 63 |

FIG.32J

NETWORK A

|  | PE0 | PE1 | PE2 | PE3 | PE4 | PE5 | PE6 | PE7 |
|---|---|---|---|---|---|---|---|---|
| REGISTER OFFSET VALUE FOR READING | 03 | 04 | 05 | 06 | 07 | 00 | 01 | 02 |
| NETWORK PATTERN VALUE | 0b | 0d | 0f | 01 | 03 | 05 | 07 | 09 |
| REGISTER OFFSET VALUE FOR WRITING | 05 | 06 | 07 | 00 | 01 | 02 | 03 | 04 |

NETWORK B

|  | PE0 | PE1 | PE2 | PE3 | PE4 | PE5 | PE6 | PE7 |
|---|---|---|---|---|---|---|---|---|
| REGISTER OFFSET VALUE FOR READING | 05 | 06 | 07 | 00 | 01 | 02 | 03 | 04 |
| NETWORK PATTERN VALUE | 07 | 09 | 0b | 0d | 0f | 01 | 03 | 05 |
| REGISTER OFFSET VALUE FOR WRITING | 03 | 04 | 05 | 06 | 07 | 00 | 01 | 02 |

FIG.33M

NETWORK A

| | PE0 | PE1 | PE2 | PE3 | PE4 | PE5 | PE6 | PE7 |
|---|---|---|---|---|---|---|---|---|
| REGISTER OFFSET VALUE FOR READING | 04 | 05 | 06 | 07 | 00 | 01 | 02 | 03 |
| NETWORK PATTERN VALUE | 09 | 0b | 0d | 0f | 01 | 03 | 05 | 07 |
| REGISTER OFFSET VALUE FOR WRITING | 04 | 05 | 06 | 07 | 00 | 01 | 02 | 03 |

FIG.33K

| | PE0 | PE1 | PE2 | PE3 | PE4 | PE5 | PE6 | PE7 |
|---|---|---|---|---|---|---|---|---|
| r0 | 0 | 8 | 16 | 24 | 4 | 40 | 48 | 56 |
| r1 | 1 | 9 | 17 | 25 | 33 | 13 | 49 | 57 |
| r2 | 2 | 10 | 18 | 26 | 34 | 42 | 22 | 58 |
| r3 | 3 | 11 | 19 | 27 | 35 | 43 | 51 | 31 |
| r4 | 32 | 12 | 20 | 28 | 33 | 44 | 52 | 60 |
| r5 | 5 | 41 | 21 | 29 | 37 | 45 | 53 | 61 |
| r6 | 6 | 14 | 50 | 30 | 38 | 46 | 54 | 62 |
| r7 | 7 | 15 | 23 | 59 | 39 | 47 | 55 | 63 |

FIG.33I

| | PE0 | PE1 | PE2 | PE3 | PE4 | PE5 | PE6 | PE7 |
|---|---|---|---|---|---|---|---|---|
| r0 | 0 | 8 | 16 | 24 | 32 | 40 | 48 | 56 |
| r1 | 1 | 9 | 17 | 25 | 33 | 41 | 49 | 57 |
| r2 | 2 | 10 | 18 | 26 | 34 | 42 | 50 | 58 |
| r3 | 3 | 11 | 19 | 27 | 35 | 43 | 51 | 59 |
| r4 | 4 | 12 | 20 | 28 | 32 | 41 | 50 | 59 |
| r5 | 5 | 13 | 21 | 29 | 37 | 45 | 53 | 61 |
| r6 | 6 | 14 | 22 | 30 | 38 | 46 | 54 | 62 |
| r7 | 7 | 15 | 23 | 31 | 39 | 47 | 55 | 63 |

FIG.35

8PE MODE
MAXIMUM VALUE 0X0C
MINIMUM VALUE 0X00

(a)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| FIRST ROW: NETWORK PATTERN VALUE | 00 | 01 | 02 | 03 | 04 | 05 | 06 | 07 | 08 | 09 | 0a | 0b | 0c | 0d | 0e | 0f |
| SECOND ROW: SELECT VALUE OUTPUT | 00 | 01 | 02 | 03 | 04 | 05 | 06 | 07 | 08 | 09 | 0a | 0b | 0c | 0c | 0c | 0c |
| THIRD ROW: REGISTER OFFSET SELECTION SIGNAL OUTPUT | 0 | 0 | 0 | 0 | 0 | 0 | 0 | 0 | 0 | 0 | 0 | 0 | 0 | 0 | 0 | 0 |

(b)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| FIRST ROW: NETWORK PATTERN VALUE | 02 | 03 | 04 | 05 | 06 | 07 | 08 | 09 | 0a | 0b | 0c | 0d | 0e | 0f | 10 | 11 |
| SECOND ROW: SELECT VALUE OUTPUT | 02 | 03 | 04 | 05 | 06 | 07 | 08 | 09 | 0a | 0b | 0c | 0c | 0c | 0c | 0c | 0c |
| THIRD ROW: REGISTER OFFSET SELECTION SIGNAL OUTPUT | 0 | 0 | 0 | 0 | 0 | 0 | 0 | 0 | 0 | 0 | 0 | 0 | 0 | 0 | 0 | 0 |

(c)

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| FIRST ROW: NETWORK PATTERN VALUE | fe | ff | 00 | 01 | 02 | 03 | 04 | 05 | 06 | 07 | 08 | 09 | 0a | 0b | 0c | 0d |
| SECOND ROW: SELECT VALUE OUTPUT | 00 | 00 | 00 | 01 | 02 | 03 | 04 | 05 | 06 | 07 | 08 | 09 | 0a | 0b | 0c | 0c |
| THIRD ROW: REGISTER OFFSET SELECTION SIGNAL OUTPUT | 0 | 0 | 0 | 0 | 0 | 0 | 0 | 0 | 0 | 0 | 0 | 0 | 0 | 0 | 0 | 0 |

EACH NUMERICAL VALUE IS REPRESENTED IN HEXADECIMAL

FIG. 36

(a)
4PE MODE
MAXIMUM VALUE 0X06
MINIMUM VALUE 0XFF

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| FIRST ROW: NETWORK PATTERN VALUE | 00 | 01 | 02 | 03 | 04 | 05 | 06 | 07 | 00 | 01 | 02 | 03 | 04 | 05 | 06 | 07 |
| SECOND ROW: SELECT VALUE OUTPUT | 00 | 01 | 02 | 03 | 04 | 05 | 06 | 06 | 08 | 09 | 0a | 0b | 0c | 0d | 0e | 0e |
| THIRD ROW: REGISTER OFFSET SELECTION SIGNAL OUTPUT | 0 | 0 | 0 | 0 | 0 | 0 | 0 | 0 | 0 | 0 | 0 | 0 | 0 | 0 | 0 | 0 |

(b)

| FIRST ROW: NETWORK PATTERN VALUE | 01 | 02 | 03 | 04 | 05 | 06 | 07 | 08 | 01 | 02 | 03 | 04 | 05 | 06 | 07 | 08 |
|---|---|---|---|---|---|---|---|---|---|---|---|---|---|---|---|---|
| SECOND ROW: SELECT VALUE OUTPUT | 01 | 02 | 03 | 04 | 05 | 06 | 06 | 06 | 08 | 09 | 0a | 0b | 0c | 0d | 0e | 0e |
| THIRD ROW: REGISTER OFFSET SELECTION SIGNAL OUTPUT | 0 | 0 | 0 | 0 | 0 | 0 | 0 | 0 | 0 | 0 | 0 | 0 | 0 | 0 | 0 | 0 |

(c)

| FIRST ROW: NETWORK PATTERN VALUE | fe | ff | 00 | 01 | 02 | 03 | 04 | 05 | fe | ff | 00 | 01 | 02 | 03 | 04 | 05 |
|---|---|---|---|---|---|---|---|---|---|---|---|---|---|---|---|---|
| SECOND ROW: SELECT VALUE OUTPUT | 07 | 07 | 00 | 01 | 02 | 03 | 04 | 05 | 0f | 0f | 08 | 09 | 0a | 0b | 0c | 0d |
| THIRD ROW: REGISTER OFFSET SELECTION SIGNAL OUTPUT | 1 | 1 | 0 | 0 | 0 | 0 | 0 | 0 | 1 | 1 | 0 | 0 | 0 | 0 | 0 | 0 |

EACH NUMERICAL VALUE IS REPRESENTED IN HEXADECIMAL

FIG.38

8PE MODE
MAXIMUM VALUE 0x0F
MINIMUM VALUE 0xF0

| | PE0 | | PE1 | | PE2 | | PE3 | | PE4 | | PE5 | | PE6 | | PE7 | |
|---|---|---|---|---|---|---|---|---|---|---|---|---|---|---|---|---|
| | H | L | H | L | H | L | H | L | H | L | H | L | H | L | H | L |
| FIRST ROW: NETWORK PATTERN VALUE | 04 | 05 | 06 | 07 | 08 | 09 | 0a | 0b | 0c | 0d | 0e | 0f | 10 | 11 | 12 | 13 |
| SECOND ROW: SELECT VALUE OUTPUT | 04 | 05 | 06 | 07 | 08 | 09 | 0a | 0b | 0c | 0d | 0e | 0f | 0 | 0c | 0 | 0 |
| THIRD ROW: REGISTER OFFSET SELEC-TION SIGNAL OUTPUT | 0 | 0 | 0 | 0 | 0 | 0 | 0 | 0 | 0 | 0 | 0 | 0 | 0 | 0 | 0 | 0 |

EACH NUMERICAL VALUE IS REPRESENTED IN HEXADECIMAL

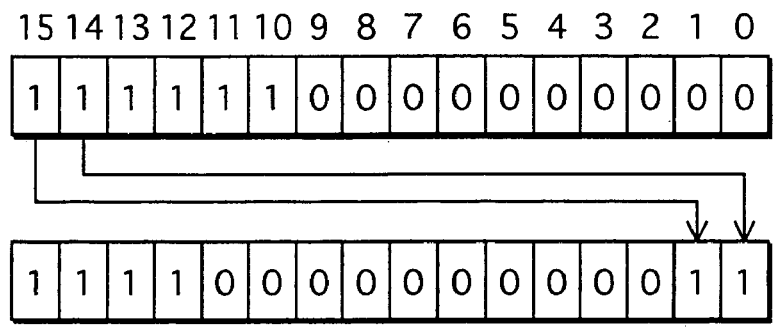
FIG.42A VARIATION −2 PE MODE 8PE ROTATE
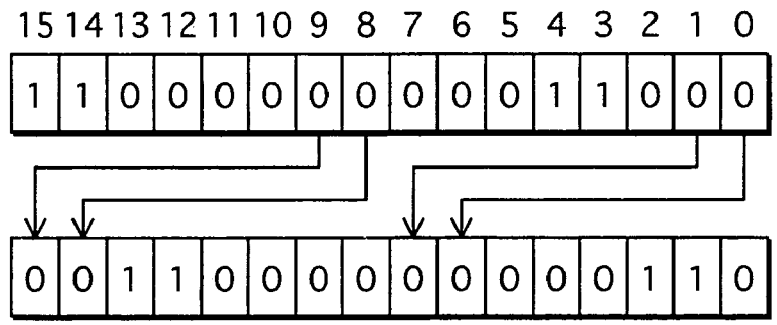
FIG.42B VARIATION 2 PE MODE 4PE ROTATE
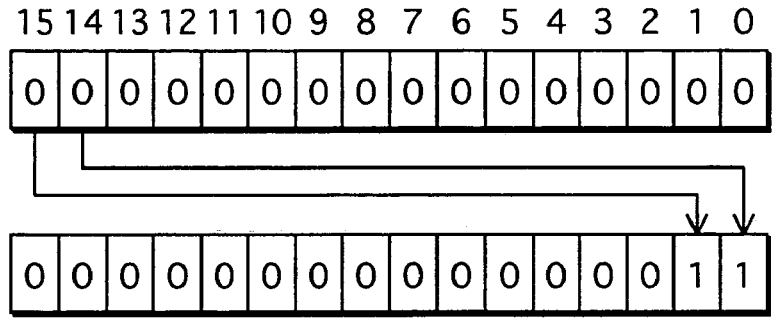
FIG.42C VARIATION −2 PE MODE 8PE INVERSION ROTATE
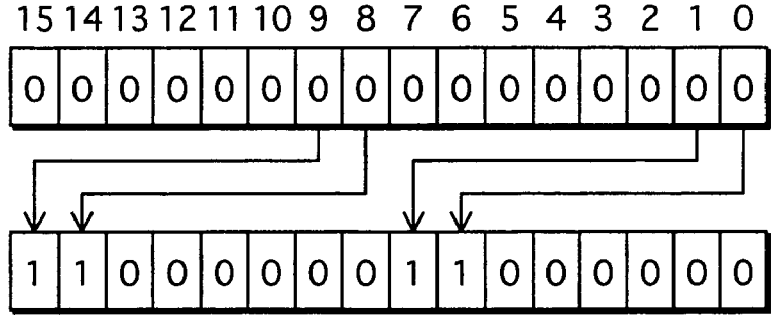
FIG.42D VARIATION 2 PE MODE 4PE INVERSION ROTATE

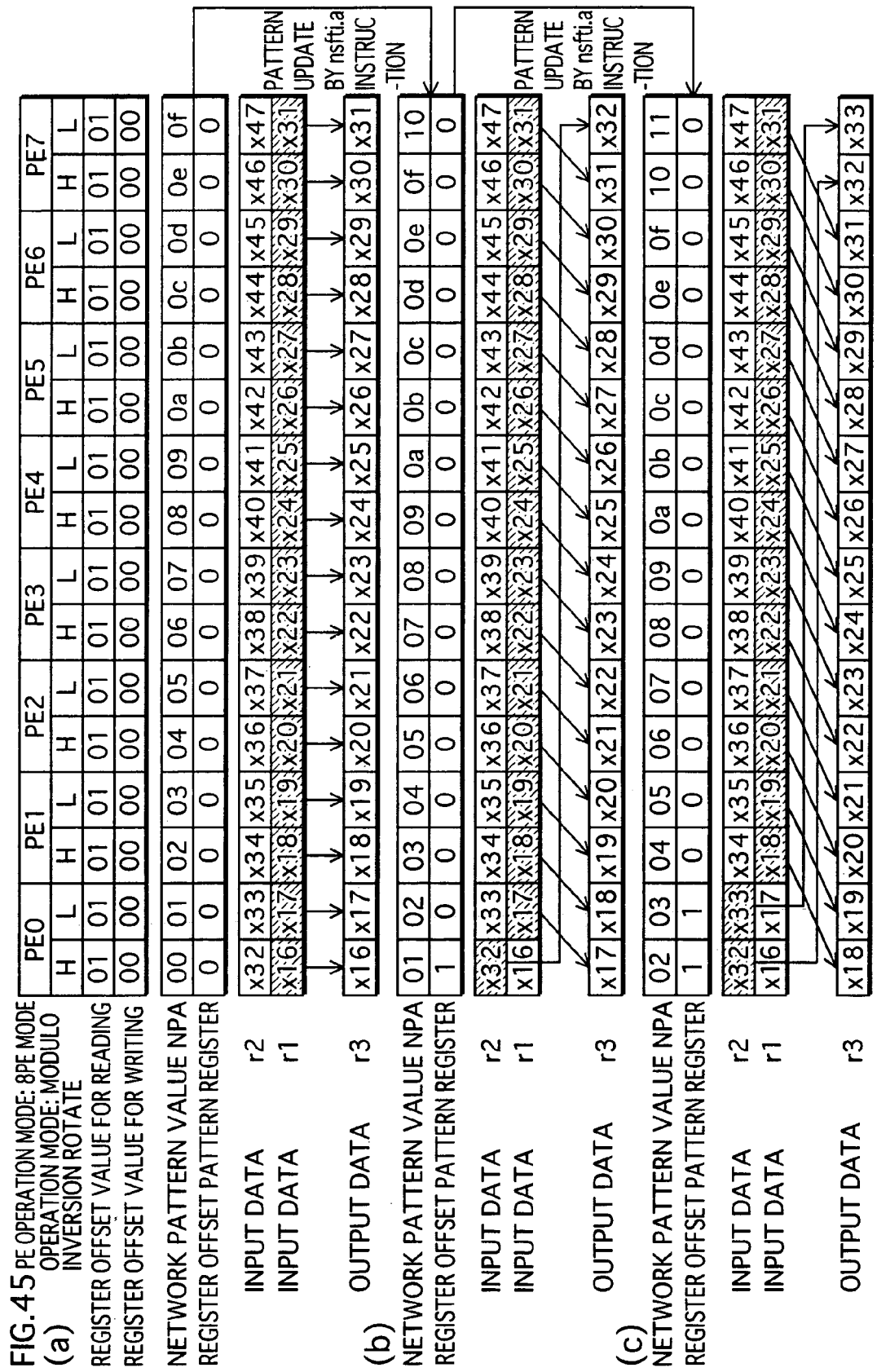

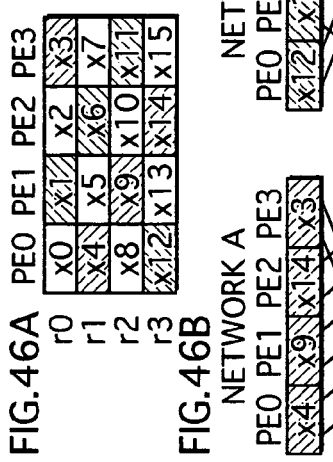
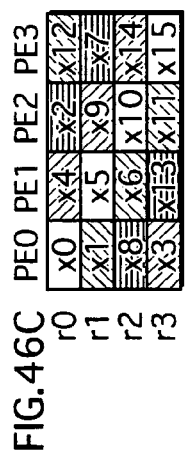
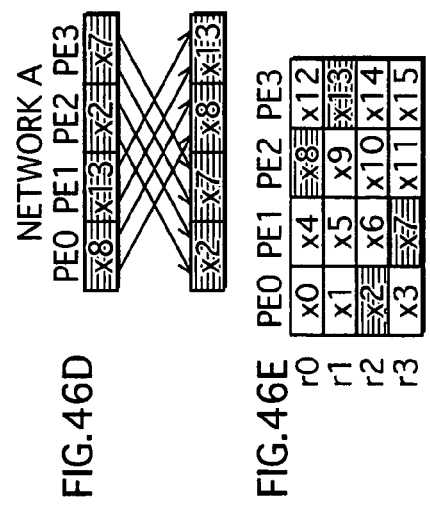
FIG.46A
FIG.46B
FIG.46C
FIG.46D
FIG.46E
FIG.46F
FIG.46G

FIG.47

(a) nsfti.a r2, r0, NPA, 0x01

(b) nsfti.a r2, r0, NPA, 0x01

FIG.48

(a) nsfti.a r3, r1, NPA, 0x01      nsftd.b r4, r1, NPB, 0x01

(b) nsfti.a r3, r1, NPA, 0x01      nsftd.b r4, r1, NPB, 0x01

(c) nsfti.a r3, r1, NPA, 0x01      nsftd.b r4, r1, NPB, 0x01

FIG.49

(a)   ntrpd.a r0, r0, NPA, 0x02    nsel.b r0, r0, NPB (b)         nsel.a r0, r0, NPA (c)   ntrpi.a r0, r0, NPA, 0x02

(d)         nsel.a r0, r0, NPA    nsel.b r0, r0, NPB

FIG.50

(a)  ntrpd.a r0, r0, NPA, 0x02    ntrpi.b r0, r0, NPB, 0x02

(b)  ntrpd.a r0, r0, NPA, 0x02    ntrpi.b r0, r0, NPB, 0x02

(c)  ntrpd.a r0, r0, NPA, 0x02    nsel.b r0, r0, NPB (d)          nsel.a r0, r0, NPA

PARALLEL OPERATION PROCESSOR UTILIZING SIMD DATA TRANSFERS

BACKGROUND OF THE INVENTION (1) Field of the Invention

The present invention relates to a parallel operation processor which is suited to process a large amount of data such as image data, audio data, or communication data.

(2) Description of the Related Art

In recent years, SIMD (Single Instruction stream Multiple Data Stream) processors have been widely used in the field of image, audio or communication processing. The SIMD processors have a plurality of processing elements and cause them to perform a parallel operation. To efficiently perform various processing such as image processing, it is important for such a SIMD processor to transfer data between the processing elements efficiently. Also, to perform a data transfer between two given processing elements, it is important how "network pattern values" are set. The "network pattern value" indicates, for each processing element, a processing element from which data is transferred. That is to say, the "network pattern value" indicates a data transfer pattern on a "processing element to processing element" basis.

Some conventional SIMD processors do not set the network pattern values by limiting the data transfers to, for example, only between adjacent processing elements, without performing data transfers between given processing elements. However, if data transfers between given processing elements are not performed freely, the restricted data transfer narrows down the application range of the SIMD processors, and deprives the SIMD processors of fully realizing the performance it provides for various purposes. Also, if data transfers between given processing elements can be performed freely, it is necessary to specify an immediate value, as a network pattern value, in an operand of an instruction to ensure free data transfers for each cycle. Here, suppose that 16 processing elements are provided in a SIMD processor, and that a network pattern value is to be indicated using a four-bit processing element number. It is then necessary to specify an eight-byte (=4×16 bits) immediate value in an operand of an instruction. This requires a transfer instruction having an eight-byte immediate value to be input to the SIMD processor each time the transfer pattern changes. For this reason, conventional SIMD processors require a large size of code to be programmed. This has increased the size of the memory for storing the program.

SUMMARY OF THE INVENTION

The object of the present invention is therefore to provide a processor that provides high performance while reducing the size of code to be programmed for the processes performed by a SIMD processor.

The above object is fulfilled by a processor comprising a plurality of processing elements and a decoder operable to decode an instruction, wherein each of the plurality of processing elements includes: a transfer pattern storage unit operable to store a transfer pattern value that indicates a processing element from which data is transferred; a transfer unit operable to perform a data transfer from the processing element indicated by the transfer pattern value; and an update unit operable to update the transfer pattern value stored in the transfer pattern storage unit, in accordance with a result of decoding a latest instruction by the decoder.

With the above-stated construction, the present invention enables a value indicating a transfer pattern to be updated in accordance with the instruction. This eliminates the need to provide an operand of an instruction with an immediate value indicating a transfer pattern each time a data transfer is performed, reducing the size of code to be programmed for the SIMD processor. Also, since a data transfer between processing elements is executed based on a transfer pattern, a data transfer between any given processing elements becomes possible.

In the above-described processor, each of the plurality of processing elements may further include a register set composed of a plurality of registers, and the data is a value stored in one of the plurality of registers of the register set.

In the above-described processor, the register set may output data stored in one of the plurality of registers thereof in accordance with a predetermined offset signal, the update unit performs, during the updating of the transfer pattern value, an arithmetic operation using the transfer pattern value, and the predetermined offset signal changes in accordance with a digit shift that is caused in the arithmetic operation performed by the update unit.

With the above-stated construction, when, for example, the register set composed of the plurality of registers is composed of 16 registers, r0 to r15, and when pixel data arranged in the horizontal direction are stored in r0 and r1, it is possible to efficiently transfer pixels that are stored with folding back.

In the above-described processor, the update unit may include an arithmetic operation unit and a saturate operation unit, the saturate operation unit judges whether a result of an arithmetic operation performed by the arithmetic operation unit is outside a predetermined range, and upon judging that the result of the arithmetic operation is outside the predetermined range, performs a saturate operation on the transfer pattern value, and the transfer pattern value having been updated by the update unit is a result of either the arithmetic operation or the saturate operation.

In the above-described processor, the update unit may include an output unit that, during the saturate operation, output a first value as a saturate value if the transfer pattern value is greater than the predetermined range, and output a second value as the saturate value if the transfer pattern value is smaller than the predetermined range.

In the above-described processor, the predetermined range may be a range of the number that indicates the processing element, the first value is a maximum value of the number that indicates the processing element, and the second value is a minimum value of the number that indicates the processing element.

With the above-stated construction, it is possible to perform FIR (Finite Impulse Response) filter operation at the edges of the screen in a suitable manner.

In the above-described processor, the saturate operation unit may further receive a predetermined maximum value and a predetermined minimum value during the saturate operation, the predetermined range is defined by the predetermined maximum value and the predetermined minimum value, the first value is the predetermined maximum value, and the second value is the predetermined minimum value.

With the above-stated construction, it is possible to perform a FIR filter process or the like on images with various sizes.

In the above-described processor, the saturate operation unit may further receive a predetermined maximum value and a predetermined minimum value during the saturate operation, the predetermined range is defined by the predetermined maximum value and the predetermined minimum value, the first value is obtained from a first formula, and the second value is obtained from a second formula.

With the above-stated construction, it is possible to fold back data at the edges of the screen, making it possible for the FIR filter operation to be performed to improve the image quality.

In the above-described processor, each register in the register set may store two pieces of 1-byte data which are higher bit side and lower bit side, respectively, the saturate operation unit judges, for each of the higher bit side 1-byte data and the lower bit side 1-byte data, whether a result of an arithmetic operation performed by the arithmetic operation unit is outside a predetermined range, and upon judging that the result of the arithmetic operation is outside the predetermined range, simultaneously performs saturate operations on the higher bit side 1-byte data and the lower bit side 1-byte data, and the output unit outputs two different saturate values.

With the above-stated construction, when the higher bit side 1-byte data and the lower bit side 1-byte data exceed the maximum value, these values are rounded to different values, respectively. With such a construction, when, for example, a red color difference and a blue color difference are respectively stored in the higher bit side register and the lower bit side register, it is possible to assign different values to the processing element.

In the above-described processor, the update unit may include an arithmetic operation unit and a modulo operation unit that is operable to perform a modulo operation, the modulo operation unit judges whether a result of an arithmetic operation performed by the arithmetic operation unit is outside a predetermined range of the transfer pattern value, and upon judging that the result of the arithmetic operation is outside the predetermined range, performs a modulo operation on the transfer pattern value, and the transfer pattern value having been updated by the update unit is a result of either the arithmetic operation or the modulo operation.

In the above-described processor, each of the plurality of processing elements may include: a first varying unit operable to vary a read offset value by performing a modulo operation on the read offset value; and a second varying unit operable to vary a write offset value by performing a modulo operation on the write offset value, the register set reads data from one of the plurality of registers thereof in accordance with the read offset value, and writes data to one of the plurality of registers thereof in accordance with the write offset value.

With the above-stated construction, it is possible to achieve a data transposition in a matrix without using the specification of an immediate value.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 7 shows the structure of the select processing units 50 of the network 30a;

FIG. 9 shows an operation outline of the register offset selection operation unit when the PE mode signal is specifying the 8PE mode;

FIG. 10 shows an operation outline of the register offset selection operation unit when the PE mode signal is specifying the 4PE mode;

FIG. 11 shows an operation outline of the modulo operation unit when the PE mode signal is specifying the 8PE mode;

FIG. 12 shows an operation outline of the modulo operation unit when the PE mode signal is specifying the 4PE mode;

FIG. 13 shows an operation outline of the saturate operation unit when the PE mode signal is specifying the 8PE mode;

FIG. 14 shows an operation outline of the saturate operation unit when the PE mode signal is specifying the 4PE mode;

FIG. 15 is a circuit diagram of FIG. 8;

FIG. 16 shows connections between the select processing units 50 and the register number converting units 20;

FIG. 23 shows the operation of the network shift instruction (nsftd.b instruction);

FIGS. 30A-30D show how data are transposed in a 8×8 matrix;

FIGS. 31E-31G show how data are transposed in a 8×8 matrix;

FIGS. 32H-32J show how data are transposed in a 8×8 matrix;

FIGS. 33K-33M show how data are transposed in a 8×8 matrix;

FIG. 35 shows the operation of the saturate operation unit when the PE mode signal is specifying the 8PE mode;

FIG. 36 shows the operation of the saturate operation unit when the PE mode signal is specifying the 4PE mode;

FIG. 38 shows the operation of the saturate operation unit 63 when the PE mode signal is specifying the 8PE mode;

FIGS. 42A-42D show the operation of the rotate operation unit;

FIG. 45 shows an operation of the network select instruction;

FIGS. 46A-46G show how data are transposed;

FIG. 47 shows an instruction sequence;

FIG. 48 shows an instruction sequence for FIR filter operations;

FIG. 49 shows an instruction sequence for performing the transposition operation in a 4×4 matrix; and FIG. 50 shows an instruction sequence for performing the transposition operation in a 8×8 matrix.

DESCRIPTION OF THE PREFERRED EMBODIMENT

The following describes embodiments of a parallel operation processor of the present invention.

Embodiment 1

Figure 1:
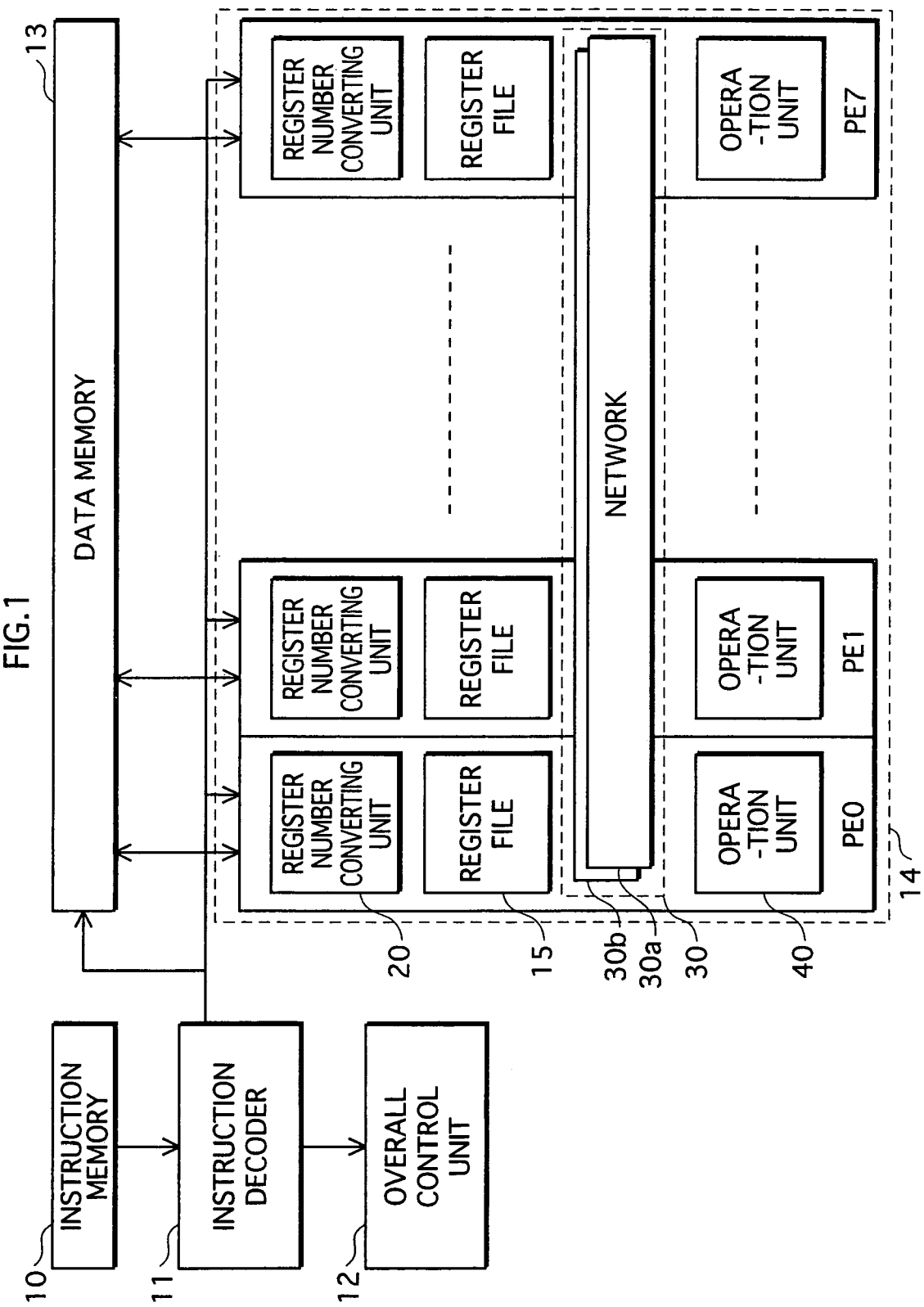
FIG. 1 shows the overall structure of a parallel operation processor of the present invention.

FIG. 1 shows the overall structure of a parallel operation processor of the present invention. As shown in FIG. 1, the parallel operation processor includes an instruction memory 10, an instruction decoder 11, an overall control unit 12, a data memory 13, and a processing element group 14.

Figure 2:
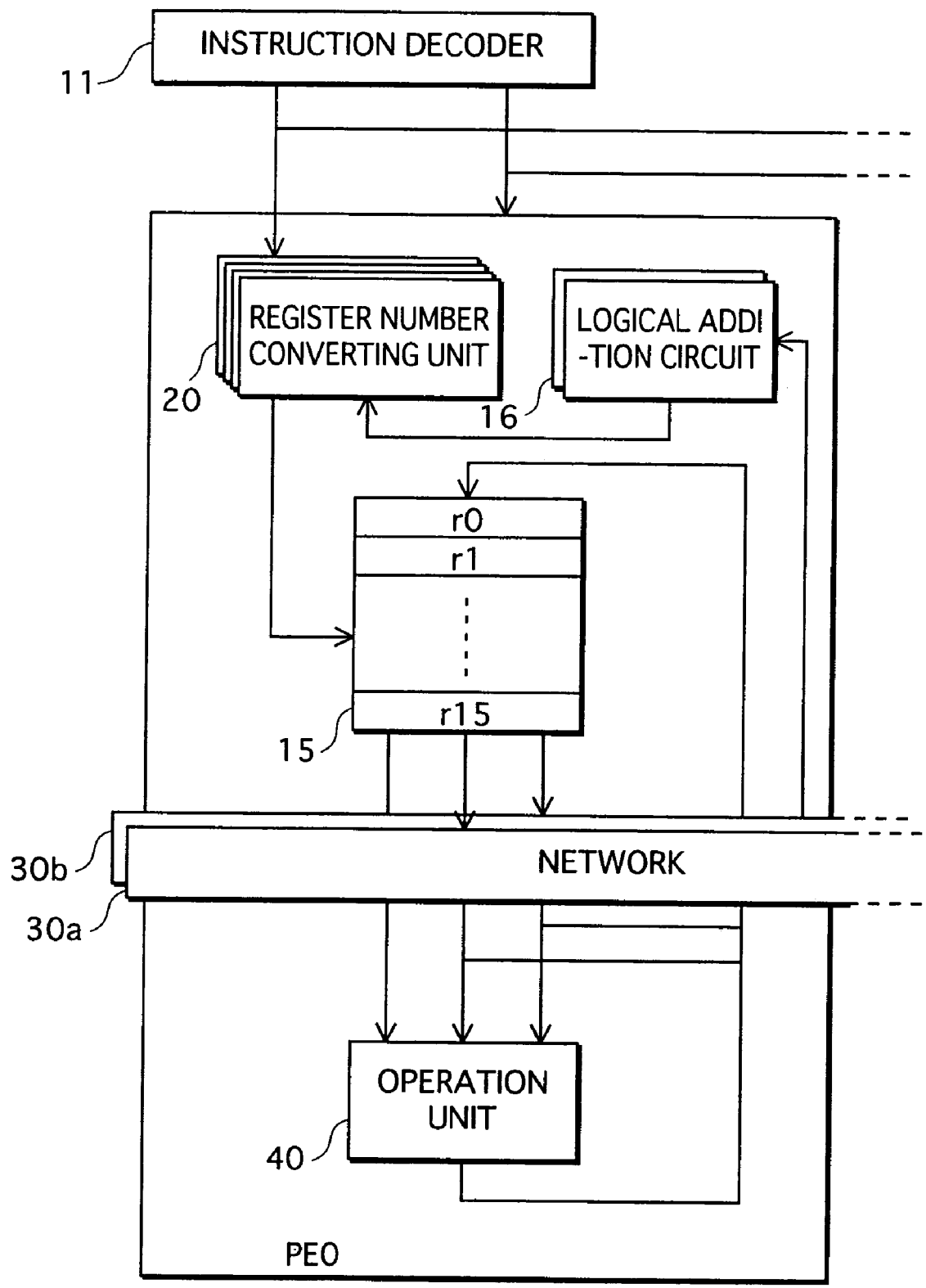
FIG. 2 shows the internal structure of processing element PE0.

FIG. 2 shows the internal structure of processing element PE0 that belongs to the processing element group 14. The description of the structure of the other elements belonging to the processing element group 14 is omitted here since they have the same structure as the processing element PE0. As shown in FIG. 2, the processing element PE0 includes a register number converting unit 20, a register file 15, a logical addition circuit 16, a network 30a via which processing elements are interconnected, a network 30b via which processing elements are interconnected, and an operation unit 40.

The parallel operation processor shown in FIG. 1 has a SIMD-type structure, and it reads a program from the instruction memory 10, causes the instruction decoder 11 to decodes instructions, and generates, from the decoding results, control signals for controlling all the processing elements. Operations such as a branch that affect all the processing elements are executed by the overall control unit 12. The network 30 for interconnecting the processing elements and transferring data includes two networks 30a and 30b, enabling data to be transferred among the processing elements belonging to the processing element group 14.

The processing element PE0 reads data from or writes data to the register file 15 using a register number specified in an operand, or a register number that has been converted from another register number by the register number converting unit 20. As apparent from this, the parallel operation processor of the present invention, though having the SIMD structure, allows a plurality of processing elements to respectively access a different register.

Now, each component unit of the processing element PE0 will be described in detail.

The register number converting unit 20 converts register numbers as necessary.

The register file 15 outputs data read from registers thereof. The register file 15 includes 16 registers: r0-r15. Each register is 16 bits in bit width.

The logical addition circuit 16, upon receiving a signal output from the network 30, performs a logical addition, and outputs a register offset selection signal to the register number converting unit 20.

The network 30 performs an arithmetic operation using data output from the register file 15, and outputs the operation's result to the register file 15.

The operation unit 40 performs an arithmetic operation using data output from the register file 15 or the network 30, and outputs the operation's result to the register file 15 or the network 30.

Figure 3:
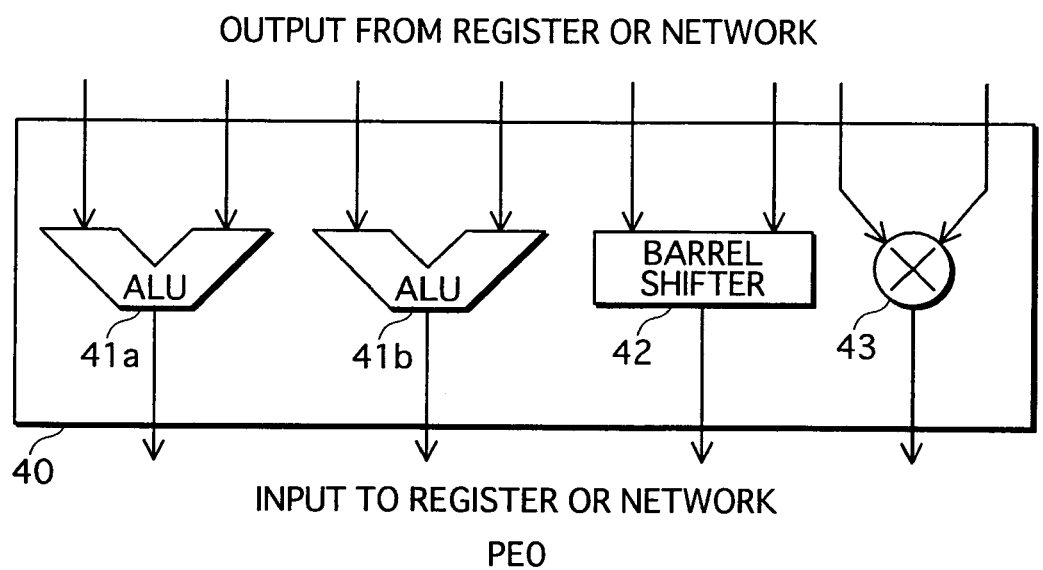
FIG. 3 shows a sample structure of the operation unit 40.

FIG. 3 shows a sample structure of the operation unit 40. As shown in FIG. 3, the operation unit 40 includes an arithmetic logic unit (ALU) 41a, an ALU 41b, a barrel shifter 42, and a multiplier 43.

The ALUs 41a and 41b perform addition, subtraction, AND operation (logical multiplication), OR operation (logical addition) or the like.

The barrel shifter 42 performs shifting.

The multiplier 43 performs multiplication, division or the like.

The operation unit 40 may be constructed so that data can be mutually input and output among the arithmetic operation units thereof. The construction of the operation unit 40 maybe freely determined so as to conform to the usage.

Figure 4:
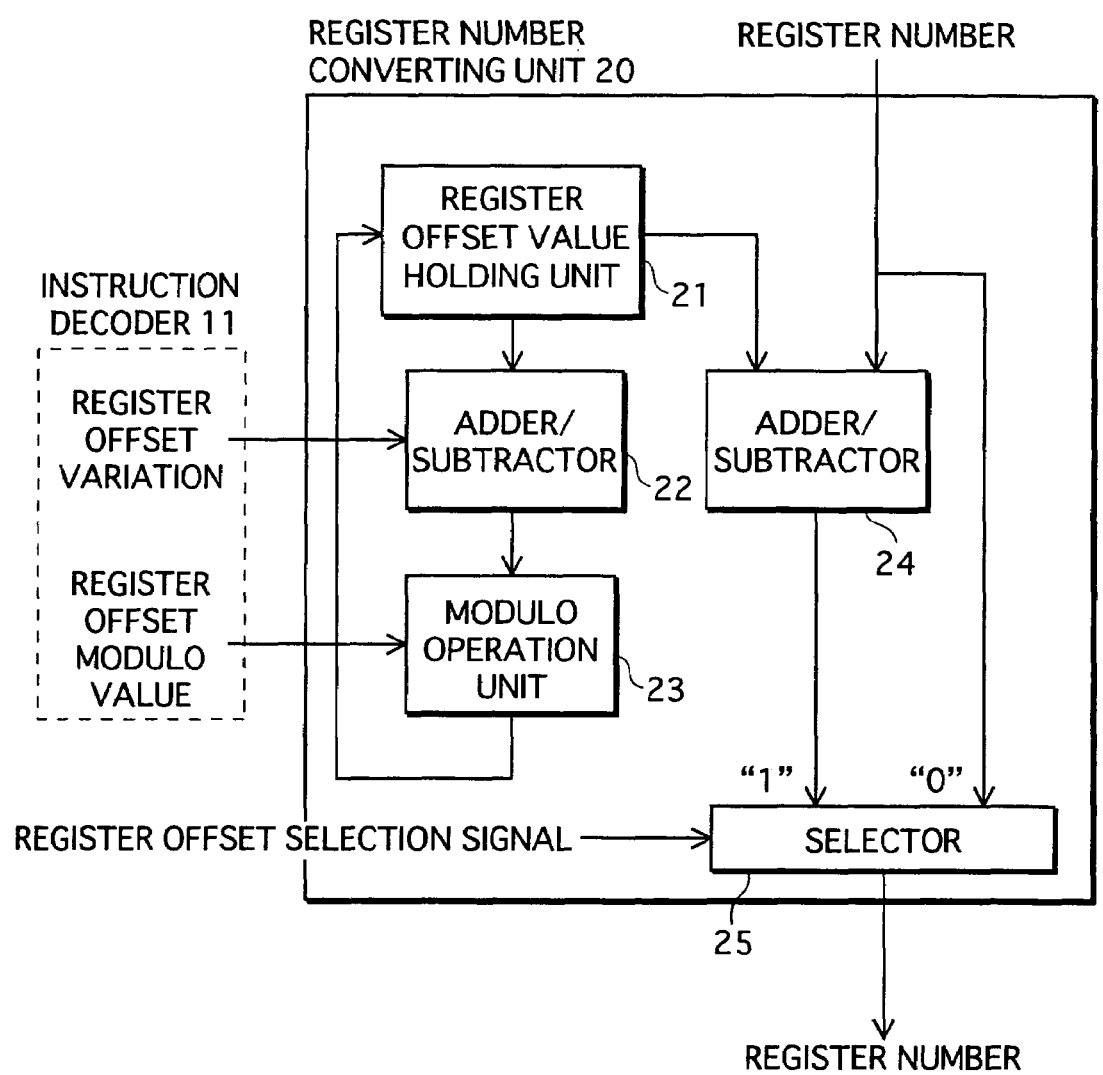
FIG. 4 shows the structure of the register number converting unit 20.

Now, the structure of the register number converting unit 20 will be described. FIG. 4 shows the structure of the register number converting unit 20. As shown in FIG. 4, the register number converting unit 20 includes a register offset value holding unit 21, an adder/subtractor 22, a modulo operation unit 23, an adder/subtractor 24, and a selector 25. It should be noted here that the "register offset value" is a value that indicates a difference between (i) a register number that is written in a program and is received from the instruction decoder 11 and (ii) a register number that is actually read or written by a processing element.

The register offset value holding unit 21 is a register for holding a register offset value, and the value held by it can be rewritten by a program.

The adder/subtractor 22, as necessary, adds up (i) a value indicating a variation of a register offset value output from the instruction decoder 11 and (ii) a value held by the register offset value holding unit 21, or performs a subtraction between the values (i) and (ii) above, and outputs the operation's result to the modulo operation unit 23.

The modulo operation unit 23 performs a modulo operation using the operation's result output from the adder/subtractor 22 and a register offset modulo value output from the instruction decoder 11, and outputs the operation's result to the register offset value holding unit 21. This enables the register offset value to be updated. If the register offset value is not to be updated, neither the adder/subtractor 22 nor the network 30 operates.

The adder/subtractor 24 adds up (i) a register number output from the instruction decoder 11 and (ii) a value held by the register offset value holding unit 21, or performs a subtraction between the values (i) and (ii) above, and outputs only an effective register number. More specifically, the adder/subtractor 24 outputs only the lower four bits of the addition/subtraction result if the result does not fall within a range from value "0" to value "15".

The selector 25 outputs either a register number described in the program or a value output from the adder/subtractor 24 according to the register offset selection signal. More specifically, the selector 25 outputs, as a register number, the register number described in the program if the register offset selection signal is "0", and outputs, as a register number, the value output from the adder/subtractor 24 if the register offset selection signal is "1". In the present embodiment, the register offset selection signal is used only for a register number to be read, and is always "1" for a register number to be written.

It should be noted here that although as many register number converting units 20 as the number of registers to be read and/or written may be included, the number of register number converting units 20 may be restricted. In the present embodiment, accesses are made in units of bytes, and at least eight register number converting units 20 are included in each processing element since the register number converting units 20 are used in inputs/outputs with the two networks.

Figure 5:
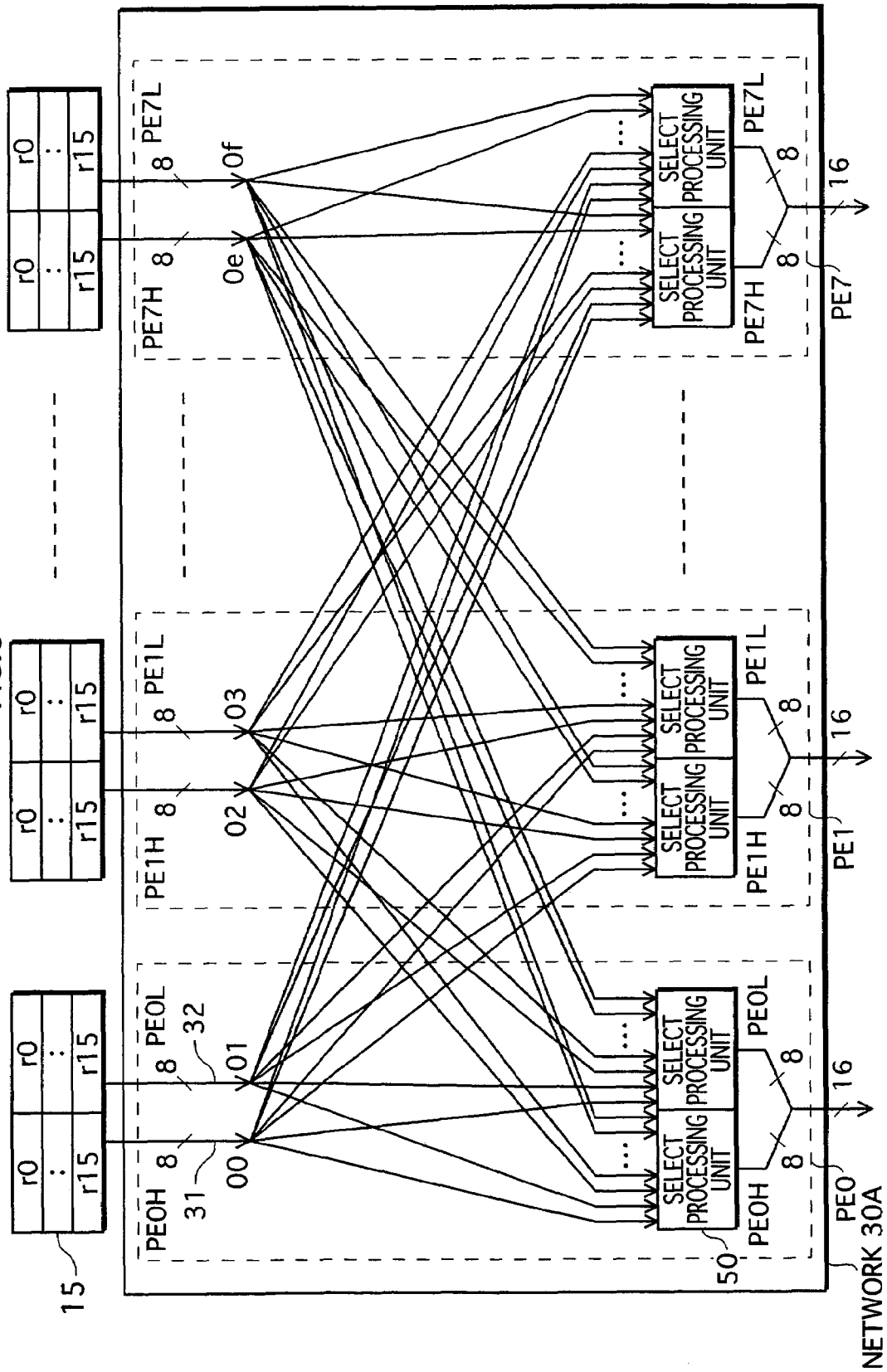
FIG. 5 shows the structure of the network 30a that interconnects the processing elements.

Now, how the network 30 is structured will be described. Here, since both the network 30a and the network 30b have the same structure, only the structure of the network 30a will be described. FIG. 5 shows the structure of the network 30a that interconnects the processing elements. As shown in FIG. 5, the network 30a includes input terminals 31, input terminals 32, and select processing units 50. In the following description, eight MSBs (Most Significant Bits) of data processed in a processing element are represented by "H", as in "PE0H" for example, and eight LSBs (Least Significant Bits) of data processed in a processing element are represented by "L", as in "PE0L" for example. Each of such end values of inputs is assigned with a value in the hexadecimal format. The hexadecimal numbers assigned to the end values are: 0x00, 0x01, 0x02, 0x003 0x04, 0x05, 0x06, 0x07, 0x08, 0x09, 0x0a, 0x0b, 0x0c, 0x0d, 0x0e, and 0x0f, in the order from PE0H.

The input terminals 31 are used to take in input signals. More specifically, each input terminal 31 takes eight MSBs read from a register file 15 into the network 30a. Each of the taken-in eight MSBs is output to each select processing unit in all the processing elements.

The input terminals 32 are used to take in input signals. More specifically, each input terminal 32 takes eight LSBs read from a register file 15 into the network 30a. Each of the taken-in eight LSBs is output to each select processing unit in all the processing elements.

As shown in FIG. 5 (although the illustration is partially omitted), the data input through the input terminal 31 for PE0H is output to all the select processing units, namely, PE0H-PE7H and PE0L-PE7L.

The select processing units 50 each select one piece from 16 pieces of input data, and outputs the selected piece of data. Further, the outputs of each pair of select processing units (for example, PE0H and PE0L) are combined and are output as one piece of 16-bit data.

Figure 6:
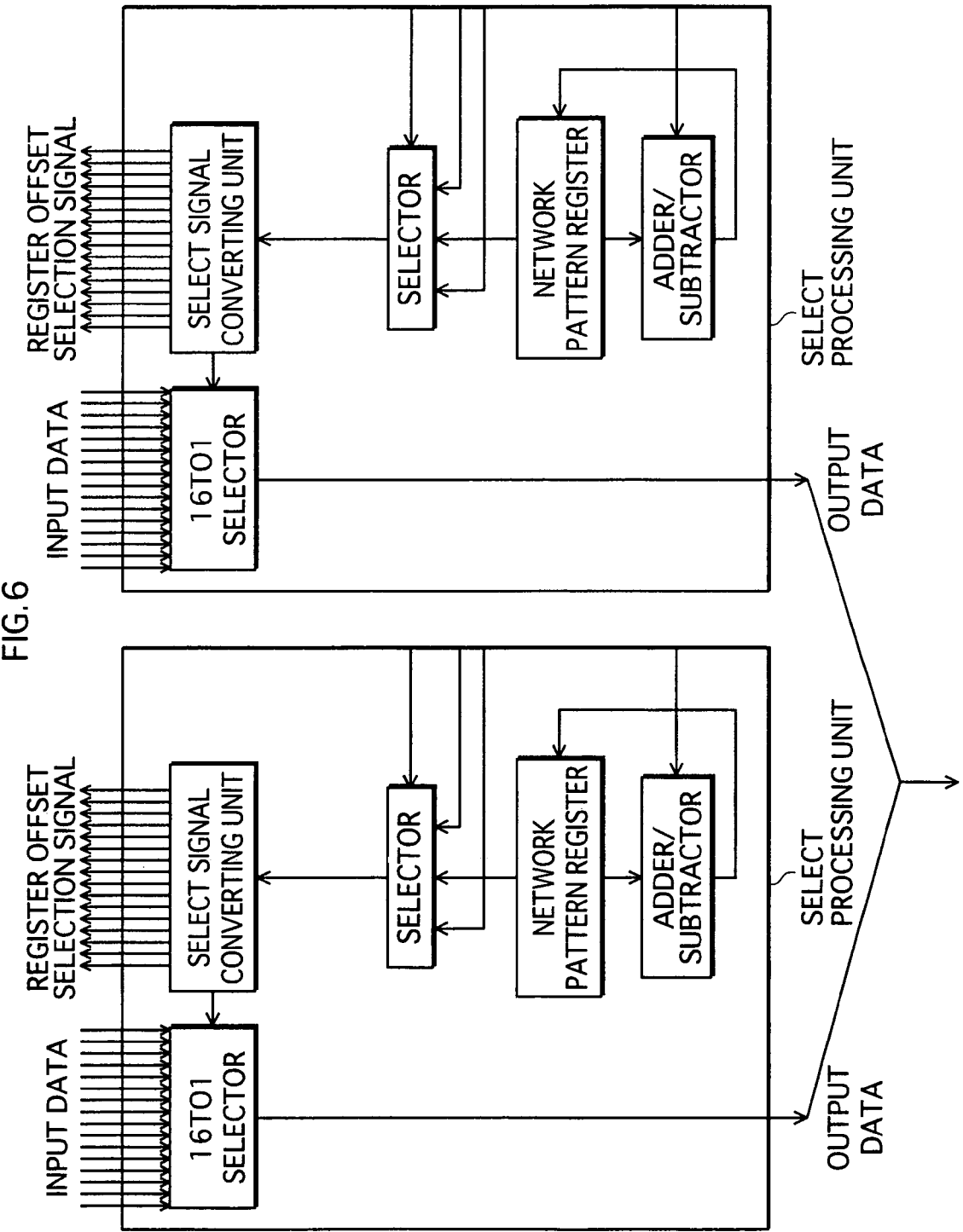
FIG. 6 shows a partial structure of the network 30a, with a detailed internal structure of the select processing units 50 shown in FIG. 5.
Figure 7:
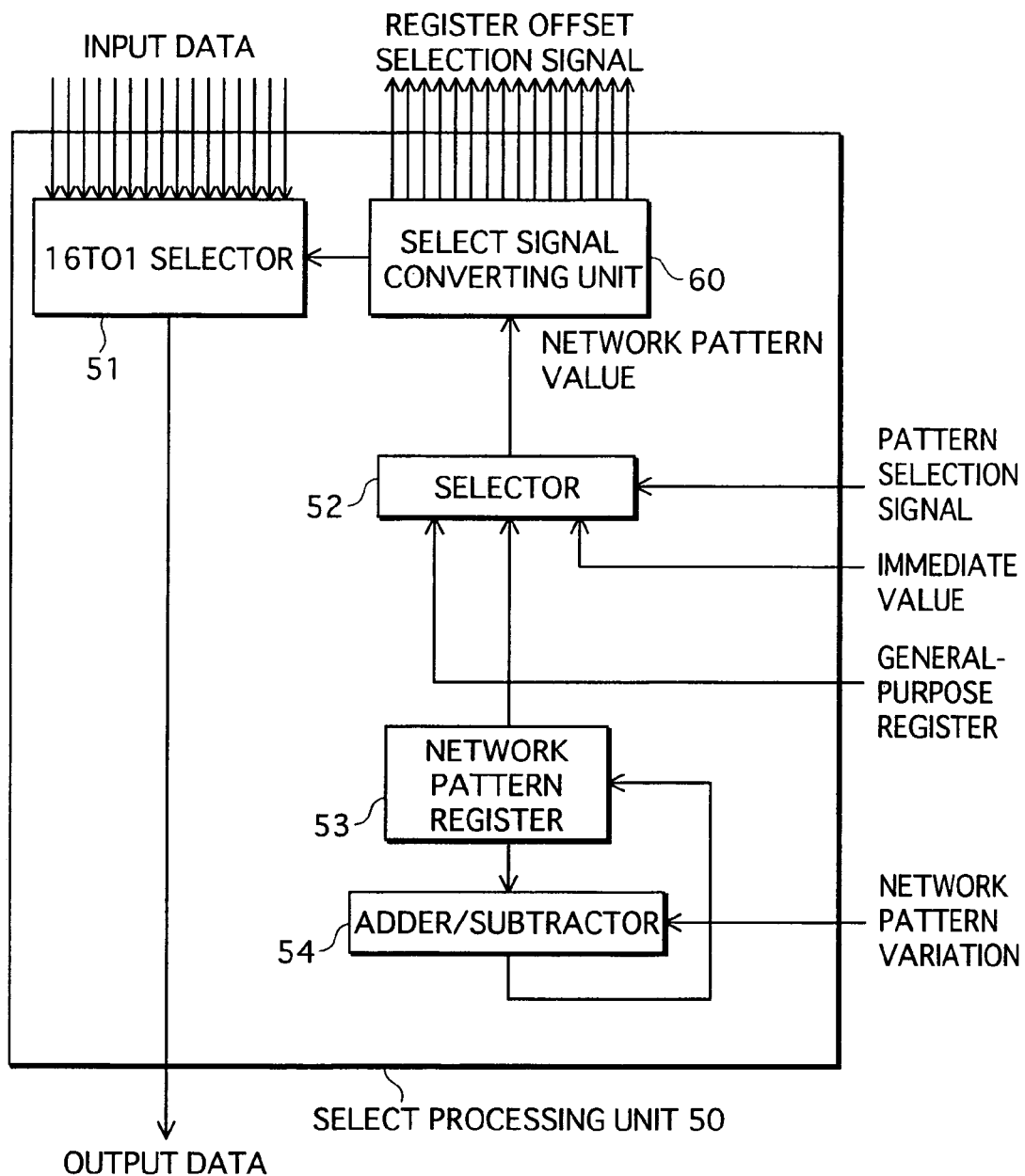

FIG. 6 shows a partial structure of the network 30a, with a detailed internal structure of the select processing units 50 shown in FIG. 5. As shown in FIG. 6, a plurality of select processing units having the same structure are arranged in the network 30a. FIG. 7 shows one of such select processing units.

FIG. 7 shows the structure of the select processing units 50 of the network 30a. As shown in FIG. 7, the select processing unit 50 includes a "16 to 1" selector 51, a select signal converting unit 60, a selector 52, a network pattern register 53, and an adder/subtractor 54.

The 16 to 1 selector 51 selects one from a plurality of pieces of input data according to the select signal output from the select signal converting unit 60, and outputs the selected piece of data. The select signal carries one of the end values 0x00 to 0x0f of the network 30a. The 16 to 1 selector 51 outputs a piece of input data that has the same number as a control signal.

The select signal converting unit 60 receives a network pattern value, and generates, from the received network pattern value, a register offset selection signal and the control signal for controlling the 16 to 1 selector 51. The select signal converting unit 60 outputs the control signal to the 16 to 1 selector 51, and the register offset selection signal to the register number converting unit 20.

The selector 52 selects a network pattern value to be output to the select signal converting unit 60. More specifically, the selector 52 selects one, according to an instruction, among an immediate value described in the program, a value held by a register with a specified register number, and a value held by the network pattern register 53.

The network pattern register 53 is a register for holding a network pattern value used to control the 16 to 1 selector 51. Here, the network pattern value indicates a value of a control signal for controlling the 16 to 1 selector 51.

The adder/subtractor 54, as necessary, adds up (i) a value held by the network pattern register 53 and (ii) a network pattern value variation input from outside, or performs a subtraction between the values (i) and (ii) above, and stores the operation's result into the network pattern register 53. This enables the network pattern value to be updated. If the network pattern value is not to be updated, the adder/subtractor 54 does not operate.

As shown in FIGS. 5, 6 and 7, each select processing unit is provided with a network pattern register, and there are 16 network pattern registers as a whole. It is possible to update all the network pattern values held by the network pattern registers all at once by specifying a network pattern value variation in an operand of an instruction.

Figure 8:
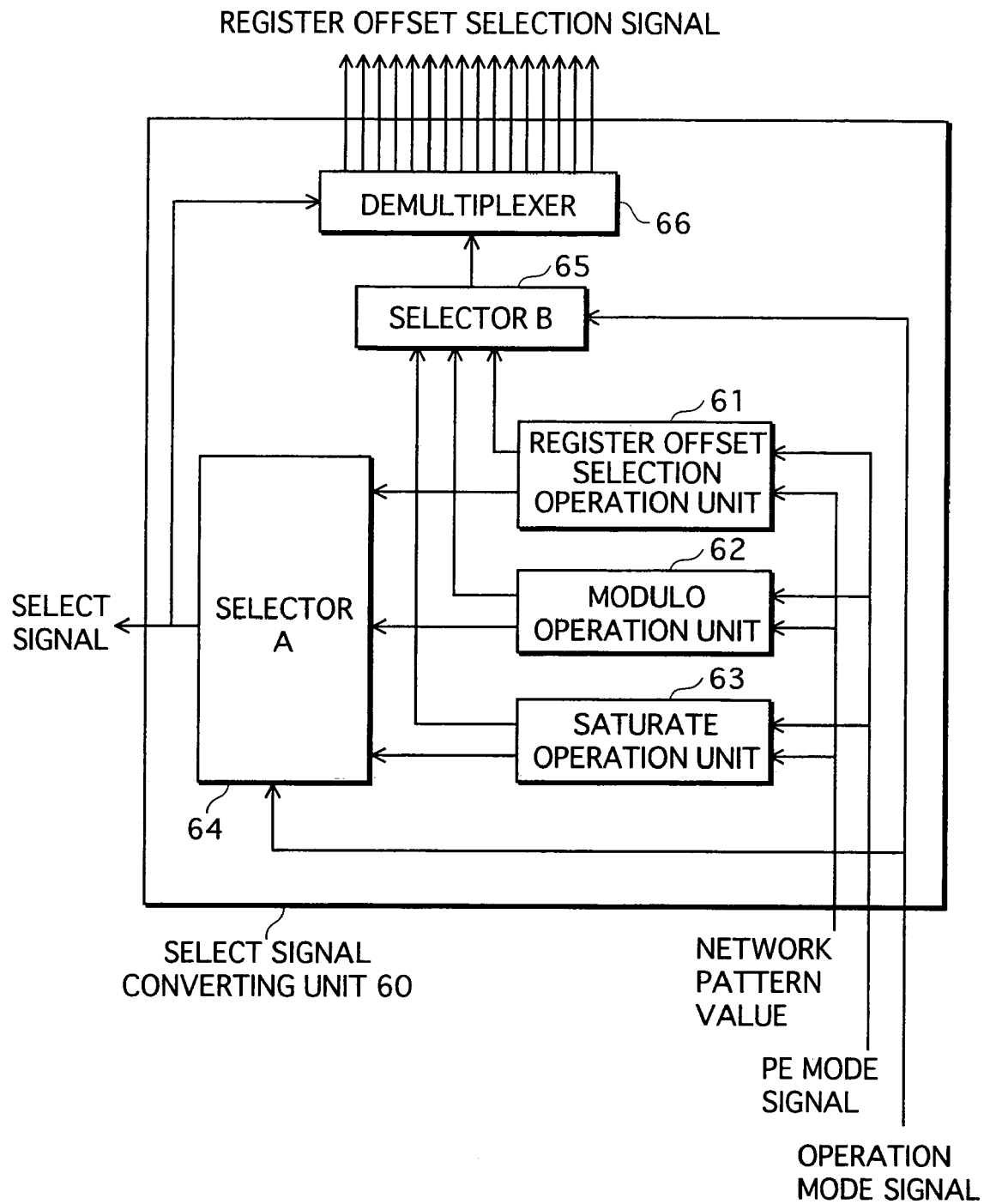
FIG. 8 shows the structure of the select signal converting unit 60.

Now, the structure of the select signal converting unit 60 will be described. FIG. 8 shows the structure of the select signal converting unit 60. As shown in FIG. 8, the select signal converting unit 60 includes a register offset selection operation unit 61, a modulo operation unit 62, a saturate operation unit 63, a selector A 64, a selector B 65, and a demultiplexer 66.

The PE mode signal shown in FIG. 8 specifies either the 8PE mode or the 4PE mode, and is output from the instruction decoder 11. Each of the register offset selection operation unit 61, modulo operation unit 62, and saturate operation unit 63 operates differently depending on the mode. The operation mode signal shown in FIG. 8 specifies one of the register offset selection mode, modulo mode, and saturate mode, and is output from the instruction decoder 11 to the selector A 64 and the selector B 65, where the operation mode signal becomes one of the options for the control signal to be output to the 16 to 1 selector 51 and the demultiplexer 66, respectively.

The register offset selection operation unit 61, upon receiving a network pattern value, performs a register offset selection operation, and outputs a select signal and a register offset selection signal. When the PE mode signal is specifying the 8PE mode, the lower four bits of the network pattern value are used for the select signal, and the fifth bit is used for the register offset selection signal. When the PE mode signal is specifying the 4PE mode, for PE0-PE3, the lower three bits of the network pattern value are used as the lower three bits of the select signal, and the fourth bit of the select signal is "0" in the case of PE0-PE3, and is "1" in the case of PE4-PE7. This indicates that the select signal in the case of PE4-PE7 represents a value obtained by adding "8" to a value composed of the lower three bits of the network pattern value. Also, when the PE mode signal is specifying the 4PE mode, the fourth bit of the network pattern value is used for the register offset selection signal. That is to say, in the 4PE mode, a data transfer occurs among the processing elements PE0-PE3 or among the processing elements PE4-PE7.

Here, the operation of the register offset selection operation unit 61 will be described in detail. FIG. 9 shows an operation outline when the PE mode signal is specifying the 8PE mode. In FIG. 9, "PE0" to "PE7" indicate processing element numbers, and "H" and "L", which stand for "high" and "low", suggest that each processing element stores pixel values in units of half words. These signs therefore identify the processing elements and "high" or "low" thereof. In FIG. 9, the first row shows network pattern values, the second row shows select signal outputs, and the third row shows register offset selection signal outputs. Here, in the network pattern values, the tens digit indicates whether or not a register offset value is used. If the tens digit is "0", it indicates that a register offset value is not used. If the tens digit is "1", it indicates that a register offset value is used. Also, the units digit of each network pattern value indicates a processing element and high or low thereof from which data is fetched. In the 8PE mode, each select signal output takes a value ranging from 0x00 to 0x0f. Accordingly, if, for example, a network pattern value is 0x00, the select signal output is 0x00, and data is fetched from PE0H. Also, in this case, the register offset is not used, and therefore the register offset selection signal output is "0". Similarly, if a network pattern value is 0x01, the select signal output is 0x01, data is fetched from PE0L, and since the register offset is not used, the register offset selection signal output is "0". Also, if a network pattern value is 0x10, the select signal output is 0x00, data is fetched from PE0H, and the register offset selection signal output is "1". Also,if a network pattern value is 0xff, the select signal output is 0x0f, data is fetched from PE0L, and the register offset selection signal output is "1".

In FIG. 9(a), since all the network pattern values are within a range from 0x00 to 0x0f, when the register offset selection operation unit 61 uses the lower four bits of the network pattern values as the select signals, the select signal outputs are equal to the network pattern values, and the register offset selection signal outputs are all "0". In FIG. 9(b), the network pattern values are greater than the corresponding network pattern values of FIG. 9(a) by "2", respectively. The above-stated comments on FIG. 9(a) also apply to the values in FIG. 9(b) when the network pattern values are within a range from 0x00 to 0x0f. When the network pattern values are greater than 0x0f, the register offset selection operation unit 61 uses the lower four bits of the network pattern values as the select signals, and the register offset selection signal outputs are "1". In FIG. 9(c), the network pattern values are smaller than the corresponding network pattern values of FIG. 9(a) by "2", respectively. The above-stated comments on FIG. 9(a) also apply to the values in FIG. 9(c) when the network pattern values are within a range from 0x00 to 0x0f. When the network pattern values are smaller than 0x00, the register offset selection operation unit 61 uses the lower four bits of the network pattern values as the select signals, and the register offset selection signal outputs are "1".

FIG. 10 shows an operation outline when the PE mode signal is specifying the 4PE mode. In FIG. 10, "PE0" to "PE7" indicate processing element numbers, and "H" and "L" suggest that each processing element stores pixel values in units of half words. In FIG. 10, the first row shows network pattern values, the second row shows select signal outputs, and the third row shows register offset selection signal outputs. Here, in the 4PE mode, different from the case with the 8PE mode, when the network pattern values are within a range from 0x00 to 0x07, the register offset values are not used, and the register offset selection signal outputs are "0". Also, when the network pattern values are smaller than 0x00 or greater than 0x07, the register offset values are used, and the register offset selection signal outputs are "1". Also, the select signal outputs take values within a range from 0x00 to 0x07 for the processing elements PE0-PE3, and take values within a range from 0x08 to 0x0f for the processing elements PE4-PE7. Accordingly, if, for example, a network pattern value is 0x08 for any of the processing elements PE0-PE3, the select signal output is 0x00, and data is fetched from PE0H. Also, in this case, the register offset selection signal output is "1".

In FIG. 10(a), since all the network pattern values are within a range from 0x00 to 0x07, when the register offset selection operation unit 61 uses the lower three bits of the network pattern values as the select signals, the select signal outputs are equal to the network pattern values for the processing elements PE0-PE3, and the register offset selection signal outputs are all "0". For the processing elements PE4-PE7, the select signals represent values that are each a value obtained by adding "8" to a value composed of the lower three bits of the network pattern value, and the register offset selection signal outputs are all "0". In FIG. 10(b), the network pattern values are greater than the corresponding network pattern values of FIG. 10(a) by "1", respectively. The above-stated comments on FIG. 10(a) also apply to the values in FIG. 10(b) when the network pattern values are within a range from 0x00 to 0x07. For the processing elements PE0-PE3, when the network pattern values are greater than 0x07, the register offset selection operation unit 61 uses the lower three bits of the network pattern values as the select signals, the fourth bit is "0", and the register offset selection signal outputs are "0". For the processing elements PE4-PE7, when the network pattern values are greater than 0x07, the register offset selection operation unit 61 uses the lower three bits of the network pattern values as the select signals, the fourth bit is "1", and the register offset selection signal outputs are "1". In FIG. 10(c), the network pattern values are smaller than the corresponding network pattern values of FIG. 10(a) by "2", respectively. The above-stated comments on FIG. 10(a) also apply to the values in FIG. 10(c) when the network pattern values are within a range from 0x00 to 0x07. For the processing elements PE0-PE3, when the network pattern values are smaller than 0x00, the register offset selection operation unit 61 uses the lower three bits of the network pattern values as the select signals, the fourth bit is "0", and the register offset selection signal outputs are "1". For the processing elements PE4-PE7, when the network pattern values are smaller than 0x00, the register offset selection operation unit 61 uses the lower three bits of the network pattern values as the select signals, the fourth bit is "1", and the register offset selection signal outputs are "1".

The modulo operation unit 62, upon receiving a network pattern value, performs a modulo operation, and outputs a select signal and a register offset selection signal. When the PE mode signal is specifying the 8PE mode, the lower four bits of the network pattern value are used for the select signal, and the register offset selection signal is always "1". In each case, regardless of the network pattern value, the lower four bits are always used as the select signal, and the register offset selection signal is always "1". When the PE mode signal is specifying the 4PE mode, the lower three bits of the network pattern value are used for the select signal for the processing elements PE0-PE3. The fourth bit of the select signal is "0" for the processing elements PE0-PE3, and is "1" for the processing elements PE4-PE7. The register offset selection signal is always "1". In each case, regardless of the network pattern value, the lower three bits are always used as the select signal, the fourth bit of the select signal is "0" for the processing elements PE0-PE3, and is "1" for the processing elements PE4-PE7, and the register offset selection signal is always "1".

Here, the operation of the modulo operation unit 62 will be described in detail. FIG. 11 shows an operation outline when the PE mode signal is specifying the 8PE mode. In FIG. 11, "PE0" to "PE7" indicate processing element numbers, and "H" and "L" suggest that each processing element stores pixel values in units of half words. In FIG. 11, the first row shows network pattern values, the second row shows select signal outputs, and the third row shows register offset selection signal outputs. In FIG. 11, in each case, regardless of the network pattern value, the lower four bits are always used as the select signal, and the register offset selection signal is always "1".

FIG. 12 shows an operation outline when the PE mode signal is specifying the 4PE mode. In FIG. 12, "PE0" to "PE7" indicate processing element numbers, and "H" and "L" suggest that each processing element stores pixel values in units of half words. In FIG. 12, the first row shows network pattern values, the second row shows select signal outputs, and the third row shows register offset selection signal outputs. In FIG. 12, regardless of the network pattern value, the lower three bits are always used as the select signal, the fourth bit of the select signal is "0" for the processing elements PE0-PE3, and is "1" for the processing elements PE4-PE7, and the register offset selection signal is always "1".

The saturate operation unit 63, upon receiving a network pattern value, performs a saturate operation, and outputs a select signal and a register offset selection signal. When the PE mode signal is specifying the 8PE mode, the select signal represents "0" when the network pattern value is smaller than "0", and represents 0x0f when the network pattern value is greater than 0x0f. Otherwise, the lower four bits of the network pattern value are used as the select signal. Also, the fifth bit after this conversion is used as the register offset selection signal. In the present embodiment, a saturation occurs at 0x00 or 0x0f. As a result, the register offset selection signal is always "0". When the PE mode signal is specifying the 4PE mode, for the processing elements PE0-PE3, the select signal represents 0x00 when the network pattern value is smaller than 0x00, and represents 0x07 when the network pattern value is greater than 0x07. Otherwise, the lower three bits of the network pattern value are used as the select signal. Also, the fourth bit of the network pattern value after this conversion is used as the register offset selection signal. In the present embodiment, a saturation occurs at 0x00 or 0x07. As a result, the register offset selection signal is always "0". Also, the fourth bit of the select signal is always "0". For the processing elements PE4-PE7, the select signal represents 0x08 when the network pattern value is smaller than 0x00, and represents 0x0f when the network pattern value is greater than 0x07. Otherwise, the lower three bits of the network pattern value are used as the select signal. Also, the fourth bit of the network pattern value after this conversion is used as the register offset selection signal. In the present embodiment, a saturation occurs at 0x08 or 0x0f. As a result, the register offset selection signal is always "0". Also, the fourth bit of the select signal is always "1".

Here, the operation of the saturate operation unit 63 will be described in detail. FIG. 13 shows an operation outline when the PE mode signal is specifying the 8PE mode. In FIG. 13, "PE0" to "PE7" indicate processing element numbers, and "H" and "L" suggest that each processing element stores pixel values in units of half words. In FIG. 13, the first row shows network pattern values, the second row shows select signal outputs, and the third row shows register offset selection signal outputs. In FIG. 13(a), since all the network pattern values are within a range from 0x00 to 0x0f, the select signal outputs are equal to the network pattern values, and the register offset selection signal outputs are all "0". The above-stated comments on FIG. 13(a) also apply to the values in FIG. 13(b) when the network pattern values are within a range from 0x00 to 0x0f. For PE7H and PE7L, the network pattern values are greater than 0x0f, and therefore the select signal outputs are 0x0f. The register offset selection signal outputs are all "0". The above-stated comments on FIG. 13(a) also apply to the values in FIG. 13(c) when the network pattern values are within a range from 0x00 to 0x0f. For PE0H and PE0L, the network pattern values are smaller than 0x00, and therefore the select signal outputs are 0x00. The register offset selection signal outputs are all "0".

FIG. 14 shows an operation outline when the PE mode signal is specifying the 4PE mode. In FIG. 14, "PE0" to "PE7" indicate processing element numbers, and "H" and "L" suggest that each processing element stores pixel values in units of half words. In FIG. 14, the first row shows network pattern values, the second row shows select signal outputs, and the third row shows register offset selection signal outputs. In FIG. 14(a), since all the network pattern values are within a range from 0x00 to 0x07, the select signal outputs are equal to the network pattern values for the processing elements PE0-PE3. The register offset selection signal outputs are all "0". For the processing elements PE4-PE7, the select signal represents a value obtained by adding "8" to a value composed of the lower three bits of the network pattern value. The register offset selection signal is always "0". The above-stated comments on FIG. 14(a) also apply to the values in FIG. 14(b) when the network pattern values are within a range from 0x00 to 0x07. For the processing elements PE0-PE3 in FIG. 14(b), since the network pattern value for PE3L is greater than 0x07, the corresponding select signal output is 0x07. For the processing elements PE4-PE7 in FIG. 14(b), since the network pattern value for PE7L is greater than 0x07, the corresponding select signal output is 0x0f. The register offset selection signal outputs are all "0". The above-stated comments on FIG. 14(a) also apply to the values in FIG. 14(c) when the network pattern values are within a range from 0x00 to 0x07. For the processing elements PE0-PE3 in FIG. 14(c), since the network pattern values for PE0H and PE0L are smaller than 0x00, the corresponding select signal outputs are 0x00. For the processing elements PE4-PE7 in FIG. 14(c), since the network pattern values for PE4H and PE4L are smaller than 0x00, the corresponding select signal outputs are 0x08. The register offset selection signal outputs are all "0".

The selector A 64 selects a control signal to be output to the 16 to 1 selector 51.

The selector B 65 selects a value to be output to the demultiplexer 66.

The demultiplexer 66 connects, to an output of the selector B 65, only a register offset selection signal that is output to a processing element whose number matches a number the select signal represents, and causes the other register offset selection signals to represent "0".

FIG. 15 is a circuit diagram of operation units and selectors. In FIG. 15, "bit[x:y]" indicates a set of bits from a lower bit "y" to a higher bit "x", and "bit[z]" indicates the $z^{th}$ bit from the lowest bit. An 8-bit network pattern value is output from a network pattern register. Upon receiving the network pattern value, the modulo operation unit converts the higher four bits to "0001" and outputs the converted network pattern value, with no change in the lower four bits. Upon receiving the network pattern value, the saturate operation unit outputs 0x0f if the higher four bits of the received value is "0001", and outputs 0x00 if the higher four bits of the received value is "1110". Otherwise, the saturate operation unit outputs the received network pattern value as it is. The selector A selects only the lower four bits, and the selector B selects only the fifth bit.

FIG. 16 shows connections between the select processing units 50 and the register number converting units 20. As shown in FIG. 16, the logical addition circuits 16, which is 16-input 1-output, are provided between the select processing units 50 and the register number converting units 20.

Register offset selection signals output from the select processing units 50 are input to each logical addition circuit for PE0H to PE7L. Each logical addition circuit performs a logical addition, and outputs a value "1" to a corresponding register number converting unit 20 if any of the register offset selection signals indicates a register offset selection. Otherwise, it outputs a value "0" to a corresponding register number converting unit 20.

Figure 17:
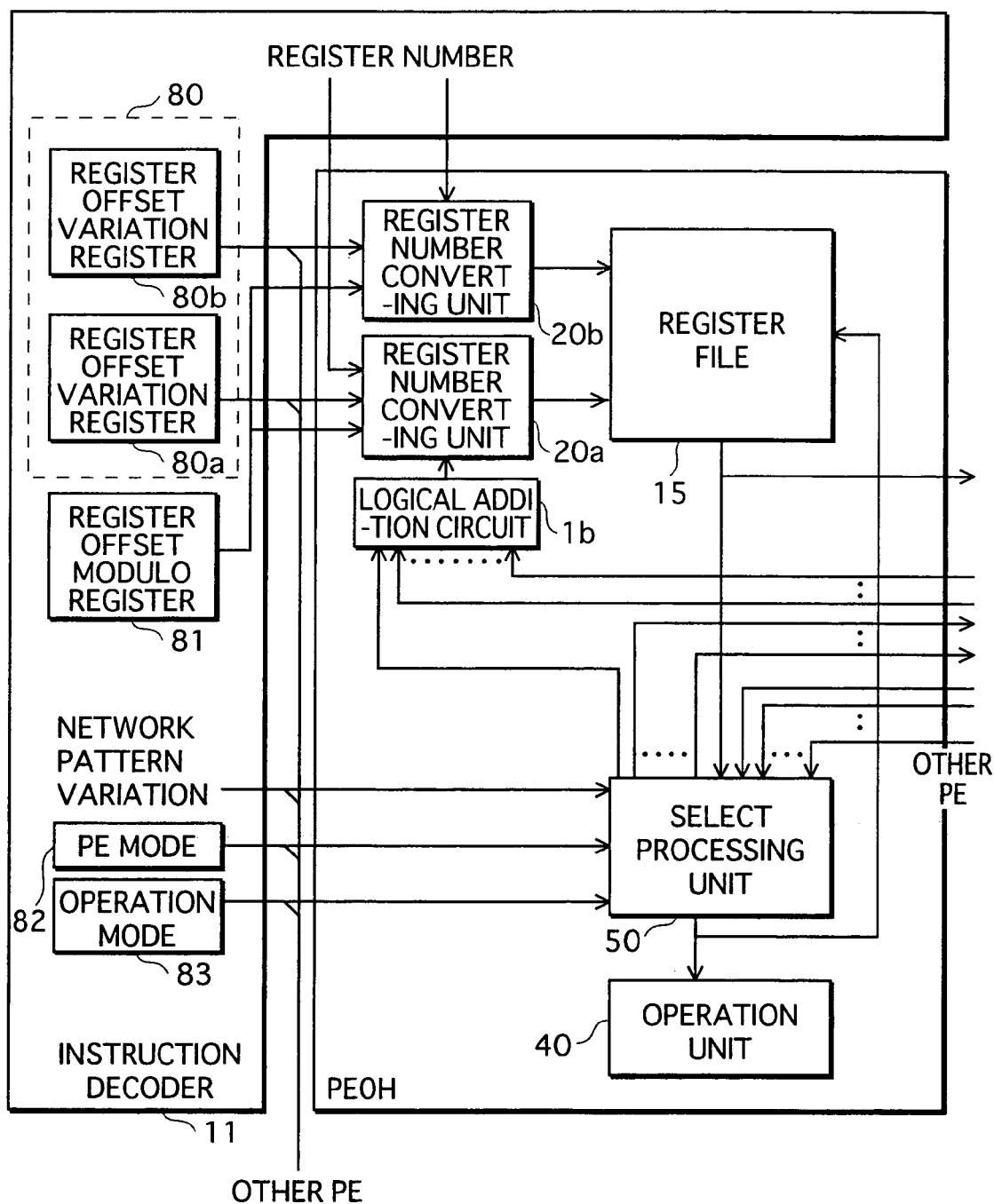
FIG. 17 shows the structure of the instruction decoder 11 and the processing element PE0H.

Here, the operation caused by the network select instruction, which is one of network operation instructions used by the parallel operation processor having the above-described structure, will be described with reference to FIG. 17. FIG. 17 shows the structure of the instruction decoder 11 and the processing element PE0H.

The instruction decoder 11 includes a register offset variation register 80a, a register offset variation register 80b, a register offset modulo register 81, a PE mode register 82, and an operation mode register 83.

The register offset variation register 80a is a register for storing a register offset variation for reading.

The register offset variation register 80b is a register for storing a register offset variation for writing.

The register offset modulo register 81 is a register for storing a register offset modulo value for both reading and writing.

The PE mode register 82 is a register for indicating either the 8PE mode or the 4PE mode.

The operation mode register 83 is a register for indicating one of the register offset selection mode, the modulo mode, and the saturate mode.

The processing element PE0H includes a register number converting unit 20a for reading, a register number converting unit 20b for writing, the register file 15, the logical addition circuit 16, the select processing unit 50, and the operation unit 40.

The register number converting unit 20a outputs to the register file 15 either a register number without changing it or a register number obtained by adding a register offset value to the register number, in accordance with a register offset selection signal output from the logical addition circuit 16.

The register number converting unit 20b converts a register number written in an operand to another number, and stores, into a register with the converted number, a piece of data that has been selected and output by a network.

Now, the operation will be described. The following shows the format of the network select instruction.

nsel.a <dst>, <src>, <network pattern register>

In the above format, ".a" indicates that the network 30a, among the two networks, is used, <dst> indicates a destination register, <src> indicates a source register, and <network pattern register> specifies a network pattern register for holding a network pattern value to be used. The following is an actual example of the nsel.a instruction, followed by explanation of the operation caused by the instruction.

nsel.a r2, r0, NPA

With this nsel.a instruction, operand "r0" is input to the register number converting unit 20 by the instruction decoder 11. With this instruction, the register offset variation registers 80 and the register offset modulo register 81 are not used since the nsel.a instructions do not update the register offset. The register number converting unit 20a outputs to the register file 15 either "r0" without changing it or a register number obtained by adding a register offset value to "r0", in accordance with a register offset selection signal output from the logical addition circuit 16. The register file 15 outputs a piece of data read from the specified register. The NPA is an operand indicating the network pattern register 53. The operand NPA indicates that a data selection operation by a network and a register offset selection operation are performed in accordance with a value stored in the network pattern register 53 of the select processing unit. With this instruction, the network pattern value variation is not used since the nsel.a instructions do not update the network pattern value. A piece of data that has been selected and output by a network is stored into a register with a number converted from "r2" in an operand by the register number converting unit 20b.

Figure 18:
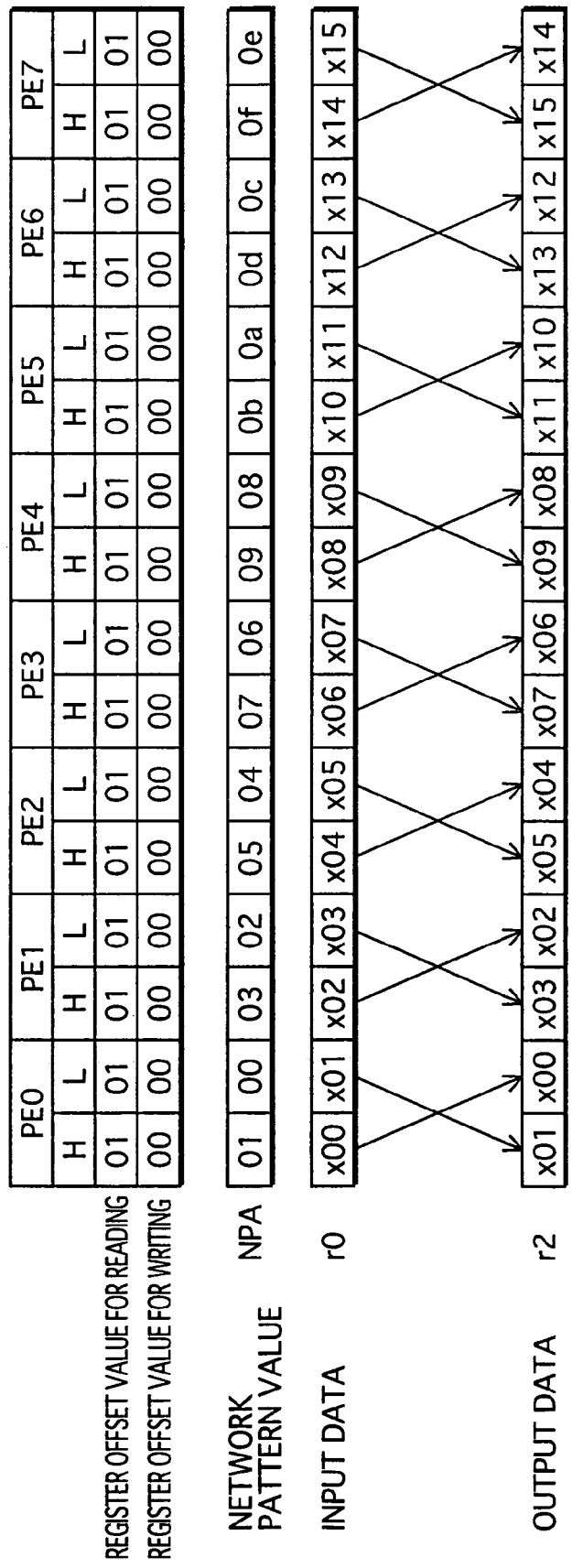
FIG. 18 shows an operation of the network select instruction.
Figure 19:
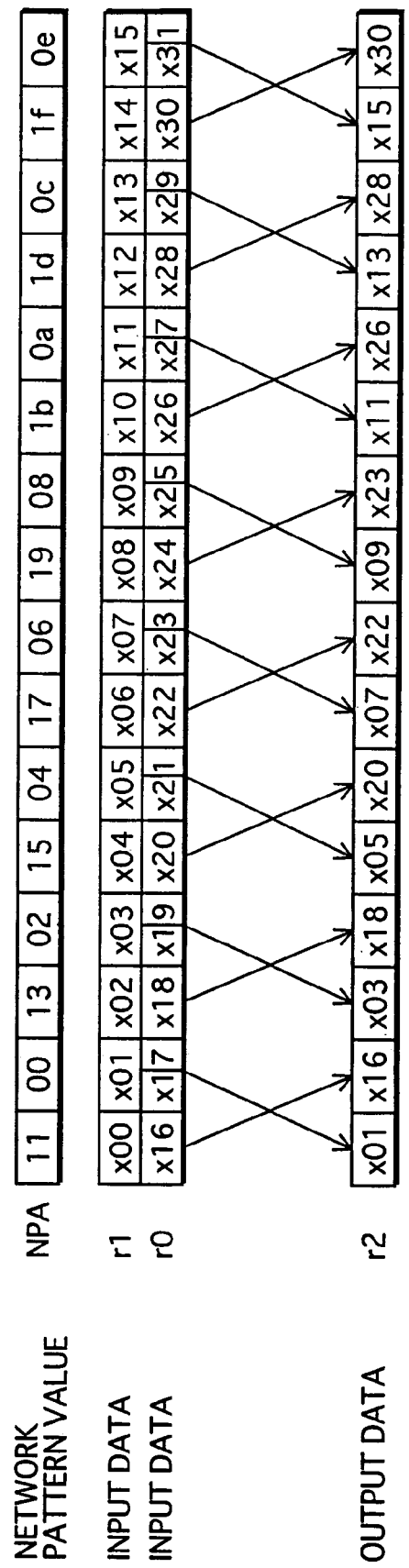
FIG. 19 shows an operation of the network select instruction.

FIGS. 18 and 19 show examples of stored NPA values, and the operations corresponding to the NPA values. In FIG. 18, the first row indicates the processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows values of the input data "r0". The seventh row shows values of the output data "r2". In FIG. 19, the first row indicates the processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows values of the input data "r1". The seventh row shows values of the input data "r0". The eighth row shows values of the output data "r2". In FIGS. 18 and 19, it is supposed that the PE mode register is set to the 8PE mode, that the operation mode register is set to the register offset selection, that the register offset value for reading is set to 0x01 for each processing element, and that the register offset value for writing is set to 0x00 for each processing element. FIG. 18 shows input and output data when the network pattern values are "01", "00", "03", "02", . . . "0f", "0e". The signs "x00", "x01", . . . "x15" represent data. As described earlier in relation to FIG. 9, in the network pattern values, the tens digit indicates whether or not a register offset value is used. If the tens digit is "0", it indicates that a register offset value is not used. If the tens digit is "1", it indicates that a register offset value is used. Also, the units digit of each network pattern value indicates a processing element and high or low thereof from which data is fetched. Accordingly, if, for example, a network pattern value is "01", it indicates that the register offset is not used, and that data is fetched from r0 for PE0L. Similarly, if a network pattern value is "00", it indicates that the register offset is not used, and that data is fetched from r0 for PE0H.

With such a pattern of the network pattern values, as shown in FIG. 18, operations are made so that the eight MSBs and the eight LSBs of each processing element replace each other.

FIG. 19 shows input and output data when the network pattern values are "11", "00", "13", "02", ... "1f", "0e". The signs "x00", "x01", ... "x15" represent data. With such a pattern of the network pattern values, the network operates so that one byte of the MSBs and one byte of the LSBs of each processing element replaces each other. However, unlike in the case of FIG. 18, if, for example, a network pattern value is "11", data is output from register r1 for PE0L, the register number resulted from adding the register offset to a register number, to register r2 for PE0H. If a network pattern value is "00", as is the case with FIG. 18, the register offset is not used, and data is transferred from r0 to r2.

The following shows another format of the nsel.a instruction.

nsel.a <dst>, <src>, <Immediate Value>

In the above format, ".a" indicates that the network 30*a*, among the two networks, is used, <dst> indicates a destination register, <src> indicates a source register, and <immediate value> specifies a numerical value. The following is an actual example of the nsel.a instruction, followed by explanation of the operation caused by the instruction.

nsel.a r2, r0, 0x4

With this nsel.a instruction, operand "r0" is input to the register number converting unit 20 by the instruction decoder 11. With this instruction, the register offset variation registers 80 and the register offset modulo register 81 are not used since the nsel.a instructions do not update the register offset. The register number converting unit 20*a* outputs to the register file 15 either "r0" without changing it or a register number obtained by adding a register offset value to "r0", in accordance with a register offset selection signal output from the logical addition circuit 16. The register file 15 outputs a piece of data read from the specified register. The operand "0x4" indicates that a data selection operation by a network and a register offset selection operation are performed on the condition that the network pattern value for each processing element is set to "0x4". With this instruction, the network pattern value variation is not used since the nsel.a instructions do not update the network pattern value. When the network pattern value is 0x04, in the 8PE mode, data is transferred from r0 for PE2H to all the processing elements, where the data is stored in a register with a register number converted from "r2" in the operand by the register number converting unit 20*b*. In the present case, since the register offset value for writing is "0", the data is stored in the register r2 specified by the operand.

Now, the network shift instruction will be described. The following is the format of the network shift instruction.

nsfti.a <dst>, <src>, <Network Pattern Register>, <Network Pattern Value Variation>

In the above format, ".a" indicates that the network 30*a*, among the two networks, is used, <dst> indicates a destination register, <src> indicates a source register, <network pattern register> specifies a network pattern register used for transferring data, and <network pattern value variation> specifies a value to be added to a network pattern value after the data transfer. The following is an actual example of the nsfti.a instruction, followed by explanation of the operation caused by the instruction.

nsfti.a r2, r0, NPA, 0x1

In the present embodiment, the register offset variation registers 80 and the register offset modulo register 81 are not used. Also, it is supposed that the PE mode register 82 is set to the 8PE mode, and that the operation mode register 83 is set to the register offset value selection mode.

With the nsfti.a instruction, operand "r0" is input to the register number converting unit 20 by the instruction decoder 11. The nsfti.a instructions do not update the register offset. The register number converting unit 20*a* outputs to the register file 15 either "r0" without changing it or a register number obtained by adding a register offset value to "r0", in accordance with a register offset selection signal output from the logical addition circuit 16. The register file 15 outputs a piece of data read from the specified register. The operand NPA indicates that a data selection operation by a network and a register offset selection operation are performed in accordance with a value stored in the network pattern register 53 of the select processing unit 50. The operand "0x1" indicates a network pattern value variation, and in this example case, all the processing elements add "1" to the NPA value each time data is selected. The data that is output as a result of the data selection by a network is stored in a register with a register number converted by the register number converting unit 20*b*. In the present case, since the register offset value for writing is "0", the data is stored in the register r2 specified by the operand.

Figure 20:
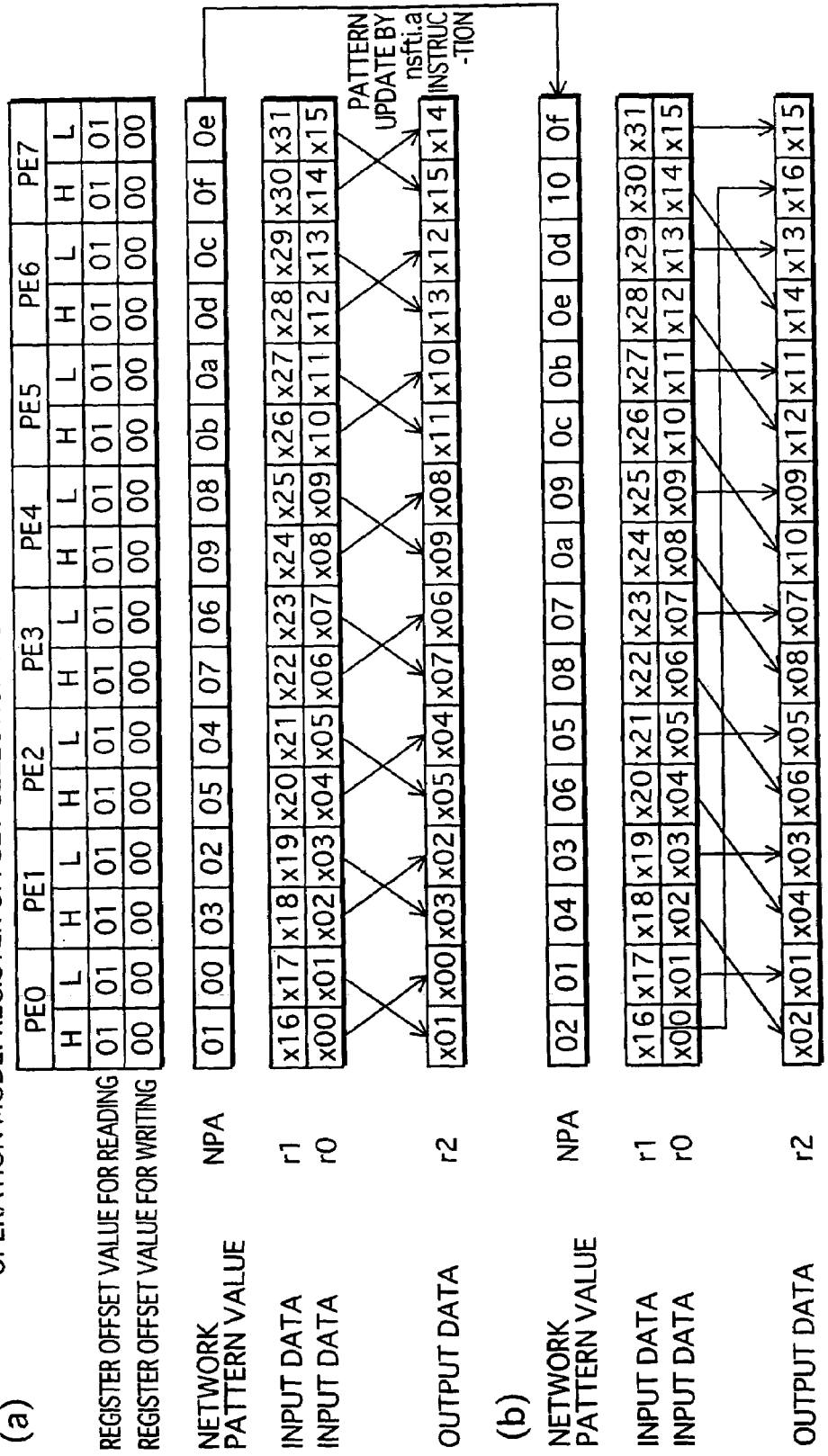
FIG. 20 shows the operation of the network shift instruction (nsfti.a instruction)

FIG. 47 shows an instruction sequence. FIG. 47 indicates that the nsfti.a instruction is issued. FIG. 20 shows the operation of the network 30*a* caused by the instruction sequence. FIG. 20 shows data transfers that occur when the nsfti.a instruction is issued. In FIG. 20(*a*), the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows values of the input data "r1". The seventh row shows values of the input data "r0". The eighth row shows values of the output data "r2". In FIG. 20(*b*), the first row shows network pattern values held by the NPA register. The second row shows values of the input data "r1". The third row shows values of the input data "r0". The fourth row shows values of the output data "r2". The signs "x00" to "x31" indicate pieces of pixel data that align horizontally. The initial values of the NPA values are set to network pattern values "01", "00", "03", "02", ... "0f", "0e". The register offset is set to "0x01". As shown in FIG. 20(*a*), as is the case with FIG. 18, data pieces "x01", "x00", "x03", ... "x14" are output, and at the same time, the NPA value is updated, that is to say, is increased by "1". Then, as shown in FIG. 20(*b*), with the second nsfti.a instruction shown in FIG. 47B, data pieces "x02", "x01", "x04", ... "x15" are output, and at the same time, the NPA value is updated, that is to say, is increased by "1". Also, although the register number converting unit 20*b* converts a register number, the data that is output as a result of the data selection by a network is stored in the register r2 specified in an operand since the register offset value for writing is "0".

As described above, according to the present embodiment, each processing element executes a data transfer according to a network pattern value, and at the same time performs an arithmetic operation on the network pattern value based on an instruction, and updates the network pattern value. This enables a data transfer to be performed between given processing elements. Also, it eliminates the need for specifying an immediate value, as a network pattern value, in an operand of an instruction each time a data transfer is performed. This enables the program for SIMD processors to be reduced in code size.

Embodiment 2

The present embodiment relates to an improvement in the application of the parallel operation processor to FIR filter operations. The FIR filter is often used to remove noises, and is achieved by performing product-sum operation on adjacent pieces of data. The present embodiment shows the case of symmetry coefficient FIR.

Figure 21A:
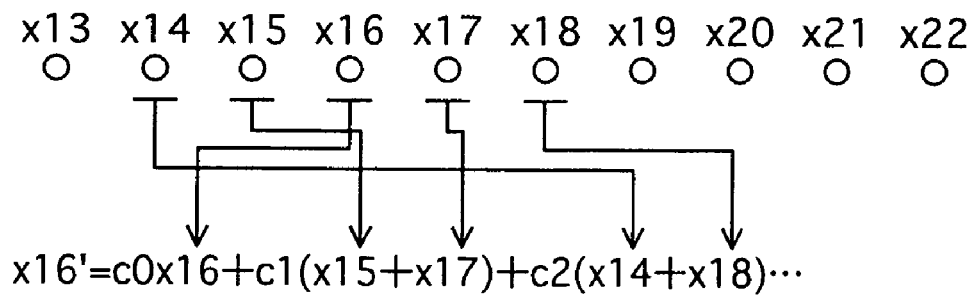
FIGS. 21A-21C show how FIR filter operations are performed.
Figure 21B:
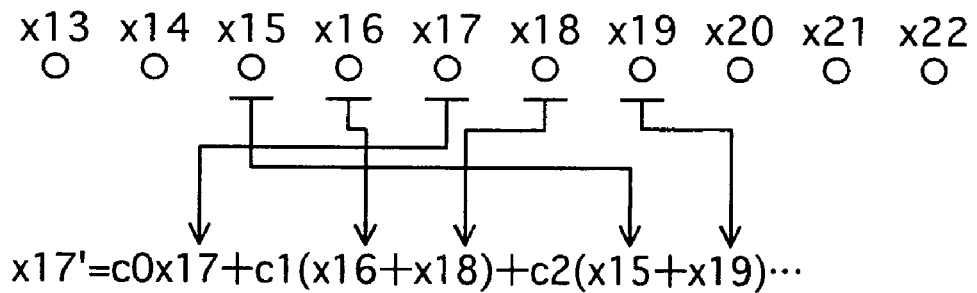
Figure 21C:
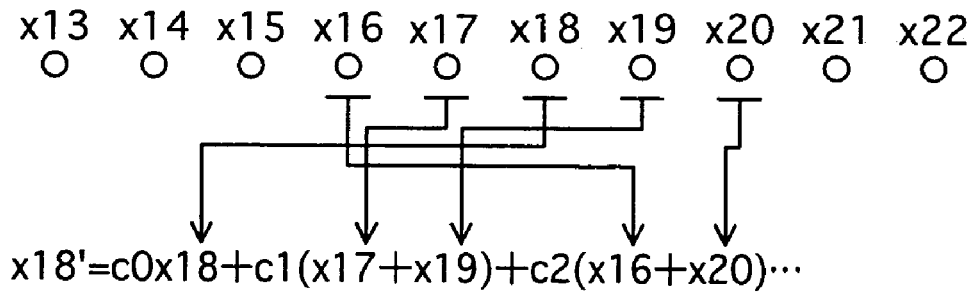

FIGS. 21A-21C show how FIR filter operations are performed. The following description focuses on data "x16" shown in FIG. 21A. As shown in FIG. 21A, in terms of the operation on x16, the FIR filter adds up (i) a result of multiplying x16 by coefficient c0, (ii) a result of multiplying coefficient c1 by a result of adding x15 to x17 that are adjacent to x16, and (iii) a result of multiplying coefficient c2 by a result of adding x14 to x18 that are adjacent to x16.

In regards with x17 and x18, the FIR filter performs operations on these values using the adjacent pieces of data, as shown in FIGS. 21B and 21C. As will be noticed by comparing the FIR operations shown in these figures, the pieces of data used for the operation on x17 are shifted from the pieces of data used for the operation on x16 by one piece of data toward the right-hand side of the figures. The pieces of data used for the operation on x18 are further shifted by one piece of data.

Accordingly, it is possible to perform as many FIR operations as the number of processing elements in parallel by adding up the results of: (i) providing the arithmetic operation units of each processing element with data x16, x17, x18, . . . and multiplying the data by coefficient c0, then (ii) providing the arithmetic operation units of each processing element with data x17, x18, x19, . . . and data x15, x16, x17, . . . performing additions, and multiplying the addition results by coefficient c1, then (iii) providing the arithmetic operation units of each processing element with data x18, x19, x20, . . . and data x14, x15, x16, . . . performing additions, and multiplying the addition results by coefficient c2.

The above-mentioned data supply can be achieved with the construction described in Embodiment 1, which will be explained with reference to FIG. 17. In the FIR operations, the network shift instruction is used. The following is an actual example of the network shift instruction, followed by explanation of the operation caused by the instruction.

nsfti.a r3, r1, NPA, 0x1

In the present embodiment, neither the network 30*a* nor the network 30*b* uses the register offset variation registers 80 and the register offset modulo register 81. Also, it is supposed that the PE mode register 82 is set to the 8PE mode, and that the operation mode register 83 is set to the register offset value selection mode.

With the nsfti.a instruction, operand "r1" is input to the register number converting unit 20 by the instruction decoder 11. The nsfti.a instructions do not update the register offset. The register number converting unit 20*a* outputs to the register file 15 either "r1" without changing it or a register number obtained by adding a register offset value to "r1", in accordance with a register offset selection signal output from the logical addition circuit 16. The register file 15 outputs a piece of data read from the specified register. The NPA is an operand indicating the network pattern register. The operand NPA indicates that a data selection operation by a network and a register offset selection operation are performed in accordance with a value stored in the network pattern register 53 of the select processing unit 50. The operand "0x1" indicates a network pattern value variation, and in this example case, all the processing elements add "1" to the NPA value each time data is selected. The data that is output as a result of the data selection by a network is stored in a register with a register number converted by the register number converting unit 20*b*.

The following is another format of the network shift instruction.

nsftd.b <dst>, <src>, <Network Pattern Register>, <Network Pattern Value Variation>

In the above format, ".b" indicates that the network 30*b*, among the two networks, is used, <dst> indicates a destination register, <src> indicates a source register, <network pattern register> specifies a network pattern register used for transferring data, and <network pattern value variation> specifies a value to be subtracted from a network pattern value after the data transfer. The following is an actual example of the nsftd.b instruction, followed by explanation of the operation caused by the instruction.

nsftd.b r4, r1, NPB, 0x1

With the nsftd.b instruction, operand "r1" is input to the register number converting unit 20 by the instruction decoder 11. The nsftd.b instructions do not update the register offset. The register number converting unit 20*a* outputs to the register file 15 either "r1" without changing it or a register number obtained by adding a register offset value to "r1", in accordance with a register offset selection signal output from the logical addition circuit 16. The register file 15 outputs a piece of data read from the specified register. The NPB is an operand indicating the network pattern register. The operand NPB indicates that a data selection operation by a network and a register offset selection operation are performed in accordance with a value stored in the network pattern register 53*b* of the select processing unit 50*b*. The operand "0x1" indicates a network pattern value variation, and in this example case, all the processing elements subtract "1" from the NPB value each time data is selected. The data that is output as a result of the data selection by a network is stored in a register with a register number converted by the register number converting unit 20*b*. It should be noted here that the select processing unit 50*b* and the network pattern register 53*b* are a select processing unit and a network pattern register provided in the network 30*b* for the processing element PE0.

It is possible to perform FIR filter operations by simultaneously issuing the nsfti.a instruction and the nsftd.b instruction, which will be explained in the following.

Figure 22:
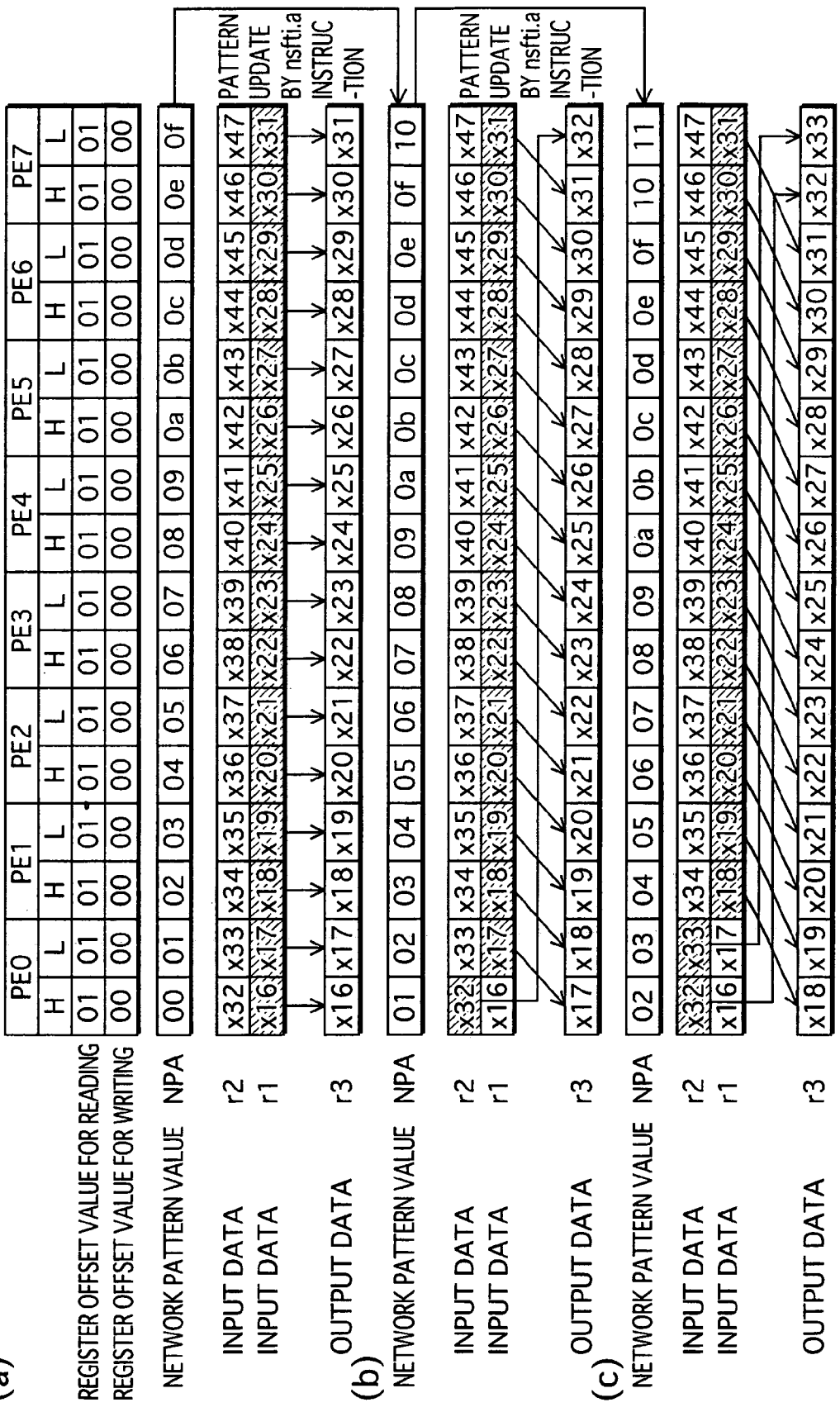
FIG. 22 shows the operation of the network shift instruction (nsfti.a instruction)

FIG. 48 shows an instruction sequence for FIR filter operations. FIG. 48 indicates that the nsfti.a instruction and the nsftd.b instruction are simultaneously issued. FIG. 22 and FIG. 23 respectively show the operations of the network 30*a* and the network 30*b* caused by the instruction sequence. FIG. 22 shows data transfers that occur when the nsfti.a instruction is issued. In FIG. 22(*a*), the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows values of the input data "r2". The seventh row shows values of the input data "r1". The eighth row shows values of the output data "r3". In FIGS. 22(*b*) and (*c*), the first row shows network pattern values held by the NPA register. The second row shows values of the input data "r2". The third row shows values of the input data "r1". The fourth row shows values of the output data. The signs "x16" to "x47" indicate pieces of pixel data that align horizontally. The initial values of the NPA values are set to network pattern values "00", "01", "02", "03", . . . "0f". The register offset is set to "0x01". The operation mode register is set to the saturate mode. With the first issuance of the nsfti.a instruction, as shown in FIG. 27(a), data pieces "x16", "x17", "x18", . . . "x31" are output, and at the same time, the NPA value is updated, that is to say, is increased by "1". After the above-described update by the first issuance of the nsfti.a instruction, the network pattern values are "01", "02", "03", . . . "0f", "10", as shown in FIG. 22(b). Here, since the network pattern value for PE7L is "10", data is output from register r2 for PE0H, the register number resulted from adding the register offset to a register number, to register r3 for PE7L. With the second issuance of the nsfti.a instruction shown in FIG. 48(b), as shown in FIG. 22(b), data pieces "x17", "x18", "x19", . . . "x32" are output, and at the same time, the NPA-value is updated, that is to say, is increased by "1". Further, With the third issuance of the nsfti.a instruction shown in FIG. 48(c), as shown in FIG. 22(c), data pieces "x18", "x19", "x20", . . . "x33" are output, and at the same time, the NPA value is updated, that is to say, is increased by "1". As understood from this, each time the nsfti.a instruction is issued, pieces of adjacent data on the right-hand side of the figures are output to each processing element. Also, although the register number converting unit 20b converts a register number, the data that is output as a result of the data selection by a network is stored in the register r3 specified in an operand since the register offset value for writing is "0".

In the above-described process, each processing element accesses register r1 or r2 as indicated by the shaded portions of FIG. 22, and data is read from only one register per byte.

FIG. 23 shows data transfers that occur when the nsftd.b instruction is issued. In FIG. 23(a), the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPB register. The sixth row shows values of the input data "r0". The seventh row shows values of the input data "r1". The eighth row shows values of the output data "r4". In FIGS. 23(b) and (c), the first row shows network pattern values held by the NPB register. The second row shows values of the input data "r0". The third row shows values of the input data "r1". The fourth row shows values of the output data "r4". The signs "x00" to "x31" indicate pieces of pixel data that align horizontally. The initial values of the NPB values are set to network pattern values "00", "01", "02", "03", . . . "0f". The register offset is set to "0x0f". With the first issuance of the nsftd.b instruction shown in FIG. 48(a), as shown in FIG. 23(a), data pieces "x16", "x17", "x18", . . . "x31" are output, and at the same time, the NPB value is updated, that is to say, is decreased by "1". With the second issuance of the nsftd.b instruction shown in FIG. 48(b), as shown in FIG. 23(b), data pieces "x15", "x16", "x17", . . . "x30" are output, and at the same time, the NPB value is updated, that is to say, is decreased by "1". Further, With the third issuance of the nsftd.b instruction shown in FIG. 48(c), as shown in FIG. 23(c), data pieces "x14", "x15", "x16", . . . "x29" are output, and at the same time, the NPB value is updated, that is to say, is decreased by "1". As understood from this, each time the nsftd.b instruction is issued, pieces of adjacent data on the left-hand side of the figures are output to each processing element. Also, although the register number converting unit 20b converts a register number, the data that is output as a result of the data selection by a network is stored in the register r4 specified in an operand since the register offset value for writing is "0f".

In the above-described process, each processing element accesses register r1 or r0 as indicated by the shaded portions of FIG. 23, and data is read from only one register per processing element for one byte of data.

As described above, values output by the networks 30a and 30b to r3 and r4 are input to the operation unit 40 for each of FIG. 48, and addition operation and product-sum operation are repeated. This enables the processing elements to perform FIR filter operations in parallel.

As described above, according to the present embodiment, source registers for data reading are selected according to the network pattern values, which enables FIR filter operations to be performed in parallel. Also, this construction enables FIR filter operations to be performed by reading data from two registers, one for each network. This enables the register file of parallel operation processors to be down sized in hardware scale.

It should be noted here that although in the present embodiment, instructions are simultaneously issued to control the networks 30a and 30b as shown in FIG. 48, one instruction per cycle may be issued. In this case, the speed at which data is supplied for FIR operations is reduced by half, decreasing the performance as much.

Embodiment 3

Embodiment 2 showed that the parallel operation processor described in Embodiment 1 can be used for FIR filter operations. The FIR filter requires adjacent pieces of data for the operations. However, there are no adjacent pieces of data at edges of the screen. As a result, in the present embodiment, the filter operations are performed by presuming that outside the screen there are pieces of data that are the same as the values at the edges of the screen.

Figure 24A:
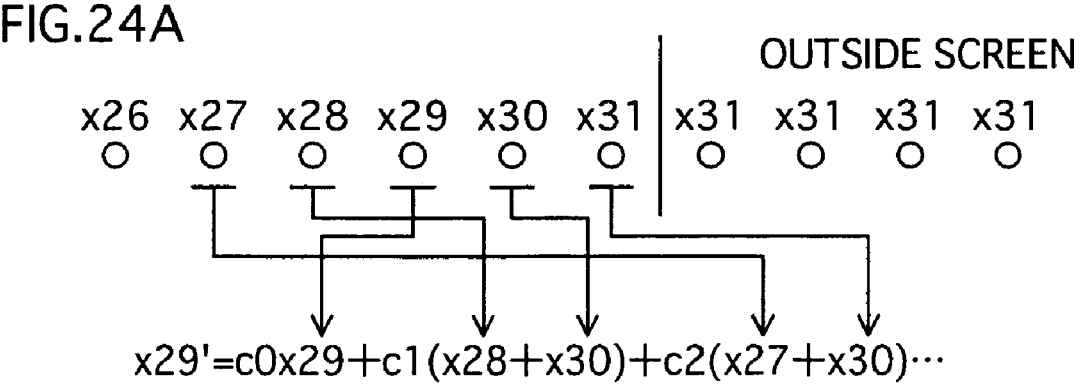
FIGS. 24A-24C show how FIR filter operations are performed on the edges of the screen.
Figure 24B:
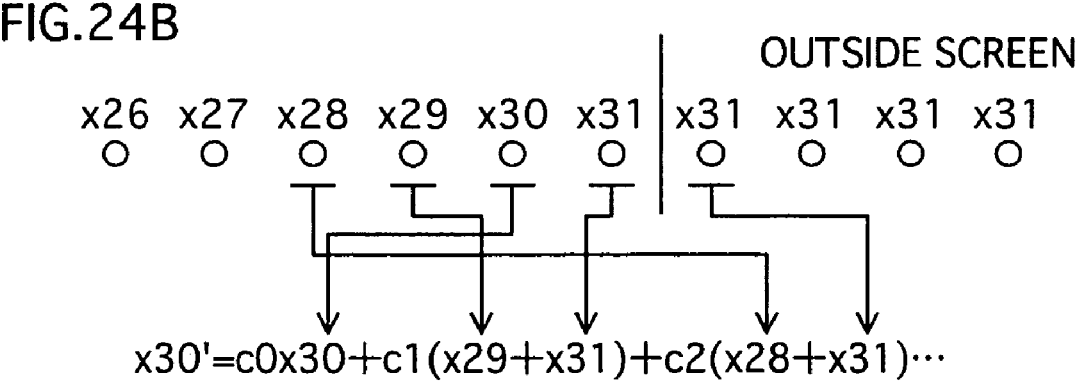
Figure 24C:
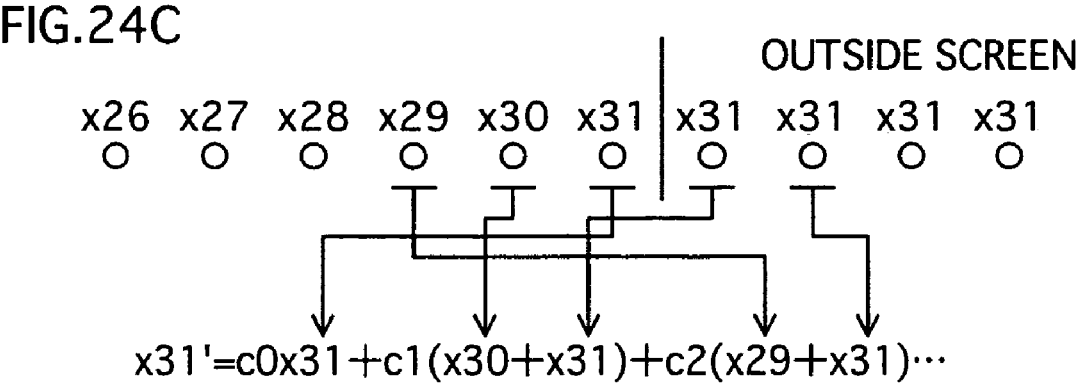

FIGS. 24A-24C show how FIR filter operations are performed on the edges of the screen. In FIGS. 24A-24C, value "x31" represents the data at an edge of the screen. As shown in FIG. 24B, in the FIR filter operations on x30, the product-sum operation in the third round requires data outside the screen. In such a case, the FIR operations are performed by presuming that outside the screen there are pieces of data that each have the same value as the data at the edge of the screen, which is x31 in the present example case. This also applies to the FIR filter operations on x31 shown in FIG. 24C.

The above-mentioned data supply can be achieved with the construction described in Embodiment 1, which will be explained with reference to FIG. 17. As shown in Embodiment 2, in the FIR operations, the network shift instruction is used. The following is an actual example of the network shift instruction, followed by explanation of the operation caused by the instruction.

nsfti.a r3, r1, NPA, 0x1

In the present embodiment, the network 30a does not use the register offset variation registers 80 and the register offset modulo register 81. Also, it is supposed that the PE mode register 82 is set to the 8PE mode, and that the operation mode register 83 is set to the register offset value selection mode.

With the nsfti.a instruction, operand "r1" is input to the register number converting unit 20 by the instruction decoder 11. The nsfti.a instructions do not update the register offset. The register number converting unit 20a outputs to the register file 15 either "r1" without changing it or a register number obtained by adding a register offset value to "r1", in accordance with a register offset selection signal output from the logical addition circuit 16. The register file 15 outputs a piece of data read from the specified register. The NPA is an operand indicating the network pattern register. The operand NPA indicates that a data selection operation by a network and a register offset selection operation are performed in accordance with a value stored in the network pattern register 53 of the select processing unit 50. The operand "0x1" indicates a network pattern value variation, and in this example case, all the processing elements add "1" to the NPA value each time data is selected. The data that is output as a result of the data selection by a network is stored in a register with a register number converted by the register number converting unit 20b.

Figure 25:
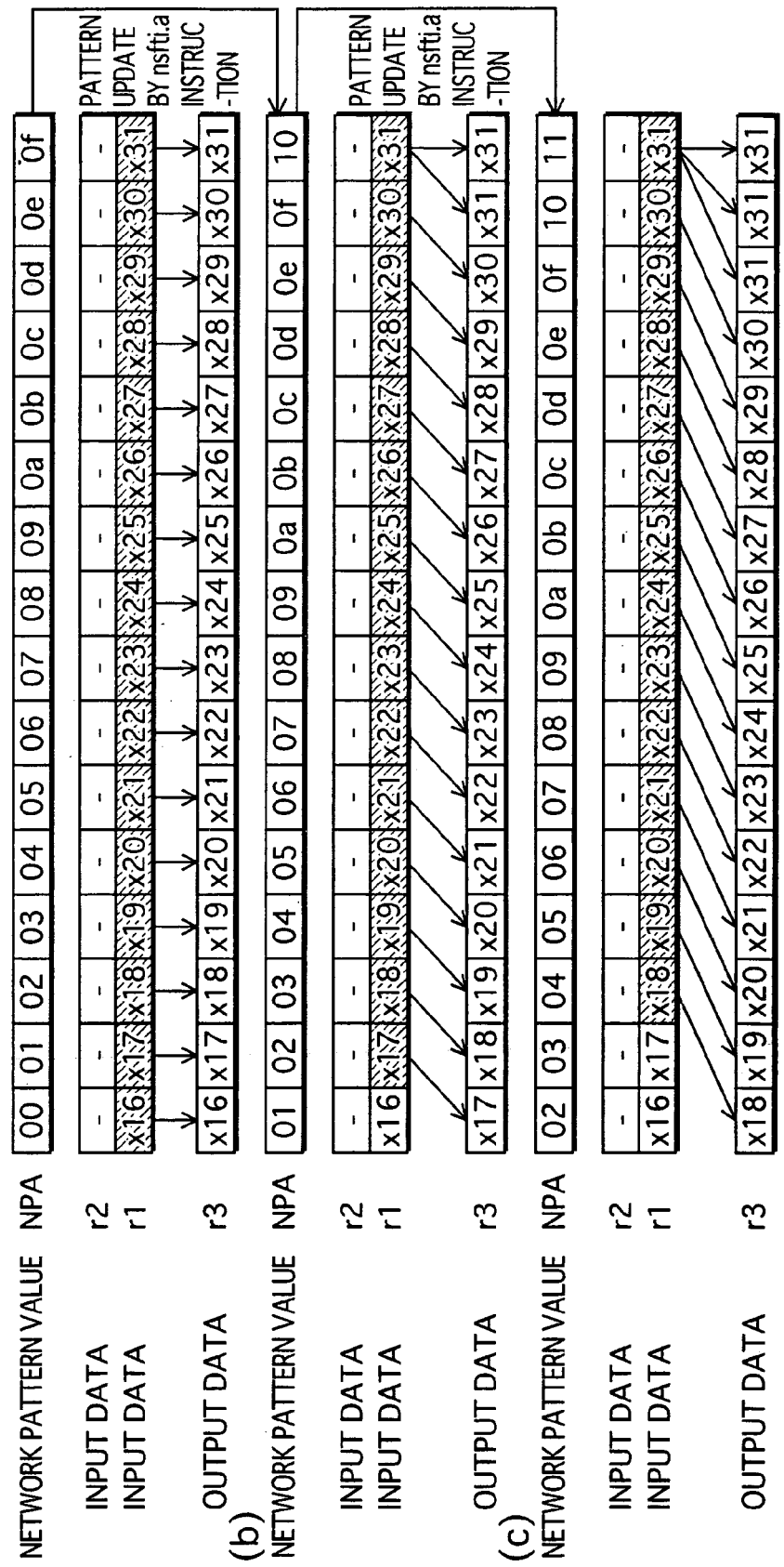
FIG. 25 shows the operation of the network shift instruction (nsfti.a instruction)

Here, as is the case with Embodiment 2, the instruction sequence for FIR filter operations shown in FIG. 48 will be referred to. FIG. 48 indicates that the nsfti.a instruction and the nsftd.b instruction are simultaneously issued. FIG. 25 shows the operations of the network 30a caused by the instruction sequence.

FIG. 25 shows data transfers that occur when the nsfti.a instruction is issued. In FIG. 25(a), the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows values of the input data "r2". The seventh row shows values of the input data "r1". The eighth row shows values of the output data "r3". In FIGS. 25(b) and (c), the first row shows network pattern values held by the NPA register. The second row shows values of the input data "r2". The third row shows values of the input data "r1". The fourth row shows values of the output data "r3". The signs "x16" to "x31" indicate pieces of pixel data that align horizontally. The initial values of the NPA values are set to network pattern values "00", "01", "02", "03", . . . "0f". The register offset for reading is set to "0x01". The operation mode is set to the saturate mode. With the first issuance of the nsfti.a instruction shown in FIG. 48(a), as shown in FIG. 25(a), data pieces "x16", "x17", "x18", . . . "x31" are output, and at the same time, the NPA value is updated, that is to say, is increased by "1". With the second issuance of the nsfti.a instruction shown in FIG. 48(b), data is selected. Here, the network pattern value for PE7L is "0x10", which exceeds "0x0f" but is recognized as "0x0f" in the saturate mode. As a result, as shown in FIG. 25(b), data pieces "x17", "x18", "x19", . . . "x31", "x31" are output, and at the same time, the NPA value is updated, that is to say, is increased by "1". Further, With the third issuance of the nsfti.a instruction shown in FIG. 48(c), data is selected. Here, the network pattern values for PE7H and PE7L are respectively "0x10" and "0x11", both of which exceed "0x0f" but are recognized as "0x0f" in the saturate mode. As a result, as shown in FIG. 25(c), data pieces "x18", "x19", . . . "x31", "x31", "x31" are output, and at the same time, the NPA value is updated, that is to say, is increased by "1". As understood from this, each time the nsfti.a instruction is issued, pieces of adjacent data on the right-hand side of the figures are output to each processing element, and value x31 is repeatedly output as the data on the right-hand side, which is not present in the actuality. Also, although the register number converting unit 20b converts a register number, the data that is output as a result of the data selection by a network is stored in the register r3 specified in an operand since the register offset value for writing is "0".

As is the case with Embodiment 2, with each issuance of the nsftd.b instruction, the network 30b selects data, so that the FIR operations are performed.

Similarly, the FIR filter operations can be performed for the left-hand side of the screen by setting the operation mode register 83 of the network 30b to the saturate mode so that the saturate operation is performed when the network pattern value held by the NPB register is smaller than "0".

As described above, according to the present embodiment, the saturate operation is performed on the network pattern values that do not fall within the range from 0x00 to 0x0f, and a processing element being a data transfer source is determined. With such a construction, it is possible to perform the filter operations by presuming that outside the screen there are pieces of data that are the same as the values at the edges of the screen. That is to say, the present embodiment enables the FIR operations on the edges of the screen to be performed only by setting the operation mode to the saturate mode, without explicitly specifying, in the program, to copy the data at the edges of the screen. Also, the construction for updating the network pattern values reduces the code size, improving the program operation efficiency.

Embodiment 4

Embodiment 3 shows that the operations on the edges of the screen are performed by executing the nsfti.a instruction in the saturate mode. There is a problem in the method of Embodiment 3, however, that the operations on the edges of the screen are not performed appropriately if there is 16-bit data at an edge of the screen because in such a case, eight LSBs or eight MSBs are repeatedly used for the operations.

Figure 26:
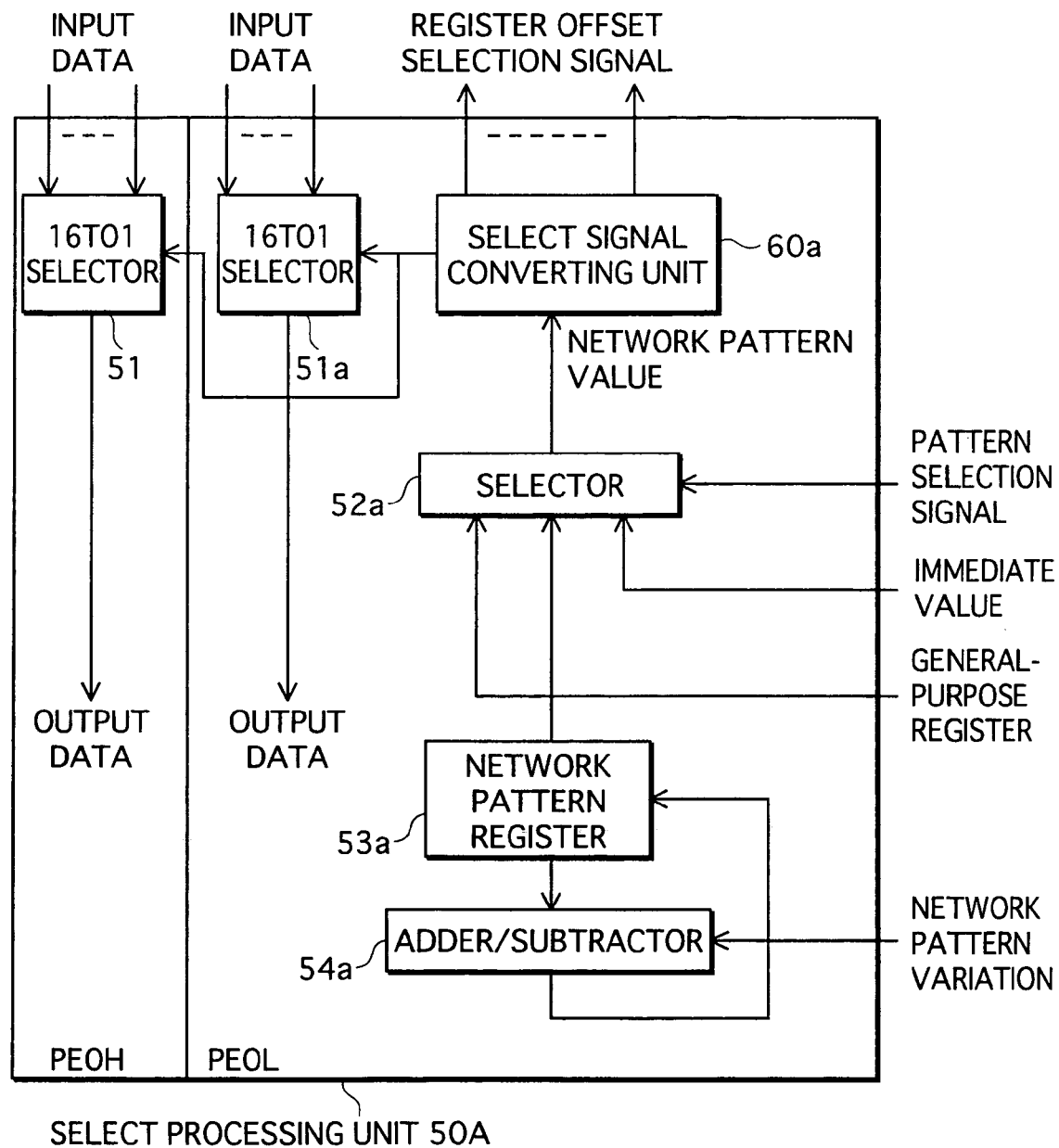
FIG. 26 shows the structure of a select processing unit 50a for the 16-bit operation mode.

The present embodiment is therefore constructed so that the operations on the edges of the screen can be performed appropriately even if there is 16-bit data at an edge of the screen. FIG. 26 shows the structure of a select processing unit 50a. The select processing unit 50a includes a "16 to 1" selector 51a, a selector 52a, a network pattern register 53a, an adder/subtractor 54a, and a select signal converting unit 60a.

The select signal converting unit 60a receives a network pattern value, and generates, from the received network pattern value, a register offset selection signal and select signals that are to be output respectively to the 16 to 1 selector 51 and the 16 to 1 selector 51a. The select signal to be output to the 16 to 1 selector 51a is generated in the same manner as that shown in FIG. 6. However, the least significant bit is always "1" in the select signal to be output to the 16 to 1 selector 51a, and is always "0" in the select signal to be output to the 16 to 1 selector 51. In regard with the remaining bits, both of the select signals have the same values. The select signal converting unit 60a also outputs register offset selection signals to processing elements that are identified by the values of the select signals.

The other components are the same as those shown in FIG. 6.

With the above described structure, 16-bit data is always recognized as being composed of eight MSBs and eight LSBs.

Now, the operation when the network pattern values are used will be explained. The following is an actual example of an instruction, followed by explanation of the operation caused by the instruction. The example instruction is the same as that shown in Embodiment 3 except that the network pattern value variation specified in an operand has been changed to 0x2.

nsfti.a r3, r1, NPA, 0x2

Figure 27:
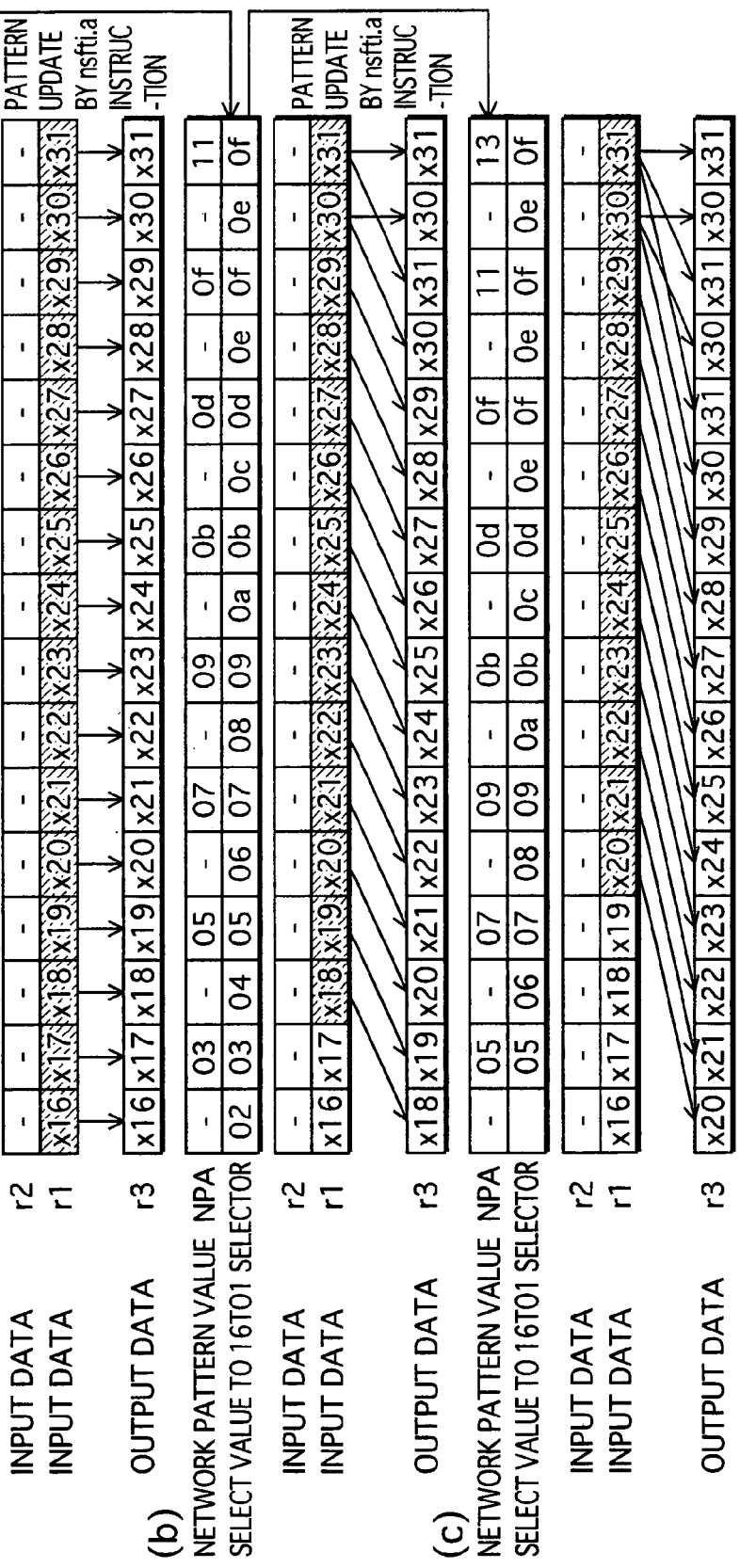
FIG. 27 shows the operation in the saturate mode in the 16-bit operation mode.

FIG. 27 shows data transfers that occur when the nsfti.a instruction is issued. In FIG. 27(a), the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows select values to a 16 to 1 selector. The seventh row shows values of the input data "r2". The eighth row shows values of the input data "r1". The ninth row shows values of the output data "r3". In FIGS. 27(b) and (c), the first row shows network pattern values held by the NPA register. The second row shows select values to the selector. The third row shows values of the input data "r2". The fourth row shows values of the input data "r1". The fifth row shows values of the output data "r3". The signs "x16" to "x31" indicate pieces of pixel data that align horizontally. The initial values of the NPA values are set to network pattern values "–", "01", "–", "03", . . . "–", "0f". The register offset is set to "0x01". Here, the sign "–" indicates no setting is required, meaning it may be any value. The operation mode register is set to the saturate mode. With the first issuance of the nsfti.a instruction shown in FIG. 48(a), as shown in FIG. 27(a), data pieces "x16", "x17", "x18", . . . "x31" are output, and at the same time, the NPA value is updated, that is to say, is increased by "2". The network pattern values for PE0H, PE1H, . . . PE7H are not used. With the second issuance of the nsfti.a instruction, the network pattern value for PE7L is "11", and the select value for PE7L is "0f" as shown in FIG. 27(b). This is because the operation is performed in the saturate mode. Also, the select value for PE7H is "0e" since the select value for PE7H is obtained by changing the least significant bit of the select value for PE7L to "0". As a result, as shown in FIG. 27(b), data pieces "x18", "x19", "x20", . . . "x30", "x31" are output, and at the same time, the NPA value is updated, that is to say, is increased by "2". Further, With the third issuance of the nsfti.a instruction, as shown in FIG. 27(c), data pieces "x20", "x21", "x22", . . . "x31", "x30", "x31" are output, and at the same time, the NPA value is updated, that is to say, is increased by "2". As understood from this, each time the nsfti.a instruction is issued, pieces of adjacent data on the right-hand side of the figures are output to each processing element in units of 16 bits, and values x30 and x31 are repeatedly output as the data on the right-hand side, which is not present in the actuality.

Now, the operation when the immediate values are used will be explained. The following is an actual example of an instruction, followed by explanation of the operation caused by the instruction.

nsel.a r2, r0, 0x4

Figure 28:
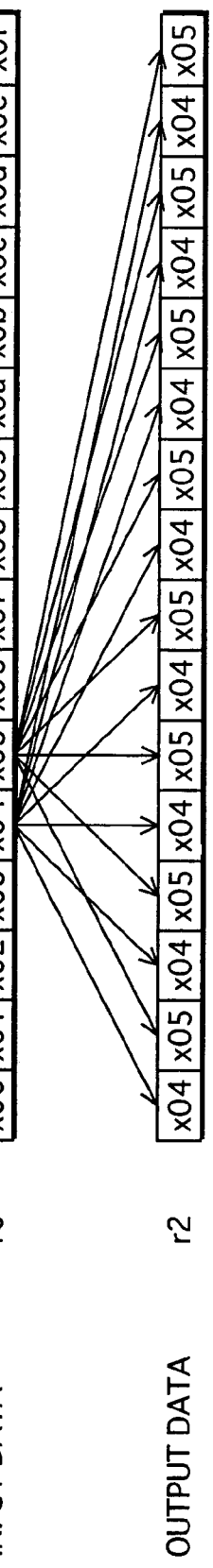
FIG. 28 shows the operation in the 16-bit operation mode when an immediate value is used in the network pattern value.

With this instruction, data is read from register r0 of the register file, data is transferred while the network pattern values for all the processing elements are set to "0x04", and the result data is stored in the register r2. FIG. 28 shows the data transfers. In FIG. 28, the first row indicates processing elements, and the second row suggests that each processing element stores pixel values in units of half words. The details of the first and second rows are the same as those provided with regard to FIG. 9. The third row shows register offset values for reading. The fourth row shows register offset values for writing. The fifth row shows network pattern values held by the NPA register. The sixth row shows select values to a 16 to 1 selector. The seventh row shows values of the input data "r0". The eighth row shows values of the output data. When the network pattern values are each set to the immediate value 0x04, the select value for PE0L is 0x05 and the select value for PE0H is 0x04 since the least significant bits thereof are respectively "1" and "0". In this way, data read from register r0 for PE2H is output to PE0H, PE1H, . . . PE7H. Also, data read from register r0 for PE2L is output to PE0L, PELL, . . . PE7L. This enables 16-bit data to be processed.

As described above, according to the present embodiment, the operations on the edges of the screen can be performed appropriately even if there is 16-bit data at an edge of the screen by enabling the 16-bit data to be processed. Also, when an immediate value is specified in an operand as a network pattern value, it is possible to transfer the 16-bit data to all the processing elements, enabling the 16-bit data to be processed. Also, it is possible to improve the processing efficiency and reduce the code size.

It should be noted here that either the control register or an instruction may be used to switch between the structures of the present embodiment and Embodiment 1. Also, in case only the structure of the present embodiment is adopted to process only 16-bit data, the hardware scale is downsized.

Embodiment 5

The present embodiment relates to an improvement of a parallel operation processor for achieving the matrix transposition. The media processing often requires a matrix transposition. That is to say, it is often required to rearrange elements in a matrix. The present embodiment achieves such a matrix transposition. In the following description, an example matrix of 4 (vertical elements)×4 (horizontal elements) will be used for convenience's sake, instead of, for example, a 16×16 matrix. The following will show that a transposition of data stored in the register file can be achieved with the construction described in Embodiment 1. In the IDCT (Inverse Discrete Cosine Transform) operation, data transposition is performed when an IDCT operation is performed in the horizontal direction after an IDCT operation is performed in the vertical direction.

Figure 29F:
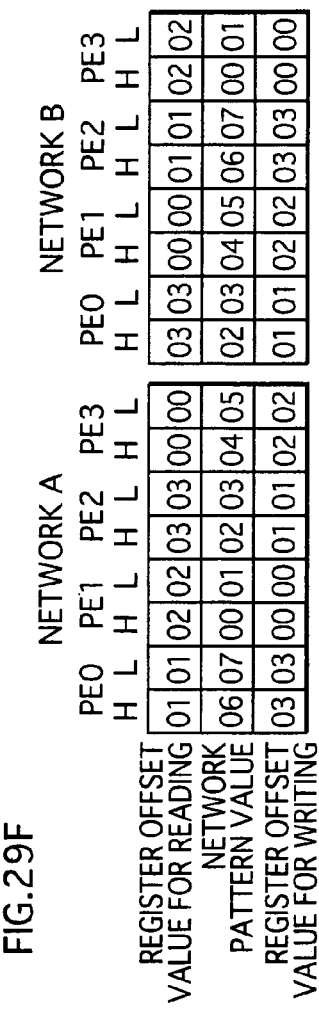
FIGS. 29A-29G show how data are transposed in a 4×4 matrix.
Figure 29G:
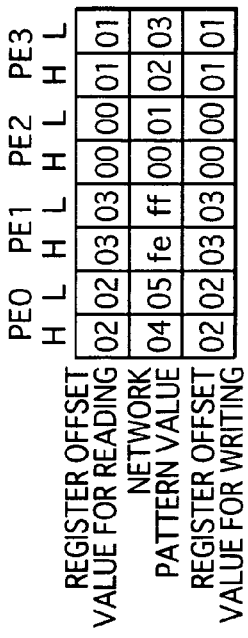
Figure 29A:
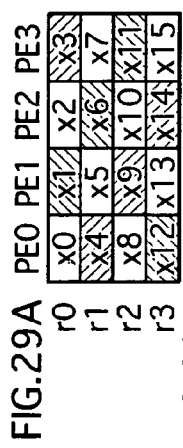
Figure 29B:
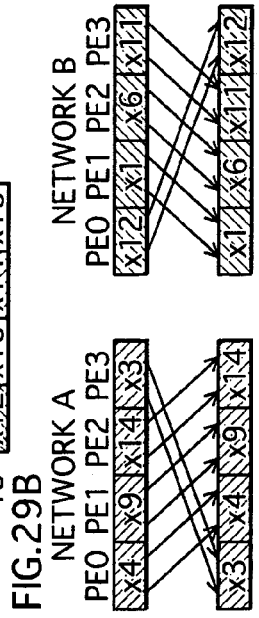
Figure 29C:
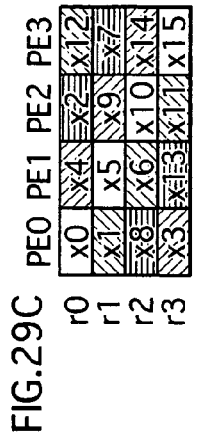
Figure 29D:
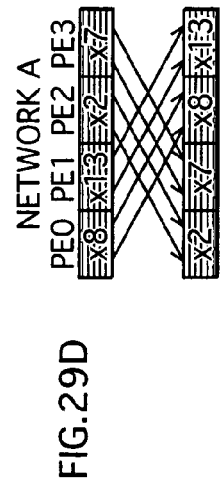
Figure 29E:
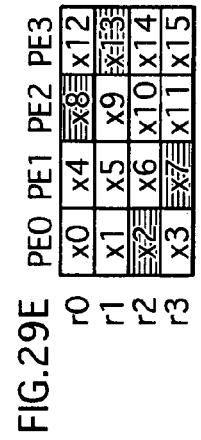

FIGS. 29A-29G show how data are transposed using the network and register offset functions. In the present embodiment, the operation mode is set to the modulo mode for performing the transposition. FIG. 29A shows data in the initial state. FIG. 29A shows that data x0-x15 are stored in r0-r3 for PE0-PE3. Here, the data transposition is performed by switching positions of pieces of data that are arranged symmetrically on either side of a diagonal line. More specifically, data x4, x9, and x14 switch positions respectively with data x1, x6, and x11, the two set of data being arranged symmetrically on either side of a diagonal line formed by data x0, x5, x10, and x15. Similarly, data x8 and x13 switch positions respectively with data x2 and x7, and data x12 switches positions with data x3. The shaded areas in FIG. 29A indicate the registers from which data is read out by the networks 30a and 30b. FIG. 29B shows how pieces of data read out by the networks 30a and 30b are transferred among the processing elements. FIG. 29C shows data in the state after the transfers shown in FIG. 29B. FIG. 29D shows how pieces of data read out by the network 30a are transferred among the processing elements. FIG. 29E shows data written by the network 30a. FIG. 29F shows register offset values and network pattern values used to transfer data from the positions shown in FIG. 29A to the positions shown in FIG. 29C. FIG. 29G shows register offset values and network pattern values used to transfer data from the positions shown in FIG. 29C to the positions shown in FIG. 29E.

In the data transposition, firstly, data x4, x9, x14, and x3 switch positions with data x1, x6, x11, and x12, from the positions shown in FIG. 29A. First, the network 30*a* reads data from r1, r2, r3, and r0 respectively for PE0, PE1, PE2, and PE3, in the stated order, in accordance with the register offset values for reading shown in FIG. 29F. Also, the network 30*b* reads data from r3, r0, r1, and r2 respectively for PE0, PE1, PE2, and PE3, in the stated order, in accordance with the register offset values for reading shown in FIG. 29F. After this, the networks 30*a* and 30*b* perform different data transfers as shown in FIG. 29B, in accordance with the network pattern values shown in FIG. 29F. More specifically, the network 30*a* transfers x4, which is to switch positions with x1, from PE0 to PE1. The network 30*a* also transfers x9, x14, and x3 to PE2, PE3, and PE0, respectively. The network 30*b* performs data transfers in the same manner as the network 30*a*. That is to say, the network 30*b* transfers x1, which is to switch positions with x4, from PE1 to PE0. The network 30*b* also transfers x6, x11, and x12 to PE1, PE2, and PE3, respectively. Then, as shown in FIG. 29C, the network 30*a* writes data into r3, r0, r1, and r2 respectively for PE0, PE1, PE2, and PE3, in the stated order, in accordance with the register offset values for writing shown in FIG. 29F. Also, the network 30*b* writes data into r1, r2 r3, and r0 respectively for PE0, PE1, PE2, and PE3, in the stated order, in accordance with the register offset values for writing shown in FIG. 29F. With these operations, data x4, x9, x14, and x3 switch positions with data x1, x6, x11, and x12, respectively. The areas shaded with horizontal lines in FIG. 29C indicate the registers from which data is read out by the network 30*a* in the next transposition operation. First, the network 30*a* reads data from r2, r3, r0, and r1 respectively for PE0, PE1, PE2, and PE3, in the stated order, in accordance with the register offset values for reading shown in FIG. 29G. After this, the network 30*a* transfers data, as shown in FIG. 29D, in accordance with the network pattern values shown in FIG. 29G. More specifically, the network 30*a* transfers x8, x13, x2, and x7 to PE2, PE3, PE0, and PE1, respectively. During this operation of the network 30*a*, the network 30*b* is not operating. Then, as shown in FIG. 29E, the network 30*a* writes data in accordance with the register offset values for writing shown in FIG. 29G. This data writing completes the data transposition from the positions in rows and columns shown in FIG. 29A.

The above-mentioned data transposition can be achieved by the parallel operation processor with the structure of Embodiment 1, which will be explained with reference to FIG. 17. The following is the format of the network transpose instruction.

ntrpd.a <dst>, <src>, <Network Pattern Register>, <Network Pattern Value Variation>

In the above format, ".a" indicates that the network 30*a*, among the two networks, is used, <dst> indicates a destination register, <src> indicates a source register, <network pattern register> specifies a network pattern register used for transferring data, and <network pattern value variation> specifies a value to be subtracted from a network pattern value after the data transfer. The following is an actual example of the ntrpd.a instruction, followed by explanation of the operation caused by the instruction.

ntrpd.a r0, r0, NPA, 0x2

In the present embodiment, it is supposed that, as shown in FIG. 29F, the register offset values for reading are set to 01, 01, 02, 02, 03, 03, 00, and 00 in correspondence with the processing elements in the order from PE0H. It is also supposed that the register offset values for writing are set to 03, 03, 00, 00, 01, 01, 02, and 02 in correspondence with the processing elements in the order from PE0H, and that the network pattern values are set to 06, 07, 00, 01, 02, 03, 04, and 05 in correspondence with the processing elements in the order from PE0H. It is also supposed that the register offset variation register 80*a* for reading is set to "+1", that the register offset variation register 80*b* for writing is set to "−1", that the register offset modulo register 81 is set to "4", that the PE mode register 82 is set to the 4PE mode, and that the operation mode register 83 is set to the modulo mode.

With the ntrpd.a instruction, operand "r0" is input to the register number converting unit 20by the instruction decoder 11 as a register number for data reading. The register number converting unit 20*a* outputs to the register file 15 a register number obtained by adding a register offset value to"r0". This is because the select processing unit 50 is in the modulo mode, and the register offset selection signal output from the logical addition circuit 16 is always "1". As shown in FIG. 29F, the register offset values for reading are set to 01, 01, 02, 02, 03, 03, 00, and 00 for processing elements in the order from PE0H. As a result, the registers from which data is to be read out are r01, r01, r02, r02, r03, r03, r00, and r00. The register file 15 outputs data read out from the specified registers.

At the same time, the value stored in the register offset variation register 80*a* is added to the register offset value for reading, a modulo operation is performed using the value stored in the register offset modulo register 81, and the result is stored in the register offset value holding unit 21. FIGS. 29F and 29G show the register offset values for reading, changing in this operation. The NPA is an operand indicating the network pattern register. The operand NPA indicates that a data selection operation by a network and a register offset selection operation are performed in accordance with a value stored in the network pattern register of the select processing unit. The operand "0x2" indicates a network pattern value variation, and in this example case, all the processing elements subtract "2" from the NPA value each time data is selected. FIGS. 29F and 29G show the network pattern values changing in this operation.

The data output as a result of data selection by the network is stored in the register with a register number converted from r0 by the register number converting unit 20*b*. As shown in FIG. 29F, the register offset values for writing are set to 03, 03, 00, 00, 01, 01, 02, and 02 in correspondence with the processing elements in the order from PE0H. Accordingly, the registers from which data is to be read out are r03, r03, r00, r00, r01, r01, r02, and r02. The register file 15 writes data to a specified register.

At the same time, the value stored in the register offset variation register 80*a* is subtracted from the register offset value for writing, a modulo operation is performed using the value stored in the register offset modulo register 81, and the result is stored in the register offset value holding unit 21. FIGS. 29F and 29G show the register offset values for writing, changing in this operation.

The network 30*b* issues the nsel.b instruction since there is no need to update the register offset value or the network pattern value. The following is an actual example of the nsel.b instruction.

nsel.b r0, r0, NPB

The nsel.b instruction is executed in the same manner as the nsel.a instruction described in Embodiment 1.

FIG. 49 shows an instruction sequence for performing the transposition. The data transposition is performed when the network 30*a* issues the ntrpd.a instruction and the network

30b issues the nsel.b instruction, as shown in FIG. 49(*a*). This enables data to be switched from the positions shown in FIG. 29A to the positions shown in FIG. 29C.

Next, to perform the transposition operation for switching data from the positions shown in FIG. 29C to the positions shown in FIG. 29E in the state where the register offset values and the network pattern values have been updated by the previously issued ntrpd.a instruction, it is possible to perform the transposition operation by issuing the nsel.a instruction as shown in FIG. 49(*b*). For this operation, the network 30b is not used, and therefore the instruction for the network 30b is not issued. The following is an actual example of the nsel.a instruction.

nsel.a r0, r0, NPA

In this way, the data transposition from the positions shown in FIG. 29A to the positions shown in FIG. 29E is achieved by issuing the instructions in sequence as shown in FIGS. 49(*a*) and (*b*).

It is possible to continue the transposition operation without changing the register offset values or the network pattern values. This is achieved by performing in the reverse order the transposition procedures described earlier.

During these procedures, the ntrpi.a instruction is issued by the network A. The ntrpi.a instruction is the same as the ntrpd.a instruction except that additions instead of subtractions are performed when the register offset values for reading/writing and the network pattern values are updated.

The transposition operation for switching from the positions shown in FIG. 29E to the positions shown in FIG. 29C is performed when the network 30a issues the ntrpi.a instruction as shown in FIG. 49(*c*). Next, the transposition operation for switching data from the positions shown in FIG. 29C to the positions shown in FIG. 29A is performed when the network 30a issues the nsel.a instruction and the network 30b issues the nsel.b instruction, as shown in FIG. 49(*d*). This completes the transposition operation. Here, it is possible to continue the transposition operation without changing the register offset values or the network pattern values. This is achieved by issuing an instruction to perform the transposition operation in the reverse order.

As described above, the present embodiment enables a parallel operation processor to perform operations for transposition, and effectively process the transposition operations that are required in the IDCT or the like.

In regards with the registers used for the transposition, it is possible to perform operations for a transposition of data stored in r4-r7, or a transposition of data stored in r0, r2, r4, and r6.

In the present embodiment, a transposition of 16-bit data in a 4×4 matrix is explained for convenience's sake. It should be noted here however that transpositions can be performed similarly with 8-bit data or in a 8×8 matrix.

FIGS. 30A-30D, FIGS. 31E-31G, FIGS. 32H-32J, and FIGS. 33K-33M show data transposition in a 8×8 matrix. FIG. 30A shows the initial state. First, the values shown in FIG. 30D are used to read data as shown in FIG. 30B and write data as shown in FIG. 30C. Next, the values shown in FIG. 31G are used to read data as shown in FIG. 31E and write data as shown in FIG. 31F. Further, the values shown in FIG. 32J are used to read data as shown in FIG. 32H and write data as shown in FIG. 32I. Finally, the values shown in FIG. 33M are used to read data as shown in FIG. 33K and write data as shown in FIG. 33L. This data writing completes the data transposition from the positions in rows and columns shown in FIG. 30A.

FIG. 50 shows an instruction sequence for transposition in a 8×8 matrix.

Embodiment 6

In Embodiments 3 and 4, values smaller than 0x00 are all changed to 0x00 by saturation, and values greater than 0x0f are all changed to 0x0f by saturation. In the present embodiment, the saturation is performed using a predetermined maximum value and a predetermined minimum value.

Figure 34:
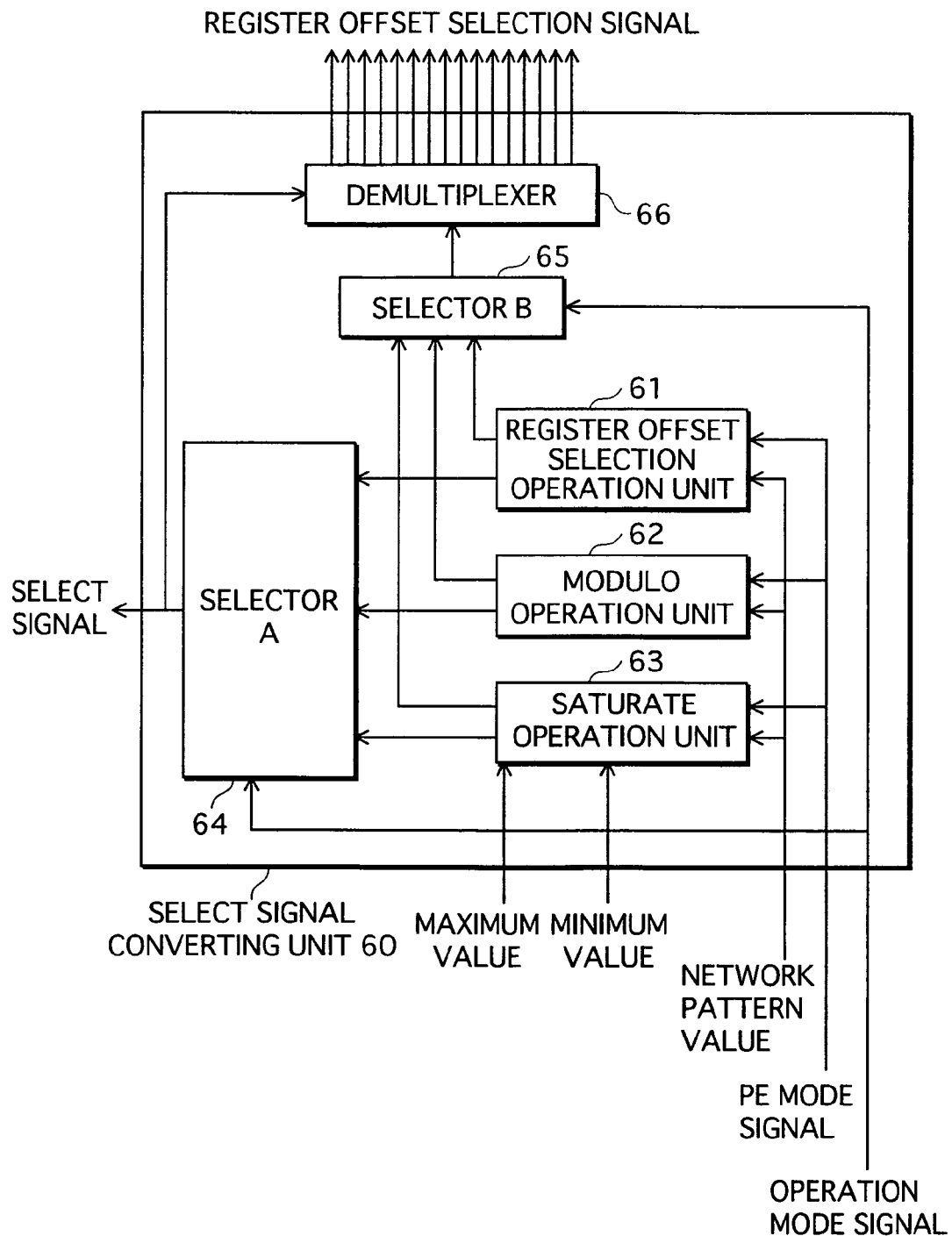
FIG. 34 shows the structure of the select signal converting unit.

FIG. 34 shows the structure of the select signal converting unit 60 in Embodiment 6 of the present invention. The maximum value and minimum value are stored in the control register. The structure shown in FIG. 34 differs from that shown in FIG. 8 in that the saturate operation unit 63 receives the maximum value and minimum value.

The saturate operation unit 63 sets lower four bits of an input minimum value into a select signal if a network pattern value is smaller than the input minimum value, sets lower four bits of an input maximum value into a select signal if a network pattern value is greater than the input maximum value, and otherwise, sets lower four bits of a network pattern value into a select signal. And the fifth bit of the network pattern value after such conversion is used for the register offset selection signal. If the maximum value and minimum value are in a range from 0x00 to 0x0f, the register offset selection signal becomes "0".

When the PE mode signal is in the 4PE mode, for PE0-PE3, lower three bits of an input minimum value are set into a select signal if a network pattern value is smaller than the input minimum value, lower three bits of an input maximum value are set into a select signal if a network pattern value is greater than the input maximum value, and otherwise, lower three bits of a network pattern value are set into a select signal. Also, the fourth bit of the network pattern value after such conversion is used for the register offset selection signal. If the maximum value and minimum value are in a range from 0x00 to 0x07, the register offset selection signal becomes "0". The fourth bit of the select signal is always set to "0". For PE4-PE7, lower three bits of an input minimum value are set into a select signal if a network pattern value is smaller than the input minimum value, lower three bits of an input maximum value are set into a select signal if a network pattern value is greater than the input maximum value, and otherwise, lower three bits of a network pattern value are set into a select signal. Also, the fourth bit of the network pattern value after such conversion is used for the register offset selection signal. If the maximum value and minimum value are in a range from 0x00 to 0x07, the register offset selection signal becomes "0". The fourth bit of the select signal is always set to "1".

FIG. 35 shows show the operation of the saturate operation unit 63. FIG. 35 shows an operation outline when the PE mode signal is specifying the 8PE mode. In FIG. 35, "PE0" to "PE7" indicate processing element numbers, and "H" and "L", which stand for "high" and "low", suggest that each processing element stores pixel values in units of half words. In FIG. 35, the first row shows network pattern values, the second row shows select signal outputs, and the third row shows register offset selection signal outputs. The maximum value is 0x0c, and the minimum value is 0x00. In FIG. 35(*a*), when a network pattern value is within a range from 0x00 to 0x0c, the select signal takes the same value as the network pattern value. In regards with PE6L, PE7H, and PE7L, the select signal outputs are all 0x0c since the network pattern values are greater than 0x0c. And the register offset selection signal outputs are all "0". In FIG. 35(*b*), when a network pattern value is within a range from 0x00 to 0x0c, the select signal takes the same value as the network pattern value. In regards with PE5L, PE6H, PE6L, PE7H, and PE7L, the select signal outputs are all 0x0c since the network pattern values are greater than 0x0c. And the register offset selection signal outputs are all "0". In FIG. 35(c), when a network pattern value is within a range from 0x00 to 0x0c, the values are the same as in FIG. 35(a). In regards with PE0H and PE0L, the select signal outputs are all 0x00 since the network pattern values are smaller than 0x00. In regards with PE7L, the select signal output is 0x0c since the network pattern value is greater than 0x0c. And the register offset selection signal outputs are all "0".

FIG. 36 shows an operation outline when the PE mode signal is specifying the 4PE mode. In FIG. 36, "PE0" to "PE7" indicate processing element numbers, and "H" and "L", which stand for "high" and "low", suggest that each processing element stores pixel values in units of half words. In FIG. 36, the first row shows network pattern values, the second row shows select signal outputs, and the third row shows register offset selection signal outputs. The maximum value is 0x06, and the minimum value is 0xff. In FIG. 36(a), for PE0-PE3 where the network pattern values are within a range from 0x00 to 0x06, the select signal outputs are the same as the network pattern values. In regards with PE3L, the select signal output is 0x06 since the network pattern value is greater than 0x06. And the register offset selection signal outputs are all "0". In regards with PE4-PE7, each select signal output is a value obtained by adding "8" to lower three bits of the network pattern value. In regards with PE7L, the select signal output is 0x0e since the network pattern value is greater than 0x06. And the register offset selection signal outputs are all "0". In FIG. 36(b), for PE0-PE3 where the network pattern values are within a range from 0x00 to 0x06, the select signal outputs are the same as the network pattern values. In regards with PE3H and PE3L, the select signal outputs are 0x06 since the network pattern values are greater than 0x06. And the register offset selection signal outputs are all "0". In regards with PE4-PE7, for PE7H and PE7L, the select signal outputs are 0x0e since the network pattern values are greater than 0x06. And the register offset selection signal outputs are all "0". In FIG. 36(c), when the network pattern values are within a range from 0x00 to 0x06, the values are the same as in FIG. 36(a). In regards with PE0 to PE3, for PE0H, the select signal outputs are 0x07 since the network pattern values are smaller than 0xff. And the register offset selection signal outputs are "1" for PE0H and PE0L. In regards with PE4 to PE7, for PE4H, the select signal output is 0x0e since the network pattern value is smaller than 0xff and the fourth bit of the select signal is "1". The register offset selection signal outputs are "1" for PE4H and PE4L.

As described above, the present embodiment enables the data at the edges of the screen to be repeatedly processed even if the edges of the screen are not PE0H or PE7L. Also, the present embodiment makes it possible to perform the FIR filter process in terms of the screens that are different in size, widening the application range.

Embodiment 7

The present embodiment relates to folding back data at an edge of the screen symmetrically as if with a mirror.

FIG. 34 shows the structure of the select signal converting unit 60 in Embodiment 7 of the present invention. In the present embodiment, the saturate operation unit 63 operates differently from Embodiment 6.

The saturate operation unit 63, when the PE mode signal is in the 8PE mode, sets a result value of "minimum value−(minimum value−network pattern value)+1" into a select signal if a network pattern value is smaller than the input minimum value, and sets a result value of "maximum value−(network pattern value−maximum value)+1" into a select signal if a network pattern value is greater than the input maximum value.

Figure 37:
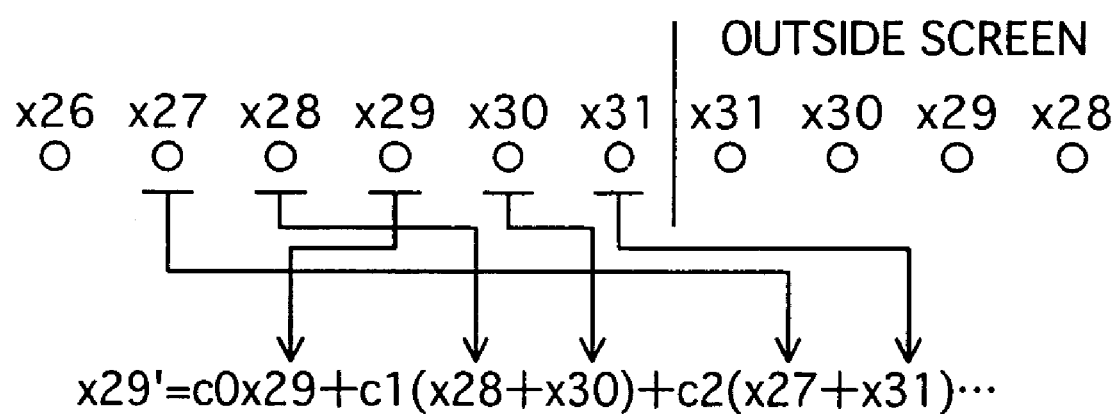
FIG. 37 shows how data are arranged at the edges of the screen.

FIG. 37 shows how data are arranged at the edges of the screen, and FIG. 38 shows the operation of the saturate operation unit 63. In FIG. 38, "PE0" to "PE7" indicate processing element numbers, and "H" and "L", which stand for "high" and "low", suggest that each processing element stores pixel values in units of half words. In FIG. 38, the first row shows network pattern values, the second row shows select signal outputs, and the third row shows register offset selection signal outputs. The maximum value is 0x0f, and the minimum value is 0xf0. If a network pattern value is greater than 0x0f, the select signal is set to a result value of "maximum value−(network pattern value−maximum value)+1". Accordingly, the select value output is "0f" for PE6H. This is the same for PE6L and PE7.

The above-described procedures apply to the 4PE mode. That is to say, for PE0-PE3, if a network pattern value is greater than 0x0f, the select signal is set to a result value of "maximum value−(network pattern value−maximum value)+1". Also, for PE4-PE7, the select signal is set to a value obtained by adding 8 to lower three bits of the network pattern value. If a network pattern value is smaller than 0xf0: for PE0-PE3, the select signal is set to a result value of "minimum value−(minimum value−network pattern value)+1"; and for PE4-PE7, the select signal is set to a value obtained by adding 8 to a result value of "minimum value−(minimum value−network pattern value)+1".

As described above, the present embodiment enables data at an edge of the screen to be folded back symmetrically, as if with a mirror. This provides higher image quality when the FIR filter operations or the like are performed.

It should be noted here that although the present embodiment is based on the even symmetry in which data at an edge of the screen is folded back, the odd symmetry, in which data at an edge of the screen is not folded back, may be used.

Embodiment 8

Figure 39:
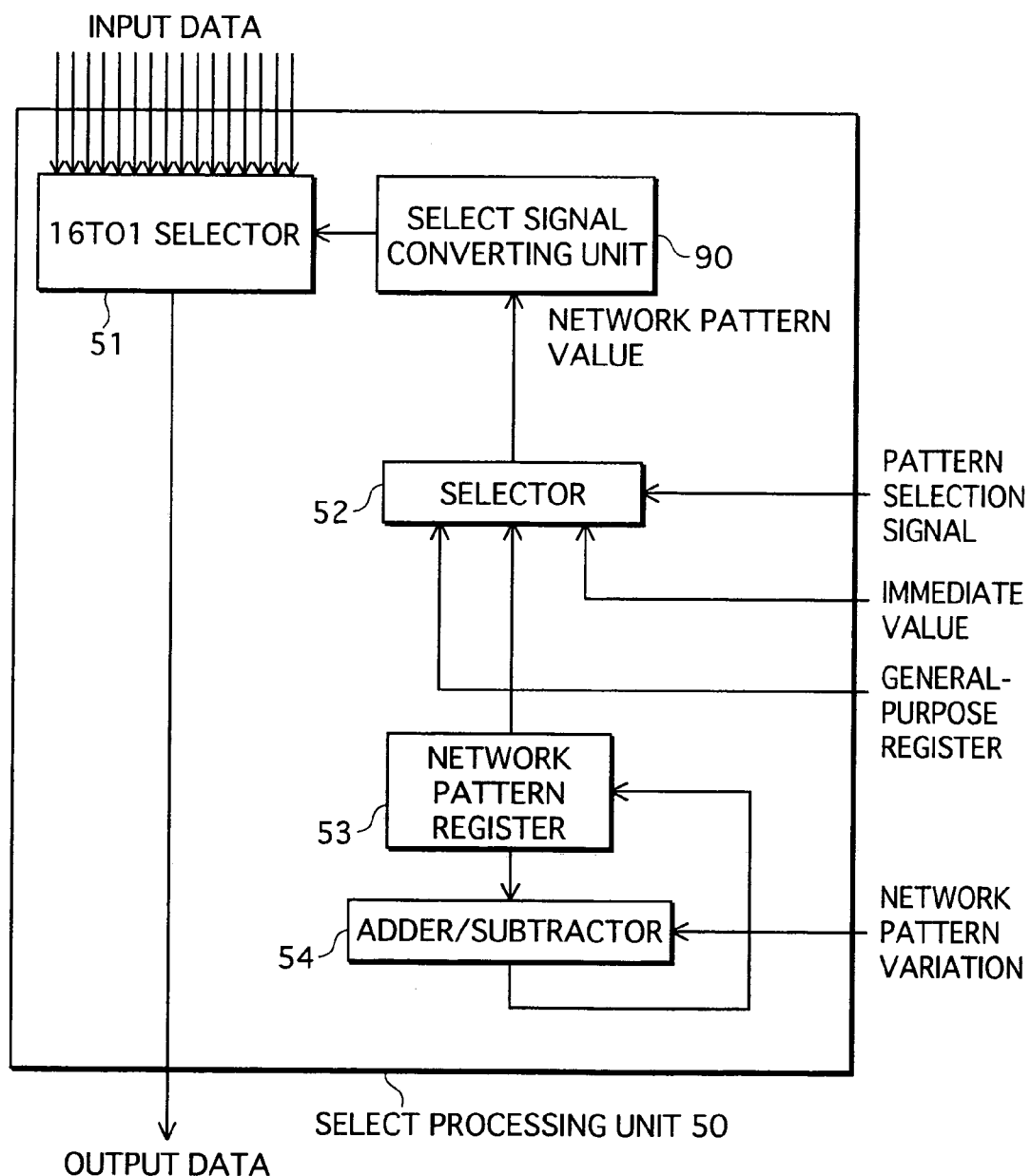
FIG. 39 shows the structure of the select processing unit.

FIG. 39 shows the structure of the select processing units 50 in Embodiment 8 of the present invention. The structure shown in FIG. 39 differs from that shown in FIG. 6 in a select signal converting unit 90.

The select signal converting unit 90 generates, from network pattern values, only select signals for the 16 to 1 selector 51.

Figure 40:
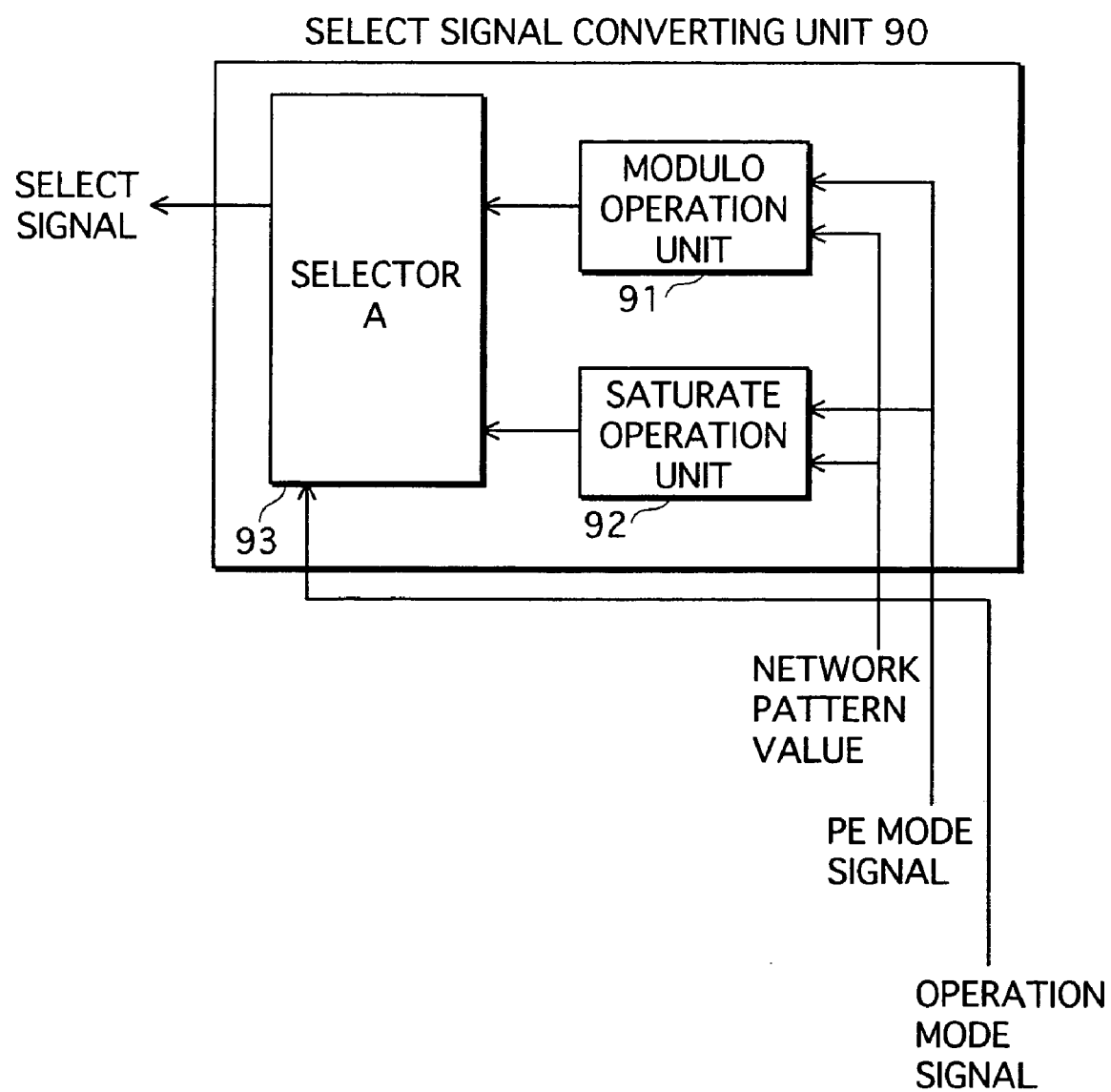
FIG. 40 shows the structure of the select signal converting unit.

FIG. 40 shows the structure of the select signal converting unit 90 in Embodiment 8 of the present invention.

A modulo operation unit 91 and a saturate operation unit 92 generate select signals from network pattern values in accordance with PE mode signals. The structure of Embodiment 8 is the same as that of Embodiment 1 except that no register offset selection signal is output.

A selector A 93 selects either a select signal output from the modulo operation unit 91 or a select signal output from the saturate operation unit 92.

Figure 41:
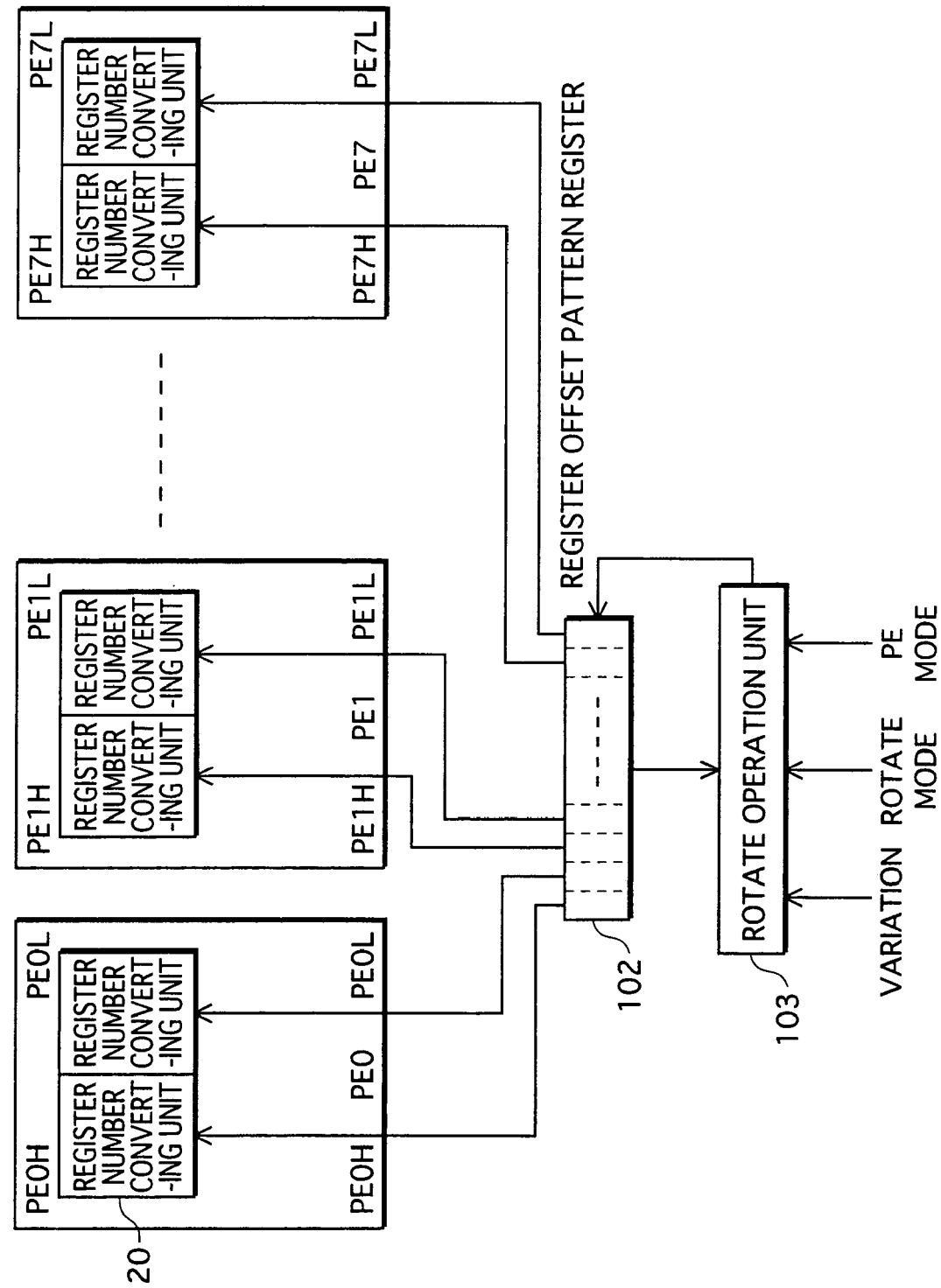
FIG. 41 shows connections between the register number converting units and a register offset pattern register.

FIG. 41 shows connections between the register number converting units 20 and a register offset pattern register in Embodiment 8 of the present invention. In the present embodiment, the parallel operation processor further includes a register offset pattern register 102 and a rotate operation unit 103. The register offset pattern register 102 is a register for holding a value that indicates whether the register number converting unit 20 for each processing element uses a register offset. More specifically, each bit of the register offset pattern register 102 is used as a register offset selection signal of the register number converting unit 20 for each processing element. It is possible to describe program so that data is written into the register offset pattern register 102, and a calculation result output from the rotate operation unit 103 is written into the register offset pattern register 102 as necessary.

The rotate operation unit 103 receives variation values, PE mode signals, and rotate mode signals, and changes the operation in accordance with a received value or signal.

The rotate mode signal specifies a rotate or an inversion rotate mode. In the rotate mode, when the PE mode signal is specifying the 8PE mode, as many rotate operations as specified by the variation value are performed. That is to say, as shown in FIG. 42A, as many MSBs as specified by the variation value are rotated to become the LSBs, or as many LSBs as specified by the variation value are rotated to become the MSBs. The result of the operation is written into the register offset pattern register 102. When the PE mode signal is specifying the 4PE mode, as many rotate operations as specified by the variation value are performed within a bit sequence from bit 15 to bit 8, and within a bit sequence from bit 7 to bit 0, as shown in FIG. 42B. The result of the operation is written into the register offset pattern register 102.

In the inversion rotate mode, when the PE mode signal is specifying the 8PE mode, as many rotate operations as specified by the variation value are performed. That is to say, as shown in FIG. 42C, as many MSBs as specified by the variation value are rotated to become the LSBs, and the LSBs are inversed, or as many LSBs as specified by the variation value are rotated to become the MSBS, and the MSBs are inversed. The result of the operation is written into the register offset pattern register 102. When the PE mode signal is specifying the 4PE mode, as many rotate operations as specified by the variation value are performed within a bit sequence from bit 15 to bit 8, and within a bit sequence from bit 7 to bit 0, and the rotated bits are inversed, as shown in FIG. 42D. The result of the operation is written into the register offset pattern register 102.

It should be noted here that the variation value is equal to a value of an amount of movement specified by the network shift instruction or network transpose instruction.

Figure 43:
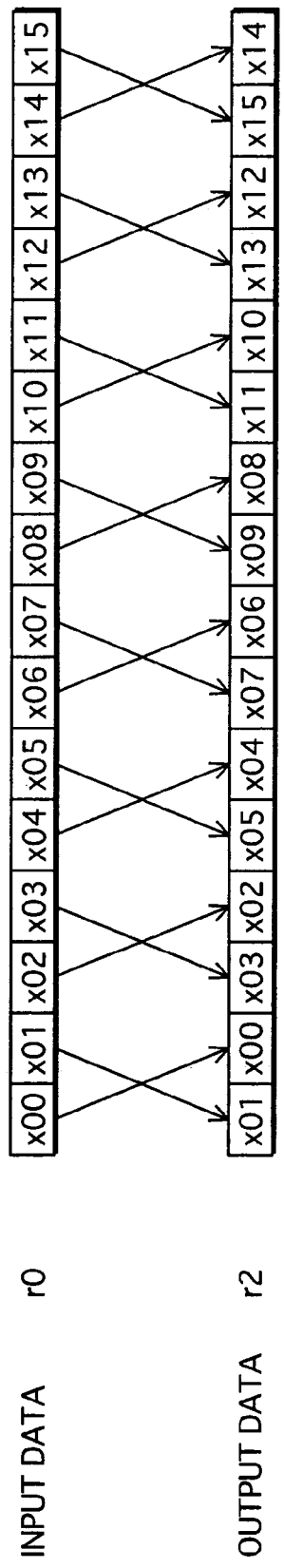
FIG. 43 shows an operation of the network select instruction.
Figure 44:
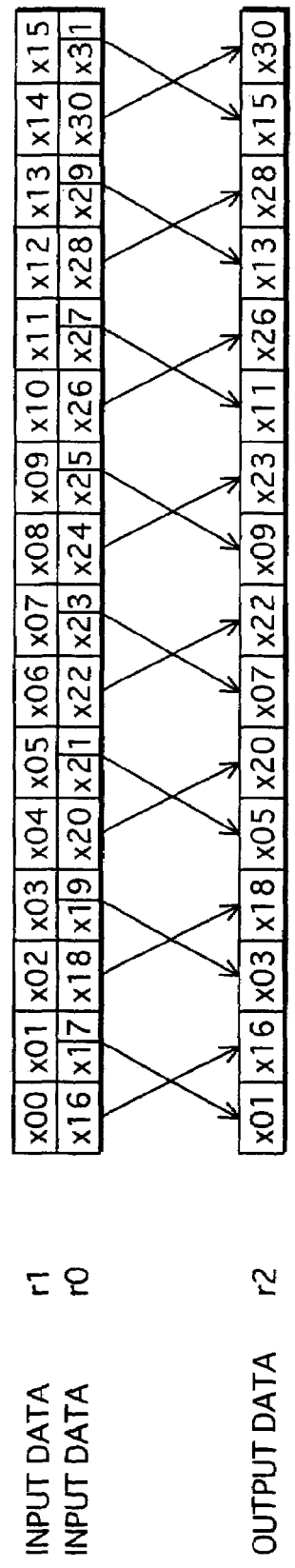
FIG. 44 shows an operation of the network select instruction.

Next, it will be shown that the nsel.a instruction described in Embodiment 1 is also achieved in the present embodiment. FIG. 43 shows the same example as FIG. 18 does in Embodiment 1. In this example, the PE operation mode is the 8PE mode, the operation mode is the modulo mode, and the rotate mode is rotate. FIG. 43 shows that when 0x0000 is set in the register offset pattern register 102, the same operation is performed. FIG. 44 shows that when 0x5555 is set in the register offset pattern register 102, the same operation is performed since only processing elements corresponding to value "1" read data from register r1, the register number being obtained by using the register offset.

Next, it will be shown that the nsfti.a instruction described in Embodiment 2 is also achieved in the present embodiment. FIG. 45 shows the same example as FIG. 22 does in Embodiment 2. In this example, the PE operation mode is the 8PE mode, the operation mode is the modulo mode, and the rotate mode is inversion rotate. FIG. 45(a) shows that when 0x0000 is set in the register offset pattern register 102, the same operation is performed. FIG. 45(b) shows that the same operation as in FIG. 22(a) is performed. This is because, as a result of the execution of the nsfti.a instruction in FIG. 45(a), the value in the register offset pattern register 102 is inverse-rotated and shifted by an amount of shift 0x01, causing the register offset pattern register 102 to hold 0x8000, which causes PE0H to read data from register r2, the register number being obtained by using the register offset. FIG. 45(c) shows that the same operation as in FIG. 22(c) is performed. This is because, as a result of the execution of the nsfti.a instruction in FIG. 45(b), the value in the register offset pattern register 102 is inverse-rotated and shifted by an amount of shift 0x01, causing the register offset pattern register 102 to hold 0xc000, which causes PE0H and PE0L to read data from register r2, the register number being obtained by using the register offset.

Next, it will be shown that the ntrpd.a instruction described in Embodiment 5 is also achieved in the present embodiment. FIGS. 46A-46G show the same example as FIGS. 29A-29G do in Embodiment 5. In this example, the PE operation mode is the 4PE mode, the operation mode is the modulo mode, and the rotate mode is rotate. FIG. 46F shows that when 0xffff is set in the register offset pattern register 102, the same operation is performed since all the processing elements use the register offset. FIG. 46G shows that the same operation is performed. This is because, as a result of the execution of the ntrpd.a instruction in FIG. 46F, the value in the register offset pattern register 102 is rotated and shifted by an amount of shift 0x02, causing the register offset pattern register 102 to hold the same value 0xffff, which causes all the processing elements to use the register offset.

As described above, the present embodiment greatly reduces the number of signal lines of the register offset selection signal, compared with Embodiment 1, contributing to the reduction in circuit size. The present embodiment also reduces the number of signal lines that are used to interconnect the processing elements. This facilitates laying out the function blocks when the LSI is designed.

Other Modifications

The above-described is the parallel operation processor of the present invention in various embodiments. However, not limited to the above-described embodiments, the present invention includes the following modifications, for example.

(1) In the above-described embodiments, eight processing elements are used, 16 registers are used, the registers are 16 bits in width, and the network moves in units of eight bits. However, not limited to these numbers or bit width, values for such may be freely selected as necessary.

(2) In the above-described embodiments, the network pattern value is held by the network pattern register. However, a plurality of registers may be used as the network pattern register. Alternatively, a general-purpose register may be used as the network pattern register.

(3) In the above-described embodiments, the PE mode and the operation mode are respectively set in the control registers, the PE mode register 82 and the operation mode register 83. However, an instruction may be used to switch between the modes.

(4) In the above-described embodiments, the PE mode can be switched between the 8PE mode and the 4PE mode. However, the 2PE mode and/or the 1PE mode may further be used.

(5) In the above-described embodiments, each processing element has an independent operation unit. However, when a SIMD operation is performed, an operation device that is large in bit length may be divided into parts and the parts may be used as the processing elements.

(6) In the above-described embodiments, a variation of the network pattern value is specified by an operand. However, a general-purpose register or a dedicated register may be used to specify the variation of the network pattern value.

(7) In the above-described embodiments, a parallel operation processor is used. However, the present invention may be a method for achieving the invention.

(8) In the above-described embodiments, a parallel operation processor is used. However, the present invention may be a signal processing apparatus in which a parallel operation processor is loaded. The signal processing apparatus is, for example, an image apparatus, a communication apparatus, or an audio apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A single instruction multiple data (SIMD) processor comprising a plurality of processing elements, wherein each of the plurality of processing elements includes:
    a transfer pattern storage unit operable to store a transfer pattern value that indicates a processing element from which data is transferred;
    a transfer unit operable to perform a data transfer from the processing element indicated by the transfer pattern value; and
    an update unit operable to update the transfer pattern value stored in the transfer pattern storage unit based on a transfer pattern value variation that indicates an amount of variation of the transfer pattern value, wherein
    the transfer unit performs a next data transfer based on the transfer pattern value after the update by the update unit.

2. The SIMD processor of claim 1, wherein
the transfer pattern value is a number that indicates the processing element from which data is transferred.

3. The SIMD processor of claim 2, wherein
each of the plurality of processing elements further includes a register set composed of a plurality of registers, and the transferred data is a value stored in one of the plurality of registers of the register set.

4. The SIMD processor of claim 3, wherein
the register set outputs data stored in one of the plurality of registers thereof in accordance with a predetermined offset signal,
the update unit performs, during the updating of the transfer pattern value, an arithmetic operation using the transfer pattern value, and
the predetermined offset signal changes in accordance with a digit shift that is caused in the arithmetic operation performed by the update unit.

5. The SIMD processor of claim 2, wherein
the update unit includes an arithmetic operation unit and a saturate operation unit,
the saturate operation unit judges whether a result of an arithmetic operation performed by the arithmetic operation unit is outside a predetermined range, and upon judging that the result of the arithmetic operation is outside the predetermined range, performs a saturate operation on the transfer pattern value, and
the transfer pattern value having been updated by the update unit is a result of either the arithmetic operation or the saturate operation.

6. The SIMD processor of claim 5, wherein
the result of the saturate operation is a first value as a saturate value if the transfer pattern value is greater than the predetermined range, and is a second value as a saturate value if the transfer pattern value is smaller than the predetermined range.

7. The SIMD processor of claim 6, wherein
the predetermined range is a range of the number that indicates the processing element, the first value is a maximum value of the number that indicates the processing element, and the second value is a minimum value of the number that indicates the processing element.

8. The SIMD processor of claim 6, wherein
the saturate operation unit further receives a predetermined maximum value and a predetermined minimum value during the saturate operation, the predetermined range is defined by the predetermined maximum value and the predetermined minimum value, the first value is the predetermined maximum value, and the second value is the predetermined minimum value.

9. The SJMD processor of claim 6, wherein
the saturate operation unit further receives a predetermined maximum value and a predetermined minimum value during the saturate operation, the predetermined range is defined by the predetermined maximum value and the predetermined minimum value, the first value is obtained from the transfer pattern value and the predetermined maximum value, and the second value is obtained from the transfer pattern value and the predetermined minimum value.

10. The SIMD processor of claim 5, wherein
each register in the register set store two pieces of 1-byte data which are higher bit side and lower bit side, respectively, the saturate operation unit judges, for each of the higher bit side 1-byte data and the lower bit side 1-byte data, whether a result of an arithmetic operation performed by the arithmetic operation unit is outside a predetermined range, and upon judging that the result of the arithmetic operation is outside the predetermined range, simultaneously performs saturate operations on the higher bit side 1-byte data and the lower bit side 1-byte data, and
the result of the operation is two different saturate values.

11. The SIMD processor of claim 3, wherein
the update unit includes an arithmetic operation unit and a modulo operation .unit that is operable to perform a modulo operation,
the modulo operation unit judges whether a result of an arithmetic operation performed by the arithmetic operation unit is outside a predetermined range of the transfer pattern value, and upon judging that the result of the arithmetic operation is outside the predetermined range, performs a modulo operation on the transfer pattern value, and
the transfer pattern value having been updated by the update unit is a result of either the arithmetic operation or the modulo operation.

12. The SIMD processor of claim 11, wherein
each of the plurality of processing elements includes: a first varying unit operable to vary a read offset value by performing a modulo operation on, the read offset value and a second varying unit operable to vary a write offset value by performing a modulo operation on the write offset value, the register set reads data from one of the plurality of registers thereof in accordance with the read offset value, and writes data to one of the plurality of registers thereof in accordance with the write offset value.

13. The SIMD processor of claim 2, wherein
the updating of the transfer pattern value stored in the transfer pattern storage unit is performed during one cycle of decoding.

14. The SIMD processor of claim 2, wherein
the instruction includes an operand that specifies a variation value for a transfer pattern,
the processor further comprises:
a register offset storage unit operable to store a value that indicates whether to use a register offset value; and a rotate operation unit operable to perform either a rotate operation or an inversion rotate operation on as many bits as indicated by the variation value specified in the instruction, and stores at result of the rotate or inversion rotate operation
into the register offset storage unit.

15. A method for use in the SIMD processor defined in claim 1 that comprises the plurality of processing elements,
wherein each of the plurality of processing elements includes: the transfer pattern storage unit operable to store the transfer pattern value that indicates the processing element from which data is transferred,
the method comprising the step of:
performing a data transfer with the processing element indicated by the transfer pattern value; and
updating the transfer pattern value stored in the transfer pattern storage unit based on a transfer pattern value variation that indicates an amount of variation of the transfer pattern value, wherein
the transfer step performs a next data transfer based on the transfer pattern value after an update by the updating step.

16. A signal processing apparatus in which the SIMD processor defined in claim 1 is loaded.

17. The SIMD processor of claim 2, wherein the transfer pattern value is 8 bits.

18. The SIMD processor of claim 17, wherein at least three of the 8 bits in the transfer pattern value are used to indicate a select signal.

19. The SIMD processor of claim 18, wherein at least one of the 8 bits in the transfer pattern value is used to indicate a register offset selection signal.

* * * * *

UNITED STATES PATENT AND TRADEMARK OFFICE
CERTIFICATE OF CORRECTION

PATENT NO. : 7,412,587 B2
APPLICATION NO. : 11/054049
DATED : August 12, 2008
INVENTOR(S) : Tanaka et al.

It is certified that error appears in the above-identified patent and that said Letters Patent is hereby corrected as shown below:

In the Claims:
In Claim 11, Column 34, line 44, "operation .unit" should be --operation unit--.

Signed and Sealed this

Seventh Day of October, 2008

JON W. DUDAS
*Director of the United States Patent and Trademark Office*